(12) United States Patent
Linsmeier et al.

(10) Patent No.: US 12,552,278 B2
(45) Date of Patent: Feb. 17, 2026

(54) CHARGING SYSTEM FOR A FIRE FIGHTING VEHICLE

(71) Applicant: Oshkosh Corporation, Oshkosh, WI (US)

(72) Inventors: Eric Linsmeier, Larsen, WI (US); Chad Smith, Omro, WI (US)

(73) Assignee: Oshkosh Corporation, Oshkosh, WI (US)

( * ) Notice: Subject to any disclaimer, the term of this patent is extended or adjusted under 35 U.S.C. 154(b) by 831 days.

(21) Appl. No.: 17/729,796

(22) Filed: Apr. 26, 2022

(65) Prior Publication Data

US 2022/0355690 A1 Nov. 10, 2022

Related U.S. Application Data

(60) Provisional application No. 63/250,676, filed on Sep. 30, 2021, provisional application No. 63/184,518, (Continued)

(51) Int. Cl.
*B60L 53/35* (2019.01)
*A62C 3/07* (2006.01)
(Continued)

(52) U.S. Cl.
CPC .............. *B60L 53/35* (2019.02); *A62C 3/07* (2013.01); *A62C 27/00* (2013.01); *A62C 37/40* (2013.01);
(Continued)

(58) Field of Classification Search
USPC ........................................................ 320/109
See application file for complete search history.

(56) References Cited

U.S. PATENT DOCUMENTS 2,181,772 A 11/1939 Snyder
2,389,168 A 11/1945 Snyder
(Continued)

FOREIGN PATENT DOCUMENTS

CN 205017067 U * 2/2016
CN 113783278 A * 12/2021 ............ H02J 7/0071
(Continued)

OTHER PUBLICATIONS kussmaul.com, "Super Auto Eject", Internet URL: https://kussmaul.com/091-55-15-120, retrieved on Nov. 1, 2023.
(Continued)

*Primary Examiner* — Mohammed Alam
(74) *Attorney, Agent, or Firm* — Foley & Lardner LLP

(57) ABSTRACT

A fire fighting vehicle includes an energy storage system coupled to the chassis and a charging assembly configured to interface with a charging plug. The energy storage system includes battery cells. The charging assembly includes a housing, a charging port disposed within the housing and electrically coupled to the battery cells, a retainer positioned proximate the charging port, a first actuator, and a second actuator. The charging port is configured to engage with a charging interface of the charging plug. The retainer is configured to engage with a retaining interface of the charging plug to secure the charging interface within the charging port. The first actuator is positioned to release the retaining interface from engagement with the retainer by repositioning the retaining interface into a release position. The second actuator is positioned to eject the charging plug from the charging assembly when the retaining interface is in the release position.

19 Claims, 42 Drawing Sheets

Related U.S. Application Data filed on May 5, 2021, provisional application No. 63/184,415, filed on May 5, 2021, provisional application No. 63/184,418, filed on May 5, 2021, provisional application No. 63/184,516, filed on May 5, 2021.

(51) Int. Cl.

| | | |
|---|---|---|
| A62C 27/00 | (2006.01) | |
| A62C 37/40 | (2006.01) | |
| A62C 99/00 | (2010.01) | |
| B60L 3/04 | (2006.01) | |
| B60L 53/16 | (2019.01) | |
| B60L 53/66 | (2019.01) | |
| B60L 58/26 | (2019.01) | |

(52) U.S. Cl.
CPC .............. *A62C 99/009* (2013.01); *B60L 3/04* (2013.01); *B60L 53/16* (2019.02); *B60L 53/66* (2019.02); *B60L 58/26* (2019.02)

(56) References Cited

U.S. PATENT DOCUMENTS

| | | | |
|---|---|---|---|
| 5,171,121 | A | 12/1992 | Smith et al. |
| 5,538,274 | A | 7/1996 | Schmitz et al. |
| 5,820,150 | A | 10/1998 | Archer et al. |
| 5,897,123 | A | 4/1999 | Cherney et al. |
| 6,105,984 | A | 8/2000 | Schmitz et al. |
| 6,516,914 | B1 | 2/2003 | Andersen et al. |
| 6,561,718 | B1 | 5/2003 | Archer et al. |
| 6,860,332 | B1 | 3/2005 | Archer et al. |
| 7,392,122 | B2 | 6/2008 | Pillar et al. |
| 7,530,403 | B2 | 5/2009 | Cano |
| 7,647,994 | B1 | 1/2010 | Belloso |
| 7,878,750 | B2 | 2/2011 | Zhou et al. |
| 7,937,194 | B2 | 5/2011 | Nasr et al. |
| 8,000,850 | B2 | 8/2011 | Nasr et al. |
| 8,201,656 | B2 | 6/2012 | Archer et al. |
| 8,337,352 | B2 | 12/2012 | Morrow et al. |
| 9,114,804 | B1 | 8/2015 | Shukla et al. |
| 9,200,554 | B2 | 12/2015 | Cook |
| 9,376,102 | B1 | 6/2016 | Shukla et al. |
| 9,580,061 | B2 | 2/2017 | Pipho et al. |
| 9,651,120 | B2 | 5/2017 | Morrow et al. |
| 9,809,182 | B2 | 11/2017 | Brunbauer |
| 9,821,789 | B2 | 11/2017 | Shukla et al. |
| 10,239,403 | B2 | 3/2019 | Broker et al. |
| 10,392,000 | B2 | 8/2019 | Shukla et al. |
| 10,421,350 | B2 | 9/2019 | Morrow et al. |
| 10,442,668 | B1 | 10/2019 | Betz et al. |
| 10,456,610 | B1 | 10/2019 | Betz et al. |
| 10,458,182 | B1 | 10/2019 | Betz et al. |
| 10,463,900 | B1 | 11/2019 | Betz et al. |
| D869,332 | S | 12/2019 | Gander et al. |
| 10,532,722 | B1 | 1/2020 | Betz et al. |
| 10,578,195 | B2 | 3/2020 | Steinberger et al. |
| 10,584,775 | B2 | 3/2020 | Steinberger et al. |
| 10,611,347 | B1 | 4/2020 | Archer et al. |
| 10,617,900 | B1 | 4/2020 | Linsmeier et al. |
| D899,452 | S | 10/2020 | Klimes et al. |
| D905,713 | S | 12/2020 | Linsmeier et al. |
| D910,670 | S | 2/2021 | Klimes et al. |
| 10,974,724 | B1 | 4/2021 | Shively et al. |
| 10,981,024 | B1 | 4/2021 | Shively et al. |
| 10,982,736 | B2 | 4/2021 | Steinberger et al. |
| 11,052,899 | B2 | 7/2021 | Shukla et al. |
| 11,161,415 | B1 | 11/2021 | Koga et al. |
| 11,230,278 | B2 | 1/2022 | Linsmeier et al. |
| 11,254,498 | B1 | 2/2022 | Koga et al. |
| 11,370,292 | B2 | 6/2022 | Healy et al. |
| 11,472,308 | B2 | 10/2022 | Messina et al. |
| 2002/0071336 | A1 | 6/2002 | Smith et al. |
| 2002/0103580 | A1 | 8/2002 | Yakes et al. |
| 2003/0158635 | A1 | 8/2003 | Pillar et al. |
| 2003/0158638 | A1 | 8/2003 | Yakes et al. |
| 2003/0195680 | A1 | 10/2003 | Pillar |
| 2003/0205422 | A1 | 11/2003 | Morrow et al. |
| 2003/0230412 | A1 | 12/2003 | Archer |
| 2003/0230863 | A1 | 12/2003 | Archer |
| 2004/0002794 | A1 | 1/2004 | Pillar et al. |
| 2004/0039510 | A1 | 2/2004 | Archer et al. |
| 2004/0133332 | A1 | 7/2004 | Yakes et al. |
| 2004/0199302 | A1 | 10/2004 | Pillar et al. |
| 2005/0001400 | A1 | 1/2005 | Archer et al. |
| 2005/0109549 | A1 | 5/2005 | Morrow |
| 2005/0209747 | A1 | 9/2005 | Yakes et al. |
| 2005/0234622 | A1 | 10/2005 | Pillar et al. |
| 2006/0021764 | A1 | 2/2006 | Archer et al. |
| 2006/0022001 | A1 | 2/2006 | Linsmeier et al. |
| 2006/0032701 | A1 | 2/2006 | Linsmeier et al. |
| 2006/0032702 | A1 | 2/2006 | Linsmeier et al. |
| 2006/0055206 | A1 | 3/2006 | Morrow et al. |
| 2006/0065411 | A1 | 3/2006 | Linsmeier et al. |
| 2006/0065451 | A1 | 3/2006 | Morrow et al. |
| 2006/0065453 | A1 | 3/2006 | Morrow et al. |
| 2006/0070776 | A1 | 4/2006 | Morrow et al. |
| 2006/0071466 | A1 | 4/2006 | Rowe et al. |
| 2006/0086566 | A1 | 4/2006 | Linsmeier et al. |
| 2006/0180322 | A1 | 8/2006 | Archer et al. |
| 2007/0088469 | A1 | 4/2007 | Schmiedel et al. |
| 2007/0103002 | A1 | 5/2007 | Chiao et al. |
| 2007/0284163 | A1 | 12/2007 | Heap et al. |
| 2007/0288131 | A1 | 12/2007 | Yakes et al. |
| 2008/0065285 | A1 | 3/2008 | Yakes et al. |
| 2008/0099213 | A1 | 5/2008 | Morrow et al. |
| 2008/0114513 | A1 | 5/2008 | Pillar et al. |
| 2008/0150350 | A1 | 6/2008 | Morrow et al. |
| 2009/0127010 | A1 | 5/2009 | Morrow et al. |
| 2009/0194347 | A1 | 8/2009 | Morrow et al. |
| 2009/0223725 | A1 | 9/2009 | Rodriguez et al. |
| 2010/0116569 | A1 | 5/2010 | Morrow et al. |
| 2010/0138089 | A1 | 6/2010 | James |
| 2010/0253284 | A1 | 10/2010 | Aoki et al. |
| 2010/0301668 | A1 | 12/2010 | Yakes et al. |
| 2011/0166731 | A1 | 7/2011 | Kristinsson et al. |
| 2011/0166733 | A1 | 7/2011 | Yu et al. |
| 2011/0245034 | A1 | 10/2011 | Yoshida et al. |
| 2011/0312459 | A1 | 12/2011 | Morrow et al. |
| 2013/0196806 | A1 | 8/2013 | Morrow et al. |
| 2013/0234508 | A1 | 9/2013 | Eisele et al. |
| 2014/0015488 | A1* | 1/2014 | Despesse ............ H01M 10/441 429/7 |
| 2014/0117934 | A1 | 5/2014 | Kurikuma et al. |
| 2014/0246265 | A1 | 9/2014 | Archer et al. |
| 2014/0262355 | A1 | 9/2014 | Linsmeier |
| 2014/0274522 | A1 | 9/2014 | Davis et al. |
| 2015/0134231 | A1 | 5/2015 | Li et al. |
| 2015/0142231 | A1 | 5/2015 | Ledermann et al. |
| 2015/0159613 | A1 | 6/2015 | Jensen et al. |
| 2015/0166046 | A1 | 6/2015 | Kondo et al. |
| 2015/0246331 | A1 | 9/2015 | Broker et al. |
| 2015/0251716 | A1 | 9/2015 | Matsuda |
| 2015/0258886 | A1 | 9/2015 | Aimo Boot et al. |
| 2015/0260143 | A1 | 9/2015 | Yorke et al. |
| 2015/0283894 | A1 | 10/2015 | Morrow et al. |
| 2015/0291060 | A1 | 10/2015 | Zhao |
| 2015/0314776 | A1 | 11/2015 | Yu |
| 2015/0353128 | A1 | 12/2015 | Shibuya et al. |
| 2015/0375732 | A1 | 12/2015 | Nordlof et al. |
| 2016/0052510 | A1 | 2/2016 | Aldrich et al. |
| 2016/0072213 | A1* | 3/2016 | Ichio ..................... B60L 53/16 439/34 |
| 2016/0144211 | A1 | 5/2016 | Betz et al. |
| 2016/0145941 | A1 | 5/2016 | Betz et al. |
| 2016/0176394 | A1 | 6/2016 | Geller |
| 2016/0185250 | A1 | 6/2016 | Izumi |
| 2016/0193994 | A1 | 7/2016 | Ando et al. |
| 2016/0238110 | A1 | 8/2016 | Morrow et al. |
| 2016/0304051 | A1 | 10/2016 | Archer et al. |
| 2016/0361987 | A1 | 12/2016 | Morrow et al. |
| 2017/0108085 | A1 | 4/2017 | Morrow et al. |
| 2017/0246946 | A1 | 8/2017 | Morrow et al. |

(56) References Cited

U.S. PATENT DOCUMENTS

| | | |
|---|---|---|
| 2017/0328455 A1 | 11/2017 | Li et al. |
| 2017/0328456 A1 | 11/2017 | Samie et al. |
| 2017/0363180 A1 | 12/2017 | Steinberger et al. |
| 2017/0370446 A1 | 12/2017 | Steinberger et al. |
| 2018/0022338 A1 | 1/2018 | Dalum et al. |
| 2018/0031085 A1 | 2/2018 | Steinberger et al. |
| 2018/0215354 A1 | 8/2018 | Linsmeier et al. |
| 2018/0215597 A1 | 8/2018 | Linsmeier et al. |
| 2018/0259042 A1 | 9/2018 | Morrow et al. |
| 2018/0289999 A1 | 10/2018 | Kay et al. |
| 2018/0293818 A1 | 10/2018 | Linsmeier et al. |
| 2018/0297597 A1 | 10/2018 | Linsmeier et al. |
| 2018/0345783 A1 | 12/2018 | Morrow et al. |
| 2019/0039407 A1 | 2/2019 | Smith |
| 2019/0106083 A1 | 4/2019 | Archer et al. |
| 2019/0178350 A1 | 6/2019 | Steinberger et al. |
| 2019/0185077 A1 | 6/2019 | Smith et al. |
| 2019/0217698 A1 | 7/2019 | Broker et al. |
| 2019/0225071 A1 | 7/2019 | Klucsarits et al. |
| 2019/0242460 A1 | 8/2019 | Morrow et al. |
| 2019/0262646 A1 | 8/2019 | Linsmeier et al. |
| 2019/0263408 A1 | 8/2019 | Linsmeier et al. |
| 2019/0359184 A1 | 11/2019 | Linsmeier et al. |
| 2019/0359460 A1 | 11/2019 | Linsmeier et al. |
| 2019/0366828 A1 | 12/2019 | Morrow et al. |
| 2019/0383373 A1 | 12/2019 | Engerman |
| 2020/0016984 A1 | 1/2020 | Mantea |
| 2020/0038700 A1 | 2/2020 | Betz et al. |
| 2020/0039341 A1 | 2/2020 | Morrow et al. |
| 2020/0039804 A1 | 2/2020 | Betz et al. |
| 2020/0047013 A1 | 2/2020 | Betz et al. |
| 2020/0056426 A1 | 2/2020 | Betz et al. |
| 2020/0094813 A1 | 3/2020 | Zhou et al. |
| 2020/0108285 A1 | 4/2020 | Kay et al. |
| 2020/0114184 A1 | 4/2020 | Lenz et al. |
| 2020/0130476 A1 | 4/2020 | Lenz et al. |
| 2020/0130653 A1 | 4/2020 | Betz et al. |
| 2020/0139804 A1 | 5/2020 | Holmes et al. |
| 2020/0200237 A1 | 6/2020 | Steinberger et al. |
| 2020/0200238 A1 | 6/2020 | Steinberger et al. |
| 2020/0231131 A1 | 7/2020 | Archer et al. |
| 2020/0238115 A1 | 7/2020 | Linsmeier et al. |
| 2020/0279444 A1 | 9/2020 | Linsmeier et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0398670 A1 | 12/2020 | Rocholl et al. |
| 2020/0398695 A1 | 12/2020 | Rocholl et al. |
| 2021/0018072 A1 | 1/2021 | Steinberger et al. |
| 2021/0031649 A1 | 2/2021 | Messina et al. |
| 2021/0070595 A1 | 3/2021 | Holmes et al. |
| 2021/0106856 A1 | 4/2021 | Shively et al. |
| 2021/0107361 A1 | 4/2021 | Linsmeier et al. |
| 2021/0107446 A1 | 4/2021 | Shively et al. |
| 2021/0140517 A1 | 5/2021 | Steinberger et al. |
| 2021/0155224 A1 | 5/2021 | Mckibben et al. |
| 2021/0178206 A1 | 6/2021 | Betz et al. |
| 2021/0178890 A1 | 6/2021 | Steinberger et al. |
| 2021/0188076 A1 | 6/2021 | Morrow et al. |
| 2021/0196998 A1 | 7/2021 | Shively et al. |
| 2021/0206372 A1 | 7/2021 | Shively et al. |
| 2021/0229628 A1 | 7/2021 | Archer et al. |
| 2021/0244982 A1 | 8/2021 | Betz et al. |
| 2021/0253102 A1 | 8/2021 | Linsmeier et al. |
| 2021/0323438 A1 | 10/2021 | Rocholl et al. |
| 2021/0327170 A1 | 10/2021 | Rocholl et al. |
| 2022/0009338 A1 | 1/2022 | Yakes et al. |
| 2022/0009761 A1 | 1/2022 | Archer et al. |
| 2022/0032999 A1 | 2/2022 | Soares et al. |
| 2022/0077699 A1 | 3/2022 | Middleton et al. |
| 2022/0097537 A1 | 3/2022 | Prothery et al. |
| 2022/0169400 A1 | 6/2022 | Seeley |
| 2023/0039772 A1 | 2/2023 | Rocholl et al. |
| 2024/0058634 A1 | 2/2024 | Linsmeier et al. |
| 2024/0059121 A1 | 2/2024 | Linsmeier et al. |
| 2024/0059151 A1 | 2/2024 | Linsmeier et al. |
| 2024/0059190 A1 | 2/2024 | Linsmeier et al. |
| 2024/0063470 A1 | 2/2024 | Linsmeier et al. |
| 2024/0149085 A1 | 5/2024 | Archer et al. |
| 2024/0149086 A1 | 5/2024 | Linsmeier |
| 2024/0149087 A1 | 5/2024 | Archer et al. |
| 2024/0149658 A1 | 5/2024 | Archer et al. |
| 2024/0149659 A1 | 5/2024 | Archer et al. |
| 2024/0149708 A1 | 5/2024 | Archer et al. |
| 2024/0149709 A1 | 5/2024 | Archer et al. |
| 2024/0149710 A1 | 5/2024 | Newlin et al. |
| 2024/0149815 A1 | 5/2024 | Archer et al. |
| 2024/0149864 A1 | 5/2024 | Linsmeier |
| 2024/0149948 A1 | 5/2024 | Archer et al. |
| 2024/0149965 A1 | 5/2024 | Archer et al. |
| 2024/0153674 A1 | 5/2024 | Archer et al. |
| 2024/0198998 A1 | 6/2024 | Shively et al. |
| 2024/0284645 A1 | 8/2024 | Goodman et al. |
| 2024/0351424 A1 | 10/2024 | Linsmeier |
| 2025/0010843 A1 | 1/2025 | Shively et al. |
| 2025/0033628 A1 | 1/2025 | Shively et al. |
| 2025/0100535 A1 | 3/2025 | Shively et al. |
| 2025/0100536 A1 | 3/2025 | Shively et al. |

FOREIGN PATENT DOCUMENTS

| | | |
|---|---|---|
| CN | 118372636 A | 7/2024 |
| EP | 3 580 083 A1 | 12/2019 |
| KR | 102655785 B1 | 4/2024 |
| KR | 102687057 B1 | 7/2024 |
| KR | 20240175196 A | 12/2024 |
| WO | WO-2021/072124 A2 | 4/2021 |
| WO | WO-2024/220938 A1 | 10/2024 |

OTHER PUBLICATIONS

Emergency One—Fire & Rescue Emergency Vehicles, 22pps., printed on Apr. 26, 2022 from URL: https://e1group.co.uk/e1-evo.

Yang, Yinye, Integrated Electro-Mechanical Transmission Systems in Hybrid Electric Vehicles, IEEE, Sep. 2011.

* cited by examiner

| | Startability % (20% Target) | Speed on 6% Grade (mph) | Speed on 0.25% Grade (mph) | %Grade @ 50 mph | %Grade @ 20 mph | 0 - 35 mph Time (sec) |
|---|---|---|---|---|---|---|
| X12-500 | 82 | 49.7 | 74.9 | 5.9 | 18.6 | 9.6 |
| L9-450 | 44 | 43.8 | 70.4 | 5.1 | 14 | 11.1 |
| AXE100D 310kW 550 V Cont | 19.6 | 48.0 | 84.0 | 5.7 | 17.7 | 9.3 |
| AXE100D 310kW 550 V Peak | 40.3 | 48.0 | 88.0 | 5.7 | 17.7 | 8.7 |
| AXE100D Continuous | 41 | 53.7 | 86.6 | 6.8 | 20.7 | 9.0 |
| AXE100D Peak | 56 | 73.9 | 106 | 13.2 | 35.7 | 5.4* |

FIG. 34

|  | Startability % (20% Target) | 0 - 35 mph Time (sec) | 0 - 65 mph Time (sec) |
|---|---|---|---|
| Enforcer X12-500 | 82 | 9.6 | 36 |
| Enforcer L9-450 | 44 | 11.1 | 44 |
| 14XE Continuous | 15 | 18.9 | 92.7 |
| 14XE Peak | 30 | 11.2 | 53.5 |

|  | Startability % (20% Target) | 0 - 35 mph Time (sec) | 0 - 65 mph Time (sec) |
|---|---|---|---|
| Enforcer X12-500 | 82 | 9.6 | 36 |
| Enforcer L9-450 | 44 | 11.1 | 44 |
| Eaton MD + 250kW | 33 | 13.5 | 55 |

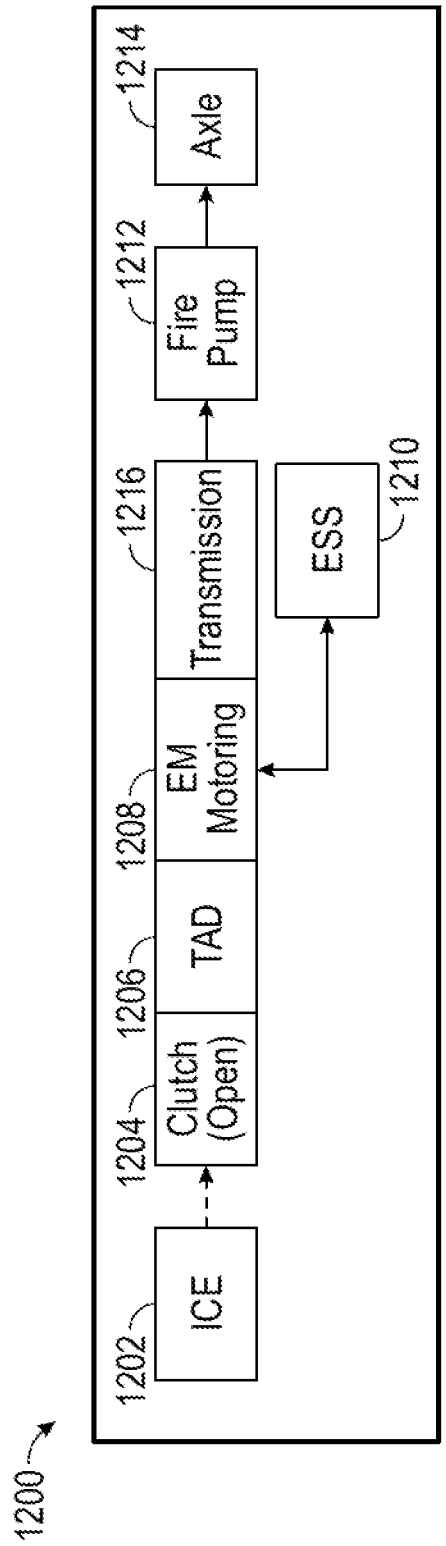
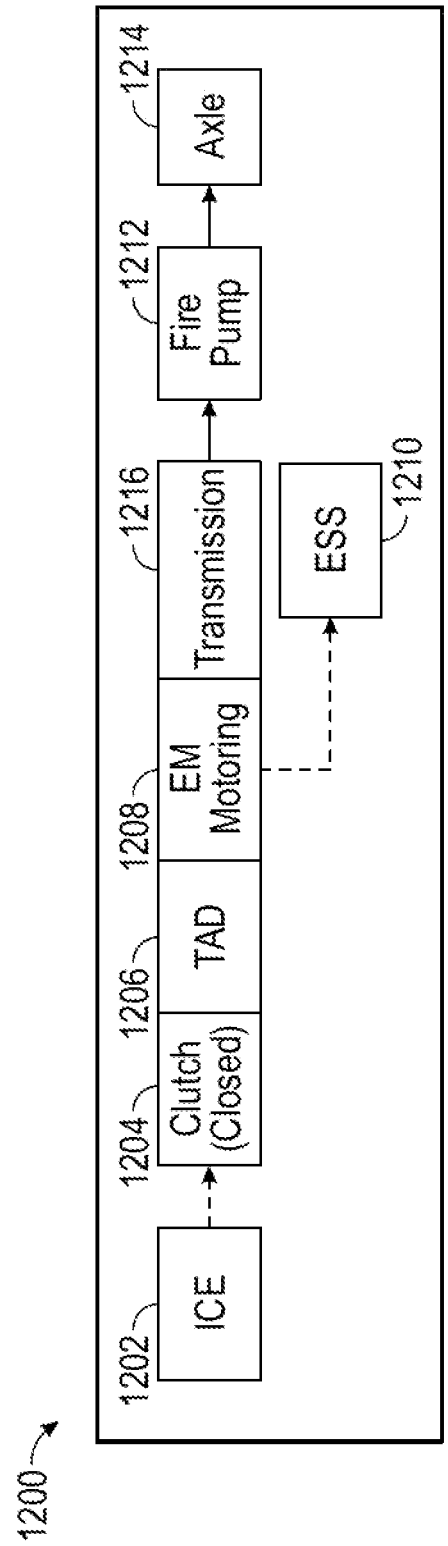

CHARGING SYSTEM FOR A FIRE FIGHTING VEHICLE

CROSS-REFERENCE TO RELATED PATENT APPLICATIONS

This application claims the benefit of and priority to (i) U.S. Provisional Patent Application No. 63/184,415, filed May 5, 2021, (ii) U.S. Provisional Patent Application No. 63/184,418, filed May 5, 2021, (iii) U.S. Provisional Patent Application No. 63/184,516, filed May 5, 2021, (iv) U.S. Provisional Patent Application No. 63/184,518, filed May 5, 2021, and (v) U.S. Provisional Patent Application No. 63/250,676, filed Sep. 30, 2021, all of which are incorporated herein by reference in their entireties.

BACKGROUND

A fire fighting vehicle is a specialized vehicle designed to respond to fire scenes that can include various components to assist fire fighters with battling and extinguishing fires. Such components can include a pumping system, an onboard water tank, and an aerial ladder. Fire fighting vehicles traditionally include an internal combustion engine that provides power to both drive the vehicle and well as to drive the various components of the vehicle to facilitate the operation thereof.

SUMMARY

One embodiment relates to a fire fighting vehicle. The fire fighting vehicle includes a chassis, an energy storage system coupled to the chassis, and a charging assembly configured to interface with a charging plug of an external power source. The energy storage system includes a plurality of battery cells. The charging assembly includes a housing, a charging port disposed within the housing and electrically coupled to the plurality of battery cells, a retainer positioned proximate the charging port, a first actuator, and a second actuator. The charging port is configured to engage with a charging interface of the charging plug. The retainer is configured to engage with a retaining interface of the charging plug to secure the charging interface within the charging port. The first actuator is positioned to release the retaining interface from engagement with the retainer by repositioning the retaining interface into a release position. The second actuator is positioned to eject the charging plug from the charging assembly when the retaining interface is in the release position.

Another embodiment relates to a vehicle. The vehicle includes an energy storage system, a charging port, a disconnect system, and a control system. The charging port is electrically coupled to the energy storage system. The charging port is configured to engage with a charging interface of a charging plug. The disconnect system is configured to facilitate ejecting the charging plug from the charging port. The control system is configured to (i) receive dispatch data indicating that the vehicle is being dispatched and (ii) initiate a vehicle start sequence and control the disconnect system to eject the charging plug from the charging port in response to receiving the dispatch data.

Still another embodiment relates to a vehicle. The vehicle includes an energy storage system, a charging port, a sensor, a disconnect system, an operator input, and a control system. The charging port is electrically coupled to the energy storage system. The charging port is configured to engage with a charging interface of a charging plug of an external power source. The sensor is configured to detect engagement of the charging plug with the charging port. The disconnect system is configured to facilitate ejecting the charging plug from the charging port. The operator input is configured to facilitate manual activation of the disconnect system. The control system is configured to control the disconnect system to disconnect the charging plug from the charging port in response to receiving a disconnect signal from the operator input, control the disconnect system to disconnect the charging plug from the charging port in response to the vehicle being at least one of started or put into drive by an operator, initiate a vehicle start sequence in response to receiving a sensor signal from the sensor indicating that the charging plug was disconnected from the charging port, prevent driving of the vehicle in response to the sensor signal indicating that the charging plug is connected to the charging port, and at least one of (i) initiate the vehicle start sequence or (ii) control the disconnect system to disconnect the charging plug from the charging port in response to receiving dispatch data indicating that the vehicle is being dispatched to a scene.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 34 is a table providing different properties of the fire fighting vehicle of FIG. 1 having the E-axle driveline of FIGS. 31-33, according to an exemplary embodiment.

FIG. 46 is a schematic diagram of an integrated generator/motor driveline in a first mode, according to an exemplary embodiment.

FIG. 47 is a schematic diagram of the integrated generator/motor driveline of FIG. 46 in a second mode, according to an exemplary embodiment.

DETAILED DESCRIPTION

Figure 1:
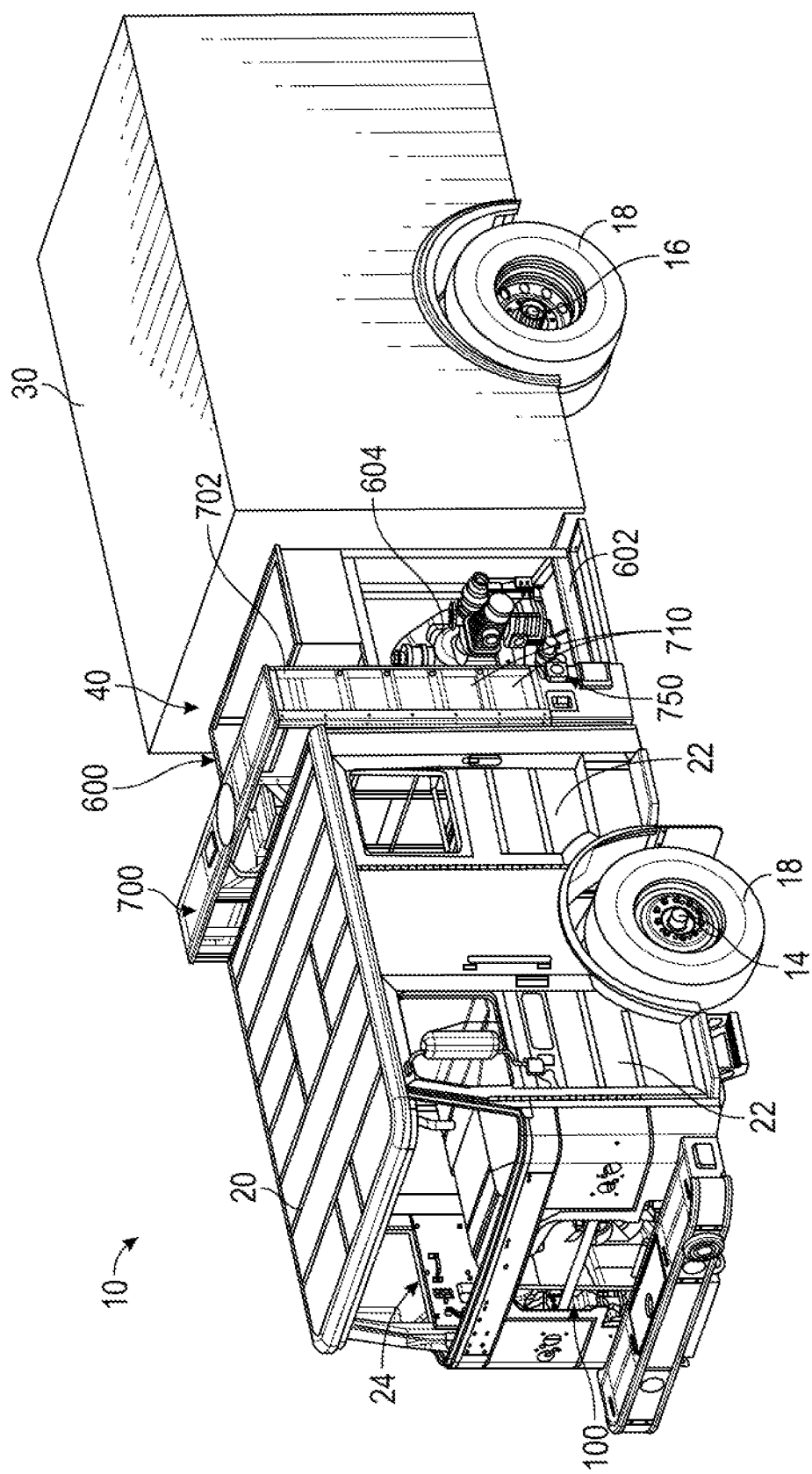
FIG. 1 is a front, left perspective view of a fire fighting vehicle, according to an exemplary embodiment.
Figure 2:
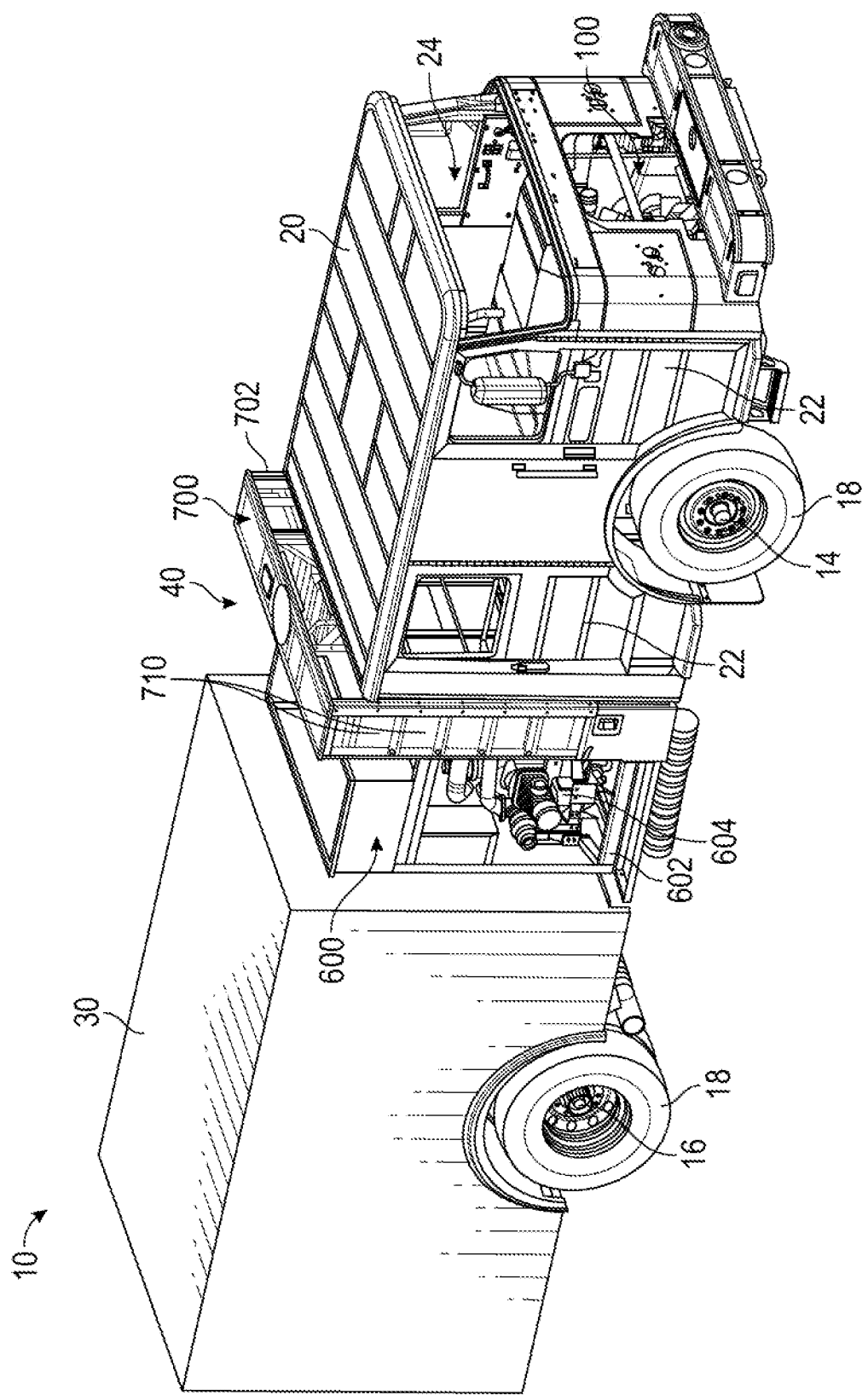
FIG. 2 is a front, right perspective view of the fire fighting vehicle of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a fire fighting vehicle, etc.) of the present disclosure includes a front axle, a rear axle, and a driveline having an engine, an electromechanical transmission, an energy storage system, a clutched accessory drive positioned between the engine and the electromechanical transmission, a subsystem (e.g., a pump system, an aerial ladder assembly, etc.) coupled to the electromechanical transmission, and at least one of the front axle or the rear axle coupled to the electromechanical transmission. In one embodiment, the driveline is configured a non-hybrid or "dual drive" driveline where electromechanical transmission does not generate energy for storage by the energy storage system. Rather, the energy storage system is chargeable from an external power source and not chargeable using the electromechanical transmission. In such a dual drive configuration, (i) the engine may mechanically drive (a) the clutched accessory drive directly and/or (b) the subsystem, the front axle, and/or the rear axle through the electromechanical transmission, (ii) the electromechanical transmission may mechanically drive (a) the clutched accessory drive, (b) the subsystem, (c) the front axle, and/or (d) the rear axle using stored energy in the energy storage system, or (iii) the engine may mechanically drive (a) the clutched accessory drive and (b) the electromechanical transmission directly and the electromechanical transmission may (a) generate electricity and (b) use the generated electricity (and, optionally, the stored electricity) to mechanically drive the subsystem, the front axle, and/or the rear axle. In another embodiment, the driveline is configured as a "hybrid" driveline where the electromechanical transmission is driven by the engine and generates energy for storage by the energy storage system.

According to an exemplary embodiment, the driveline is designed, arranged, and packaged such that the vehicle looks and operates identical or substantially identical to a non-electrified predecessor of the vehicle (i.e., an internal combustion engine only driven predecessor). Maintaining the looks and controls between the vehicle and its predecessor allows for easier adaptation of electrified vehicles into consumer fleets by mitigating the need for operators to learn a new control interface for controlling the vehicle and learn a new component/compartment layout, which leads to increased consumer satisfaction and vehicle uptime.

According to an exemplary embodiment, the vehicle includes a control system that is configured to operate the driveline in a plurality of modes of operations. The plurality of modes of operation (depending on whether the driveline is a "dual drive" driveline, is a "hybrid" driveline," or operable as a "dual drive" and a "hybrid" driveline) can include a pure engine mode, a pure electric mode, a charging mode, an electric generation drive mode, a boost mode, a distributed drive mode, a roll-out mode, a roll-in mode, a stop-start mode, a location tracking mode, a scene mode, a pump-and-roll mode, and/or still other modes, as described in greater detail herein.

According to an exemplary embodiment, the vehicle includes a charging assembly configured to interface with a charging plug to facilitate coupling the energy storage system to an external power source (e.g., a high voltage power source, etc.). The charging assembly includes a charging port, a retainer, and a disconnect system. The charging port is configured to interface with (e.g., receive, etc.) a charging interface of the charging plug and the retainer is configured to interface with a retaining interface (e.g., a latch, etc.) of the plug to prevent inadvertent disengagement of the charging interface from the charging port. Such retention, however, can lead to instances where an operator forgets to disconnect the charging plug from the charging assembly and drives away, but the charging plug does not disconnect, potentially causing damage to the charging plug and/or the external power source, as well as potentially causing a high voltage output being exposed to the surrounding environment. In some embodiments, the disconnect system includes one or more actuators controllable by the control system to facilitate ejecting the charging plug under various circumstances. In some embodiments, the control system is configured to prevent the vehicle from starting and/or driving away if the charging plug is connected thereto. In some embodiments, the control system is configured to prepare the vehicle to respond to a scene by performing a start sequence and/or ejecting the charging plug without requiring operator input.

Overall Vehicle

According to the exemplary embodiment shown in FIGS. 1-6, a machine, shown vehicle 10, is configured as a fire fighting vehicle. In the embodiment shown, the fire fighting vehicle is a pumper fire truck. In another embodiment, the fire fighting vehicle is an aerial ladder truck. The aerial ladder truck may include a rear-mount aerial ladder or a mid-mount aerial ladder. In some embodiments, the aerial ladder truck is a quint fire truck. In other embodiments, the aerial ladder truck is a tiller fire truck. In still another embodiment, the fire fighting vehicle is an airport rescue fire fighting ("ARFF") truck. In various embodiments, the fire fighting vehicle (e.g., a quint, a tanker, an ARFF, etc.) includes an on-board water storage tank, an on-board agent storage tank, and/or a pumping system. In other embodiments, the fire fighting vehicle is still another type of fire fighting vehicle. In an alternative embodiment, the vehicle 10 is another type of vehicle other than a fire fighting vehicle. For example, the vehicle 10 may be a refuse truck, a concrete mixer truck, a military vehicle, a tow truck, an ambulance, a farming machine or vehicle, a construction machine or vehicle, and/or still another vehicle.

As shown in FIGS. 1-26, the vehicle 10 includes a chassis, shown as a frame 12; a plurality of axles, shown as front axle 14 and rear axle 16, supported by the frame 12 and that couple a plurality of tractive elements, shown as wheels 18, to the frame 12; a cab, shown as front cabin 20, supported by the frame 12; a body assembly, shown as a rear section 30, supported by the frame 12 and positioned rearward of the front cabin 20; and a driveline (e.g., a powertrain, a drivetrain, an accessory drive, etc.), shown as driveline 100. While shown as including a single front axle 14 and a single rear axle 16, in other embodiments, the vehicle 10 includes two front axles 14 and/or two rear axles 16. In an alternative embodiment, the tractive elements are otherwise structured (e.g., tracks, etc.).

According to an exemplary embodiment, the front cabin 20 includes a plurality of body panels coupled to a support (e.g., a structural frame assembly, etc.). The body panels may define a plurality of openings through which an operator accesses an interior 24 of the front cabin 20 (e.g., for ingress, for egress, to retrieve components from within, etc.). As shown in FIGS. 1,2, 4, and 5, the front cabin 20 includes a plurality of doors, shown as doors 22, positioned over the plurality of openings defined by the plurality of body panels. The doors 22 may provide access to the interior 24 of the front cabin 20 for a driver and/or passengers of the vehicle 10. The doors 22 may be hinged, sliding, or bus-style folding doors.

The front cabin 20 may include components arranged in various configurations. Such configurations may vary based on the particular application of the vehicle 10, customer requirements, or still other factors. The front cabin 20 may be configured to contain or otherwise support a number of occupants, storage units, and/or equipment. For example, the front cabin 20 may provide seating for an operator (e.g., a driver, etc.) and/or one or more passengers of the vehicle 10. The front cabin 20 may include one or more storage areas for providing compartmental storage for various articles (e.g., supplies, instrumentation, equipment, etc.). The interior 24 of the front cabin 20 may further include a user interface (e.g., user interface 820, etc.). The user interface may include a cabin display and various controls (e.g., buttons, switches, knobs, levers, joysticks, etc.). In some embodiments, the user interface within the interior 24 of the front cabin 20 further includes touchscreens, a steering wheel, an accelerator pedal, and/or a brake pedal, among other components. The user interface may provide the operator with control capabilities over the vehicle 10 (e.g., direction of travel, speed, etc.), one or more components of driveline 100, and/or still other components of the vehicle 10 from within the front cabin 20.

In some embodiments, the rear section 30 includes a plurality of compartments with corresponding doors positioned along one or more sides (e.g., a left side, right side, etc.) and/or a rear of the rear section 30. The plurality of compartments may facilitate storing various equipment such as oxygen tanks, hoses, axes, extinguishers, ladders, chains, ropes, straps, boots, jackets, blankets, first-aid kits, and/or still other equipment. One or more of the plurality of compartments may include various storage apparatuses (e.g., shelving, hooks, racks, etc.) for storing and organizing the equipment.

In some embodiments (e.g., when the vehicle 10 is an aerial ladder truck, etc.), the rear section 30 includes an aerial ladder assembly. The aerial ladder assembly may have a fixed length or may have one or more extensible ladder sections. The aerial ladder assembly may include a basket or implement (e.g., a water turret, etc.) coupled to a distal or free end thereof. The aerial ladder assembly may be positioned proximate a rear of the rear section 30 (e.g., a rear-mount fire truck) or proximate a front of the rear section 30 (e.g., a mid-mount fire truck).

In some embodiments (e.g., when the vehicle 10 is an ARFF truck, a tanker truck, a quint truck, etc.), the rear section 30 includes one or more fluid tanks. By way of example, the one or more fluid tanks may include a water tank and/or an agent tank. The water tank and/or the agent tank may be corrosion and UV resistant polypropylene tanks. In a municipal fire truck implementation (i.e., a non-ARFF truck implementation), the water tank may have a maximum water capacity ranging between 50 and 1000 gallons (e.g., 50, 100, 150, 200, 250, 300, 350, 400, 450, 500, 550, 600, 650, 700, 750, 800, 850, 900, 950, 1000, etc. gallons). In an ARRF truck implementation, the water tank may have a maximum water capacity ranging between 1,000 and 4,500 gallons (e.g., at least 1,250 gallons; between 2,500 gallons and 3,500 gallons; at most 4,500 gallons; at most 3,000 gallons; at most 1,500 gallons; etc.). The agent tank may have a maximum agent capacity ranging between 25 and 750 gallons (e.g., 25, 50, 75, 100, 150, 200, 250, 300, 350, 400, 450, 500, 550, 600, 650, 700, 750, etc. gallons). According to an exemplary embodiment, the agent is a foam fire suppressant, an aqueous film forming foam ("AFFF"). A low-expansion foam, a medium-expansion foam, a high-expansion foam, an alcohol-resistant foam, a synthetic foam, a protein-based foams, a fluorine-free foam, a film-forming fluoro protein ("FFFP") foam, an alcohol resistant aqueous film forming foam ("AR-AFFF"), and/or still another suitable foam or a foam yet to be developed. The capacity of the water tank and/or the agent tank may be specified by a customer. It should be understood that water tank and the agent tank configurations are highly customizable, and the scope of the present disclosure is not limited to a particular size or configuration of the water tank and the agent tank.

Driveline

As shown in FIGS. 1-26, the driveline 100 includes an engine assembly, shown as engine system 200, coupled to the frame 12; a clutched transmission accessory drive ("TAD") including a first component, shown as clutch 300, coupled to the engine system 200 and a second component (e.g., an accessory module, etc.), shown as TAD 400, coupled to the clutch 300; an electromechanical transmission or electromechanical transmission device ("ETD"), shown as ETD 500, coupled to the TAD 400; one or more subsystems including a first subsystem, shown as pump system 600, coupled to the frame 12 and the ETD 500; and an on-board energy storage system ("ESS"), shown as ESS 700, coupled to the frame 12 and electrically coupled to the ETD 500. According to an exemplary embodiment, the engine system 200, the clutch 300, the ETD 500, and/or the ESS 700 are controllable to drive the vehicle 10, the TAD 400, the pump system 600, and/or other accessories or components of the vehicle 10 (e.g., an aerial ladder assembly, etc.).

In one embodiment, the driveline 100 is configured or selectively operable as a non-hybrid or "dual drive" driveline where the ETD 500 is configured or controlled such that the ETD 500 does not generate electricity for storage in the ESS 700. By way of example, the driveline 100 may be operable in a pure electric mode where the engine system 200 is turned off and the ETD 500 uses stored energy from the ESS 700 to drive one or more component of the vehicle 10 (e.g., the front axle 14, the rear axle 16, the pump system 600, an aerial ladder assembly, the TAD 400, etc.). By way of another example, the driveline 100 may be operable in a pure engine mode where the ETD 500 functions as a mechanical conduit or power divider between the engine system 200 and one or more components of the vehicle 10 (e.g., the front axle 14, the rear axle 16, the pump system 600, an aerial ladder assembly, etc.) when the engine system 200 is in operation. By way of yet another example, the driveline 100 may be operable in an electric generation drive mode where the engine system 200 drives the ETD 500 to generate electricity and the ETD 500 uses the generated electricity to drive one or more component of the vehicle 10 (e.g., the front axle 14, the rear axle 16, the pump system 600, an aerial ladder assembly, etc.). By way of yet another example, the driveline 100 may be operable in a boost mode that is similar to the electric generation drive mode, but the ETD 500 draws additional power from the ESS 700 to supplement the generated electricity. By way of still yet another example, the driveline 100 may be operable in distributed drive mode where both the engine system 200 and the ETD 500 are simultaneously operable to drive one or more components of the vehicle 10 (i.e., the engine system 200 consumes fuel in a fuel tank and the ETD 500 consumes stored energy in the ESS 700). For example, the engine system 200 may drive the TAD 400 and the ETD 500 may drive the front axle 14, the rear axle 16, the pump system 600, and/or an aerial ladder assembly. In such operation, the ETD 500 may include an ETD clutch that facilitates decoupling the ETD 500 from the TAD 400. In another embodiment, the driveline 100 is configured or selectively operable as a "hybrid" driveline where the ETD 500 is configured or controlled such that the ETD 500 generates electricity for storage in the ESS 700. By way of example, the driveline 100 may be operable in a charging mode where the engine system 200 drives the ETD 500 to generate electricity for storage in the ESS 700 and, optionally, to power one or more electrically-operated accessories or components of the vehicle 10 and/or for use by the ETD 500 to drive one or more component of the vehicle 10 (e.g., the front axle 14, the rear axle 16, the pump system 600, an aerial ladder assembly, etc.).

Engine System

As shown in FIGS. 3 and 8-12, the engine system 200 is coupled to the frame 12 and positioned beneath the front cabin 20. In another embodiment, the engine system 200 is otherwise positioned (e.g., beneath or within the rear section 30, etc.). As shown in FIGS. 13-16, the engine system 200 includes a prime mover, shown as engine 202, and a first cooling assembly, shown as engine cooling system 210. According to an exemplary embodiment, the engine 202 is a compression-ignition internal combustion engine that utilizes diesel fuel. In alternative embodiments, the engine 202 is a spark-ignition engine that utilizes one of a variety of fuel types (e.g., gasoline, compressed natural gas, propane, etc.).

As shown in FIGS. 13-16, the engine 202 includes a first interface (e.g., a first output, etc.), shown as clutch interface 204, coupled to the clutch 300 (e.g., an input shaft thereof, etc.) and a second interface (e.g., a second output, etc.), shown as cooling system interface 206, coupled to the engine cooling system 210. According to an exemplary embodiment, the clutch 300 is controllable (e.g., engaged, disengaged, etc.) to facilitate selectively mechanically coupling the engine 202 to and selectively mechanically decoupling the engine 202 from the TAD 400. Accordingly, the engine 202 may be operated to drive the TAD 400 when the clutch 300 is engaged to couple the engine 202 to the TAD 400. According to an exemplary embodiment, the engine cooling system 210 includes various components such as a fan, a pulley assembly, a radiator, conduits, etc. to provide cooling to the engine 202. The fan may be coupled to the cooling system interface 206 of the engine 202 (e.g., directly, indirectly via a pulley assembly, etc.) and driven thereby.

Accessory Drive

As shown in FIGS. 13-17, the TAD 400 includes (i) a base or frame, shown as accessory base 402, coupled to a housing, shown as clutch housing 302, of the clutch 300, (ii) a pulley assembly, shown as accessory pulley assembly 404, coupled to (e.g., supported by, extending from, etc.) the accessory base 402, and (iii) a plurality of accessories, shown as accessories 412, coupled to the accessory pulley assembly 404 and supported by the accessory base 402. The accessory pulley assembly 404 includes a plurality of pulleys, shown as accessory pulleys 406, coupled to the accessory base 402 and the accessories 412; a belt, shown as accessory belt 408; and an input pulley, shown as drive pulley 410, coupled to (i) the clutch 300 (e.g., an output shaft thereof, etc.) and (ii) the accessory pulleys 406 by the accessory belt 408. Accordingly, the drive pulley 410 can be selectively driven by the engine 202 through the clutch 300 and, thereby, the engine 202 can selectively drive the accessory pulley assembly 404 to drive the accessories 412. According to an exemplary embodiment, the accessories 412 include an air-conditioning compressor, an air compressor, a power steering pump, and/or an alternator. In some embodiments, the accessories include additional, fewer, and/or different accessories that are capable of being mechanically driven.

Electromechanical Transmission Device

As shown in FIGS. 4, 5, 8, 9, 11, and 12, the ETD 500 is coupled to the frame 12 and positioned beneath the front cabin 20, rearward of the engine 202, the clutch 300, and the TAD 400. In another embodiment, the ETD 500 is otherwise positioned (e.g., beneath or within the rear section 30, etc.). As shown in FIGS. 7 and 15-18, the ETD 500 includes a first interface (e.g., a first input/output, etc.), shown as accessory drive interface 502, coupled to the drive pulley 410 of the TAD 400 (e.g., via an accessory drive shaft, etc.); a second interface (e.g., a second output, etc.), shown as axle interface 504, coupled (e.g., directly, indirectly, etc.) to the front axle 14 (e.g., a front differential thereof via a front drive shaft, etc.) and/or the rear axle 16 (e.g., a rear differential thereof via a rear drive shaft, etc.); and a third interface (e.g., a third output, a power-take-off ("PTO"), etc.), shown as subsystem interface 506, coupled to the pump system 600 (e.g., via a subsystem drive shaft, etc.) and/or a second subsystem 610.

Figure 7:
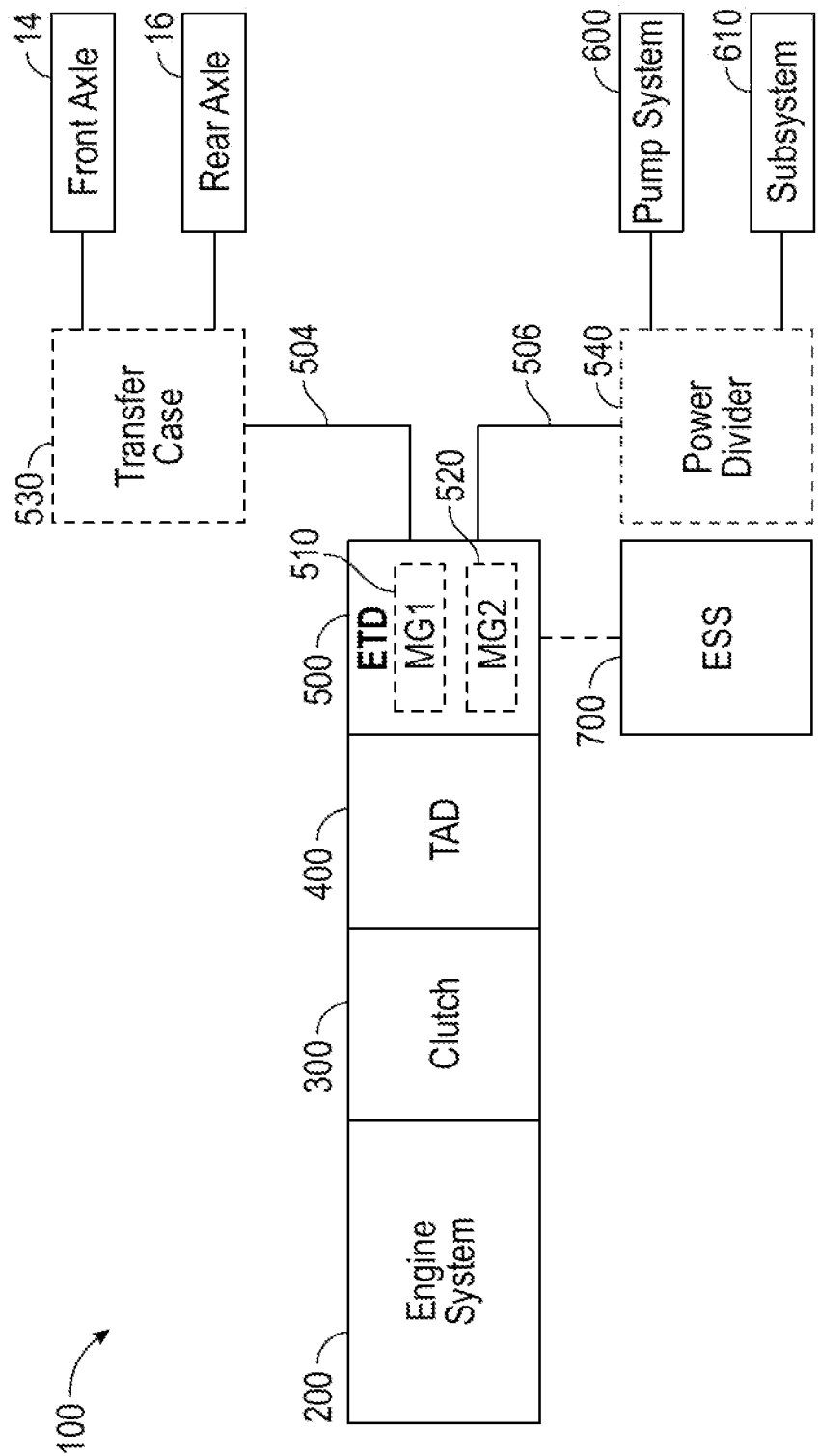
FIG. 7 is a schematic diagram of a driveline of the fire fighting vehicle of FIG. 1 including an engine system, a clutch, an accessory drive, an electromechanical transmission, a pump system, an energy storage system, and one or more driven axles, according to an exemplary embodiment.
Figure 8:
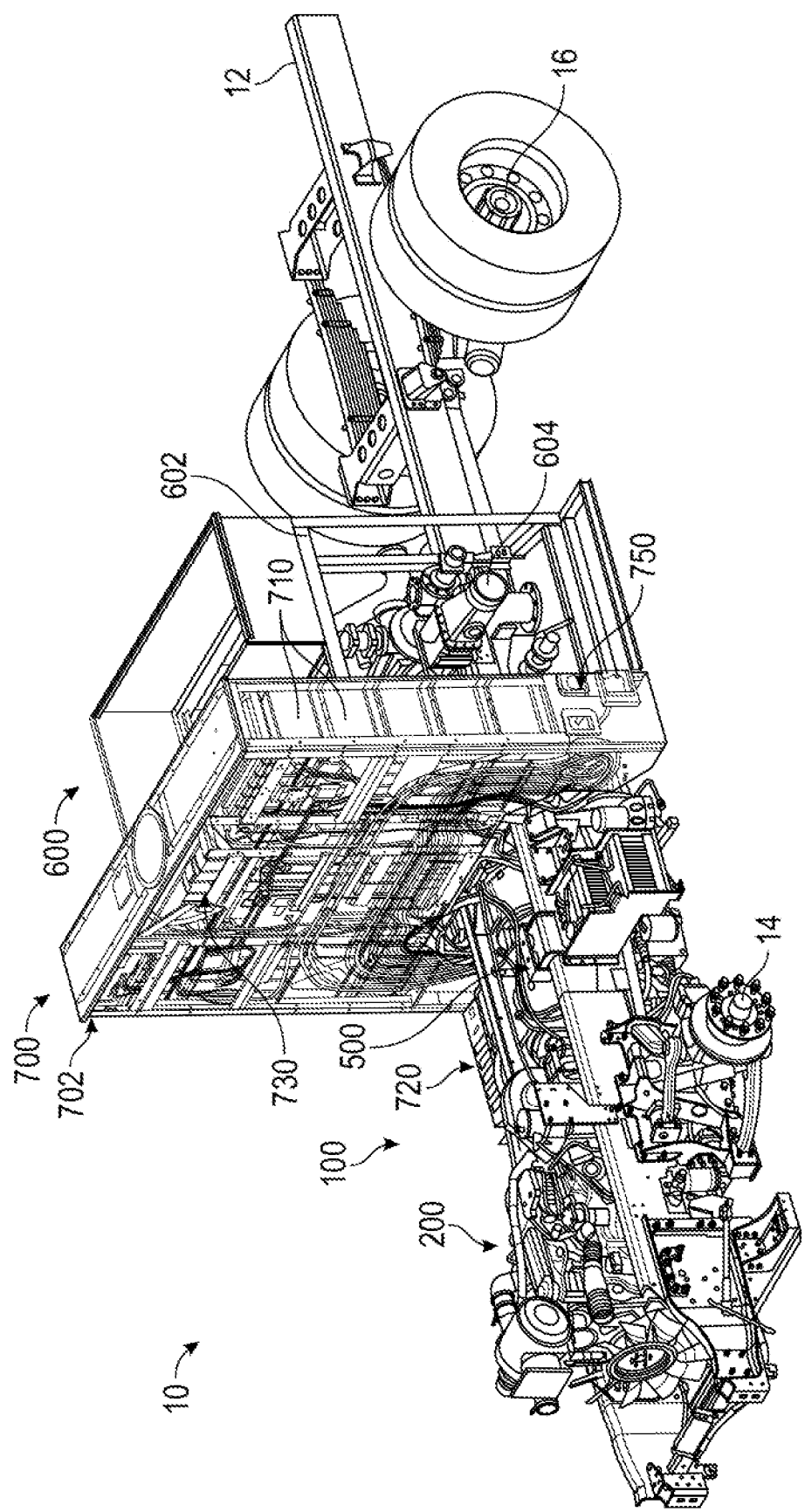
FIG. 8 is a front, left perspective view of a component layout of the driveline of FIG. 7, according to an exemplary embodiment.
Figure 9:
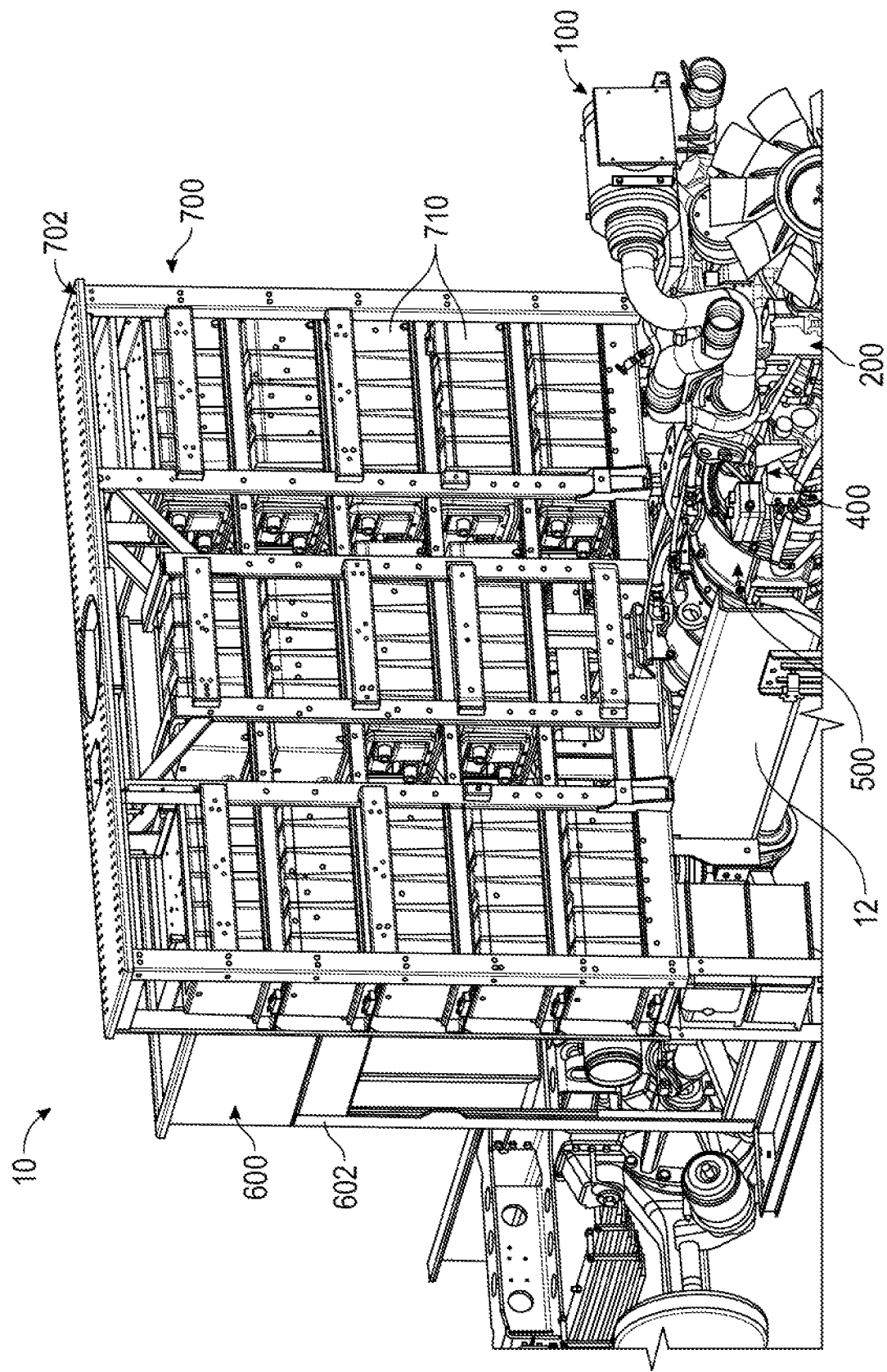
FIG. 9 is a front, right perspective view of the component layout of the driveline of FIG. 7, according to an exemplary embodiment.
Figure 10:
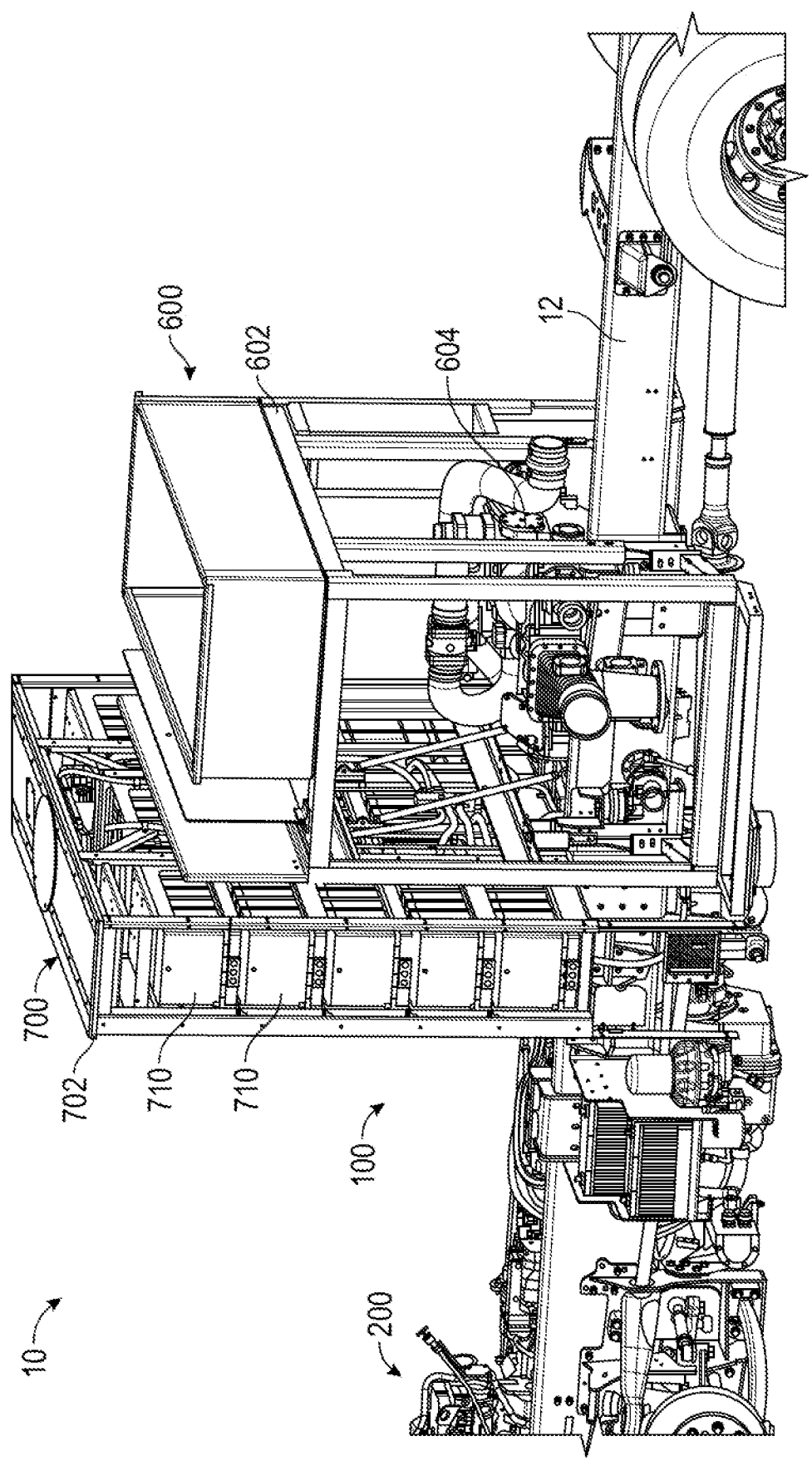
FIG. 10 is a side view of the component layout of the driveline of FIG. 7, according to an exemplary embodiment.
Figure 11:
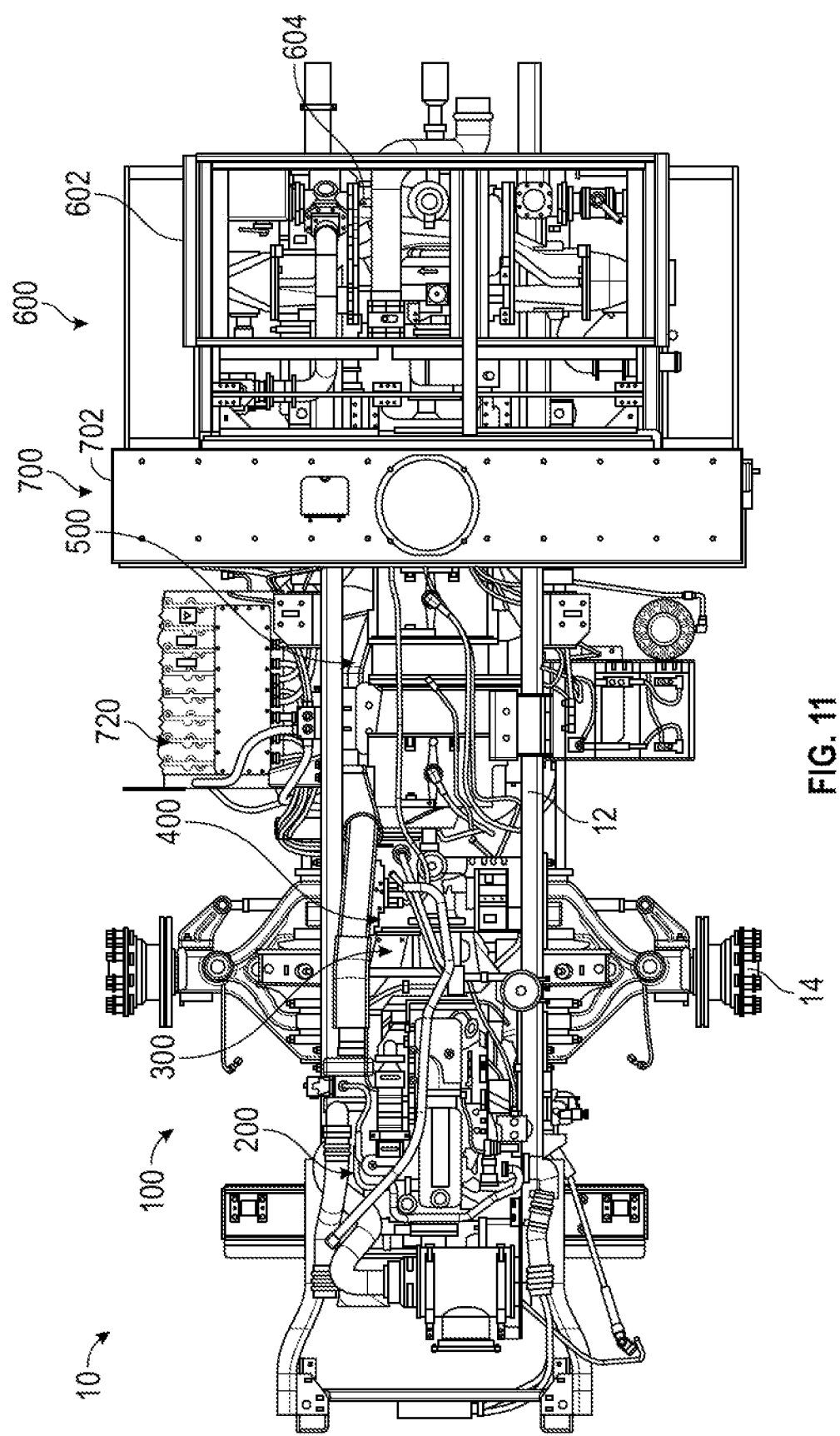
FIG. 11 is a top view of the component layout of the driveline of FIG. 7, according to an exemplary embodiment.
Figure 12:
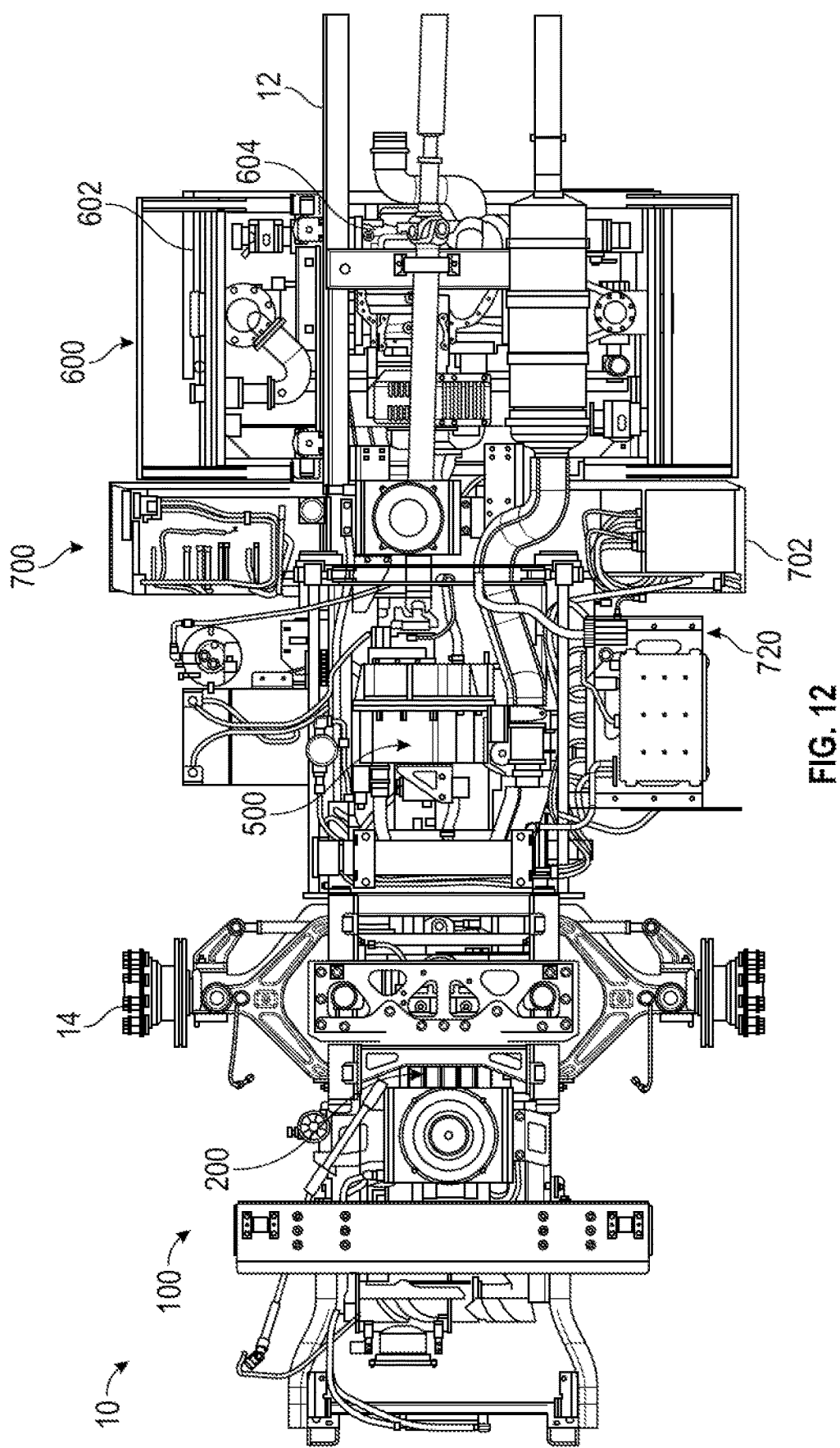
FIG. 12 is a bottom view of the component layout of the driveline of FIG. 7, according to an exemplary embodiment.
Figure 13:
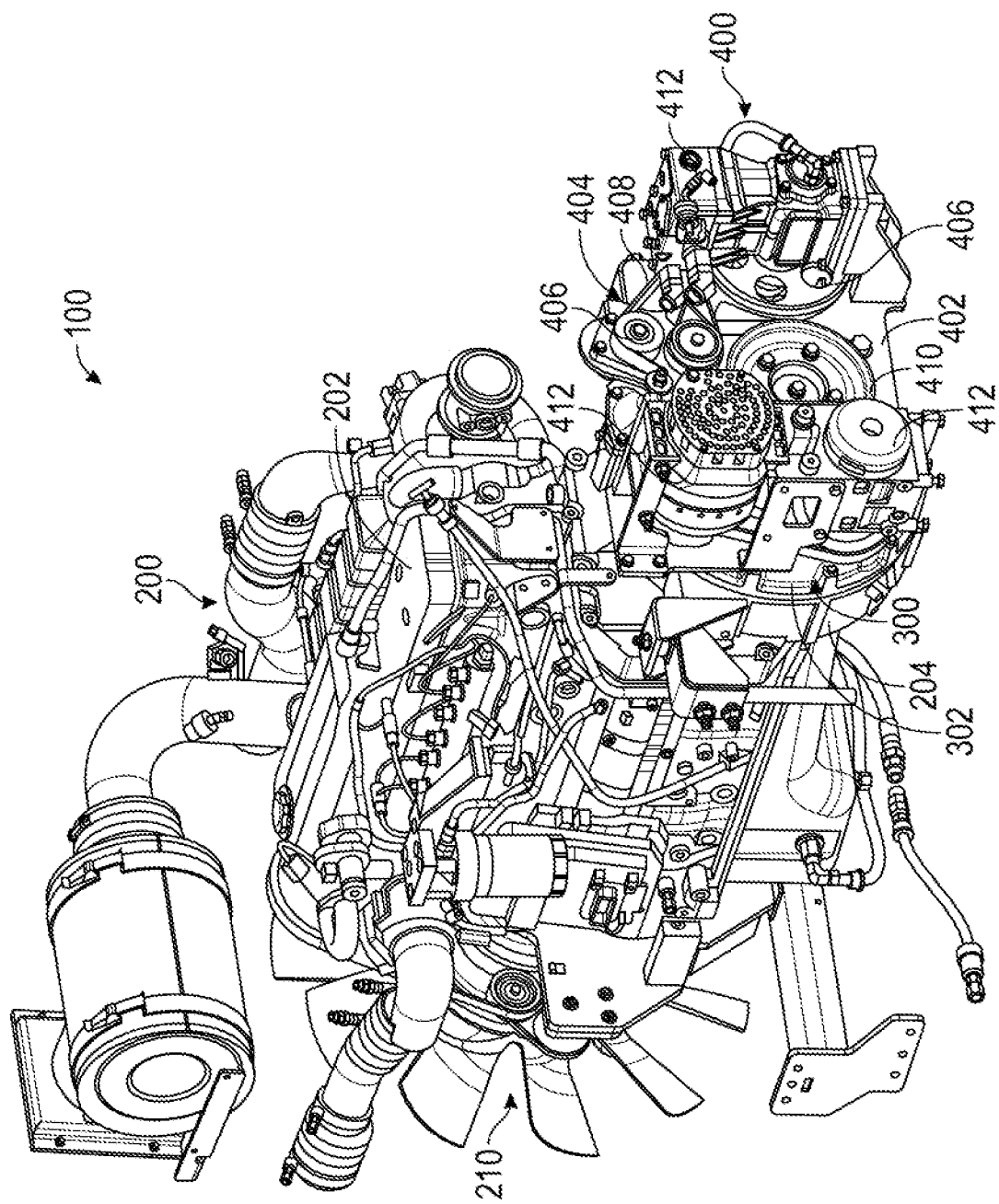
FIGS. 13 and 14 are various perspective views of the engine system, the clutch, and the accessory drive of the driveline of FIG. 7, according to an exemplary embodiment.
Figure 14:
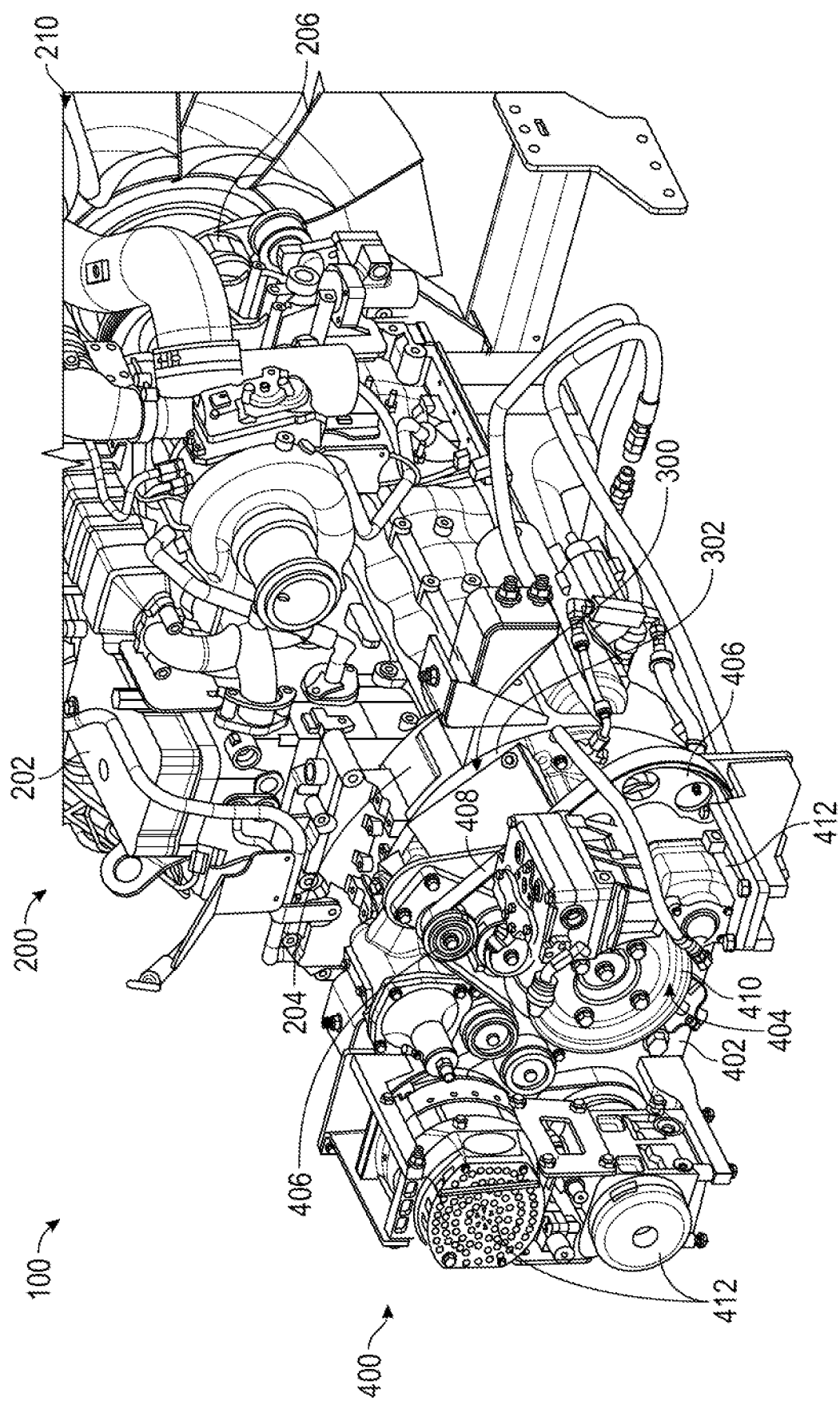
Figure 15:
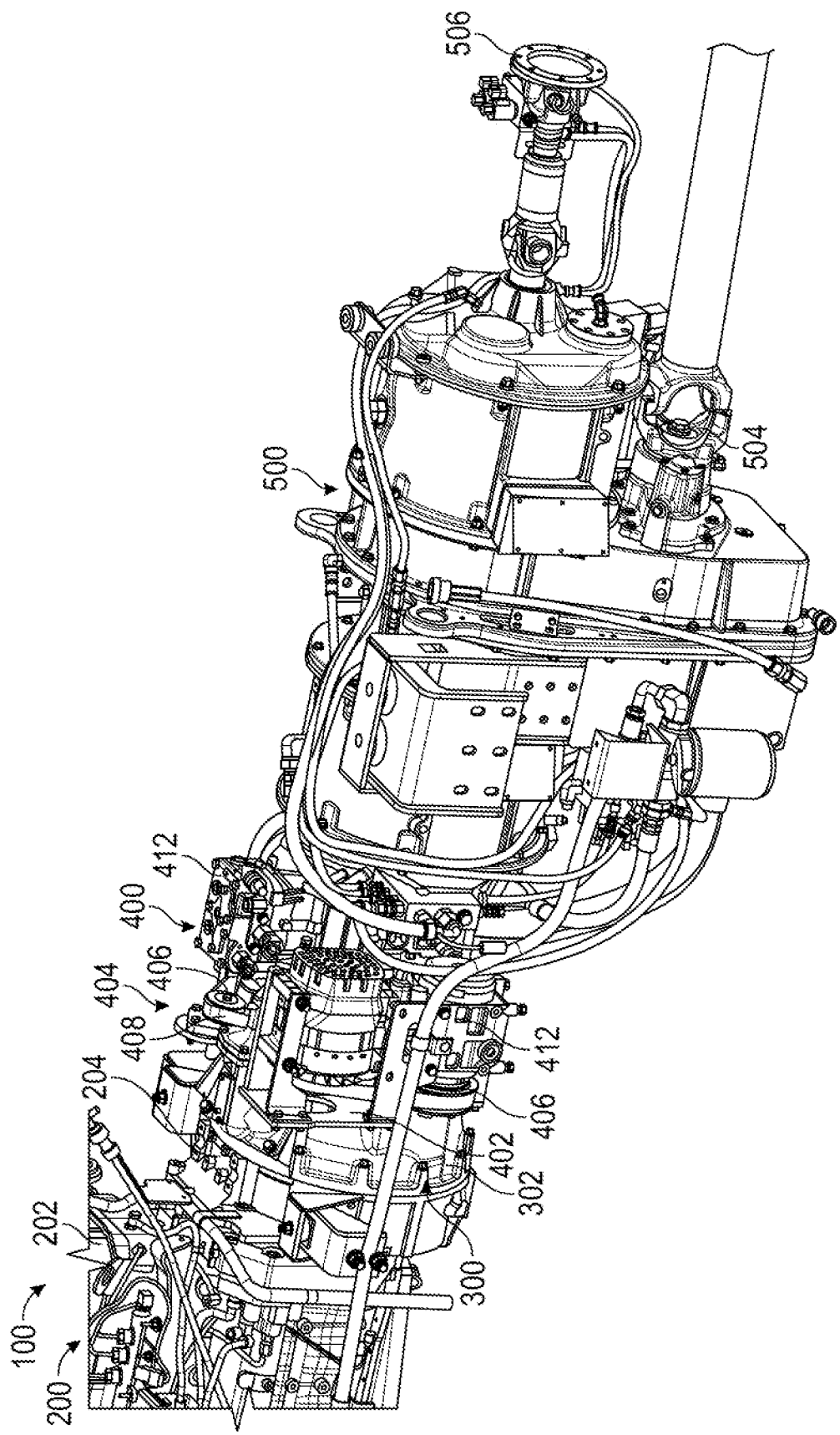
FIGS. 15 and 16 are various perspective views of the engine system, the clutch, the accessory drive, and the electromechanical transmission of the driveline of FIG. 7, according to an exemplary embodiment.
Figure 16:
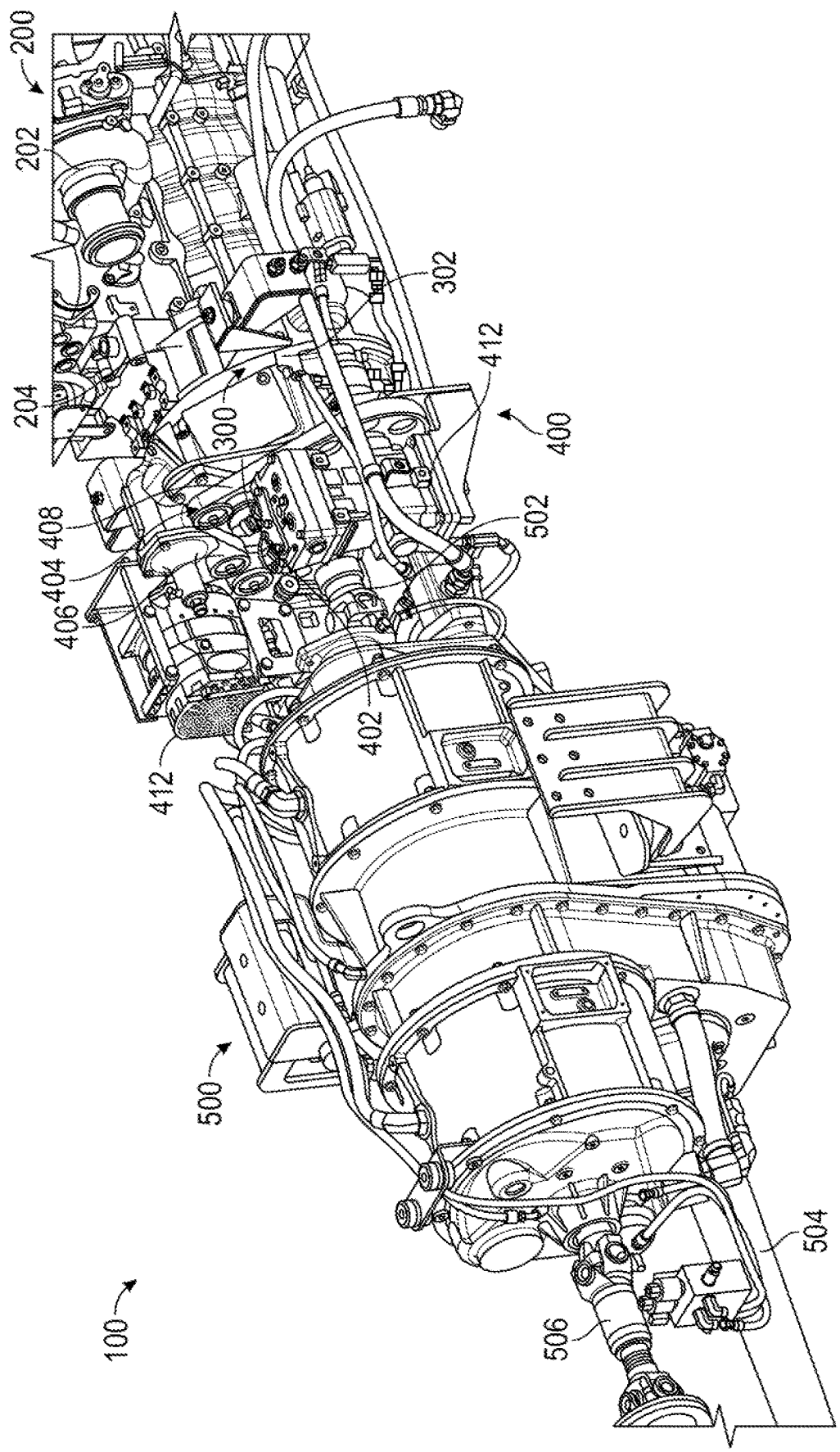
Figure 17:
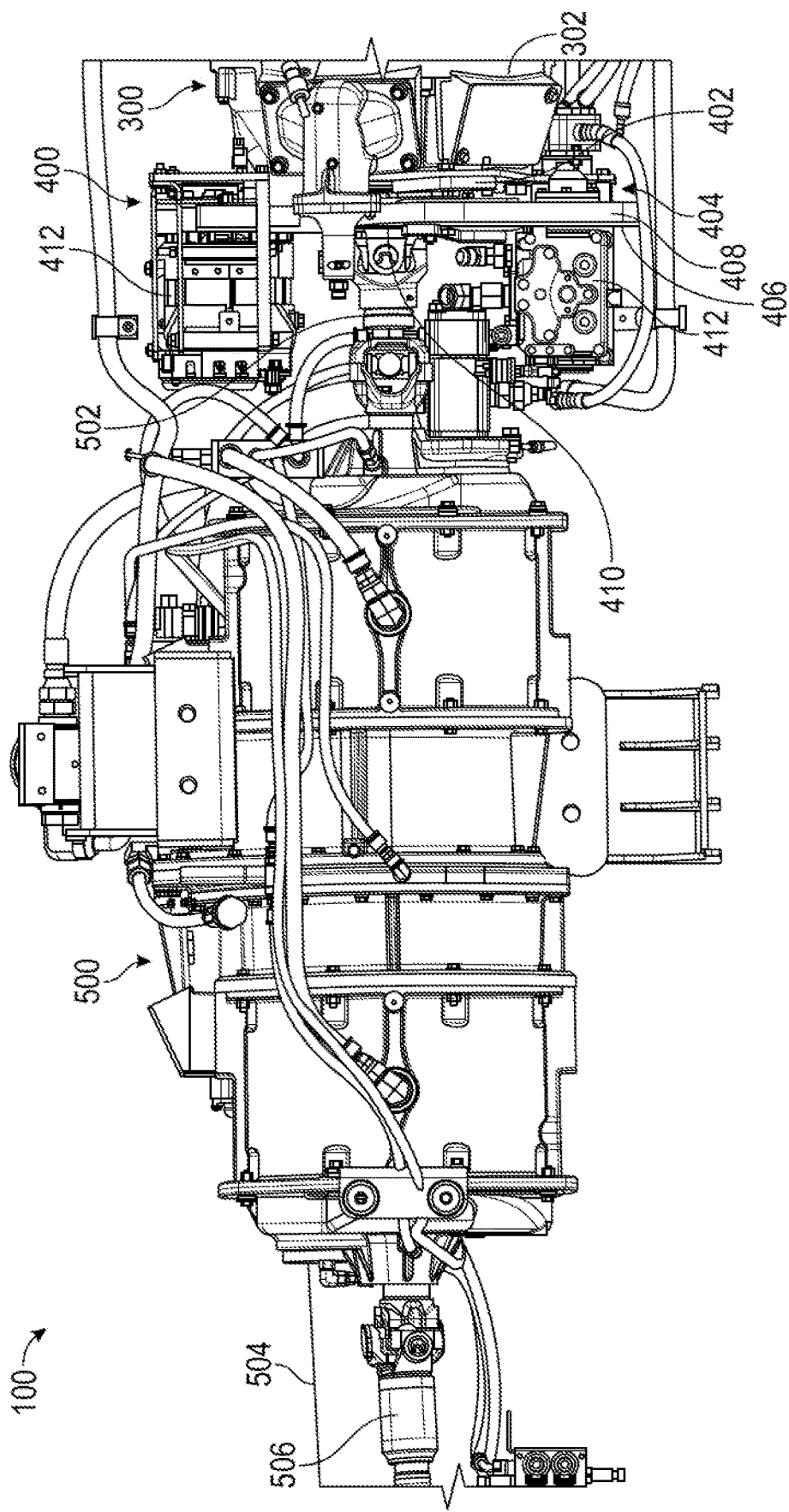
FIG. 17 is a top view of the clutch, the accessory drive, and the electromechanical transmission of the driveline of FIG. 7, according to an exemplary embodiment.

In one embodiment, the axle interface 504 includes a single output directly coupled to the front axle 14 or the rear axle 16 such that only one of the front axle 14 or the rear axle 16 is driven. In another embodiment, the axle interface 504 includes two separate outputs, one directly coupled to each of the front axle 14 and the rear axle 16 such that both the front axle 14 and the rear axle 16 are driven. In some embodiments, as shown in FIG. 7, the driveline 100 includes a first power divider, shown as transfer case 530, and the axle interface 504 includes a single output coupled to an input of the transfer case 530. The transfer case 530 may include a first output coupled to the front axle 14 and a second output coupled to the rear axle 16 to facilitate driving the first axle 14 and the rear axle 16 with the ETD 500. In some embodiments, as shown in FIG. 7, the driveline 100 includes a second power divider, show as power divider 540, and the subsystem interface 506 is coupled to an input of the power divider 540. The power divider 540 may include a plurality of outputs coupled to a plurality of subsystems (e.g., the pump system 600, an aerial ladder assembly, the second subsystem 610, etc.) to facilitate selectively driving each of the plurality of subsystems with the ETD 500. According to an exemplary embodiment, the ETD 500 is configured such that the subsystem interface 506 and the axle interface 504 are speed independent. Therefore, the subsystems (e.g., the pump system 600, the aerial ladder assembly, the second subsystem 610, etc.) can be driven with the ETD 500 at a speed independent of the ground speed of the vehicle 10.

As shown in FIG. 7, the ETD 500 is electrically coupled to the ESS 700. According to an exemplary embodiment, such electrical connection facilitates electrically operating the ETD 500 using stored energy in the ESS 700 to drive the front axle 14, the rear axle 16, the TAD 400, the pump system 600, and/or another subsystem (e.g., the second subsystem 610). In some embodiments (e.g., in embodiments where the driveline 100 is a hybrid driveline or is selectively operable as a hybrid driveline), such electrical coupling facilitates charging the ESS 700 with the ETD 500. As shown in FIGS. 7, 11, 15, and 16, the ETD 500 is selectively coupled to the engine 202 by the clutch 300 and through the TAD 400. Accordingly, the ETD 500 may be selectively driven by the engine 202 when the clutch 300 is engaged. On the other hand, the ETD 500 may be operated using stored energy of the ESS 700 to back-drive the TAD 400 via the accessory drive interface 502 when the clutch 300 is disengaged.

In some embodiments, the ETD 500 functions as a mechanical conduit or power divider, and transmits the mechanical input received from the engine 202 to the pump system 600 (or other subsystem(s)), the front axle 14, and/or the rear axle 16. In some embodiments, the ETD 500 uses the mechanical input to generate electricity for use by the ETD 500 to drive the pump system 600, the front axle 14, and/or the rear axle 16. In some embodiments, the ETD 500 supplements the mechanical input using the stored energy in the ESS 700 to provide an output greater than the input received from the engine 202. In some embodiments, the ETD 500 uses the mechanical input to generate electricity for storage in the ESS 700. In some embodiments, the ETD 500 in not configured to generate electricity for storage in the ESS 700 or is prevented from doing so (e.g., for emissions compliance, a dual drive embodiment, etc.) and, instead, the ESS 700 is otherwise charged (e.g., through a charging station, an external input, regenerative braking, etc.).

According to the exemplary embodiment shown in FIG. 7, the ETD 500 is configured as an electromechanical infinitely variable transmission ("EMIVT") that includes a first electromagnetic device, shown as a first motor/generator 510, and a second electromagnetic device, shown as second motor/generator 520. The first motor/generator 510 and the second motor/generator 520 may be coupled to each other via a plurality of gear sets (e.g., planetary gear sets, etc.). The EMIVT also includes one or more brakes and one or more clutches to facilitate operation of the EMIVT in various modes (e.g., a drive mode, a battery charging mode, a low-range speed mode, a high-range speed mode, a reverse mode, an ultra-low mode, etc.). In some implementations, all of such components may be efficiently packaged in a single housing with only the inputs/outputs thereof exposed.

By way of example, the first motor/generator 510 may be driven by the engine 202 to generate electricity. The electricity generated by the first motor/generator 510 may be used (i) to charge the ESS 700 and/or (ii) to power the second motor/generator 520 to drive the front axle 14, the rear axle 16, the pump system 600, and/or another subsystem coupled thereto. By way of another example, the second motor/generator 520 may be driven by the engine 202 to generate electricity. The electricity generated by the second motor/generator 520 may be used (i) to charge the ESS 700 and/or (ii) to power the first motor/generator 510 to drive the front axle 14, the rear axle 16, the pump system 600, and/or another subsystem coupled thereto. By way of another example, the first motor/generator 510 and/or the second motor/generator 520 may be powered by the ESS 700 to (i) back-start the engine 202 (e.g., such that an engine starter is not necessary, etc.), (ii) drive the TAD 400 (e.g., when the engine 202 is off, when the clutch 300 is disengaged, etc.), and/or (iii) drive the front axle 14, the rear axle 16, the pump system 600, and/or another subsystem coupled thereto. By way of yet another example, the first motor/generator 510 may be driven by the engine 202 to generate electricity and the second motor/generator 520 may receive both the generated electricity from the first motor/generator 510 and the stored energy in the ESS 700 to drive the front axle 14, the rear axle 16, the pump system 600, and/or another subsystem coupled thereto. By way of yet still another example, the second motor/generator 520 may be driven by the engine 202 to generate electricity and the first motor/generator 510 may receive both the generated electricity from the second motor/generator 520 and the stored energy in the ESS 700 to drive the front axle 14, the rear axle 16, the pump system 600, and/or another subsystem coupled thereto. By way of yet still another example, the first motor/generator 510, the second motor/generator 520, the plurality of gear sets, the one or more brakes, and/or the one or more clutches may be controlled such that no electricity is generated or consumed by the ETD 500, but rather the ETD 500 functions as a mechanical conduit or power divider that provides the mechanical input received from the engine 202 to the front axle 14, the rear axle 16, the pump system 600, and/or another subsystem coupled thereto. By way of yet still another example, the ETD 500 may be selectively decoupled from the TAD 400 (e.g., via a clutch of the ETD 500) such that the engine 202 drives the TAD 400 while the ETD 500 simultaneously uses the stored energy in the ESS 700 to drive the front axle 14, the rear axle 16, the pump system 600, and/or another subsystem coupled thereto.

In some embodiments, the first motor/generator 510 and/or the second motor/generator 520 are controlled to provide regenerative braking capabilities. By way of example, the first motor/generator 510 and/or the second motor/generator 520 may be back-driven by the front axle 14 and/or the rear axle 16 though the axle interface 504 during a braking event. The first motor/generator 510 and/or the second motor/generator 520 may, therefore, operate as a generator that generates electricity during the braking event for storage in the ESS 700 and/or to power electronic components of the vehicle 10. In other embodiments, the ETD 500 does not provide regenerative braking capabilities.

Further details regarding the components of the EMIVT and the structure, arrangement, and functionality thereof may be found in (i) U.S. Pat. No. 8,337,352, filed Jun. 22, 2010, (ii) U.S. Pat. No. 9,651,120, filed Feb. 17, 2015, (iii) U.S. Pat. No. 10,421,350, filed Oct. 20, 2015, (iv) U.S. Pat. No. 10,584,775, filed Aug. 31, 2017, (v) U.S. Patent Publication No. 2017/0370446, filed Sep. 7, 2017, (vi) U.S. Pat. No. 10,578,195, filed Oct. 4, 2017, (vii) U.S. Pat. No. 10,982,736, filed Feb. 17, 2019, and (viii) U.S. Pat. No. 11,137,053, filed Jul. 14, 2020, all of which are incorporated herein by reference in their entireties. In other embodiments, the ETD 500 includes a device or devices different than the EMIVT (e.g., an electronic transmission, a motor and/or generator, a motor and/or generator coupled to a transfer case, an electronic axle, etc.).

Pump System

Figure 18:
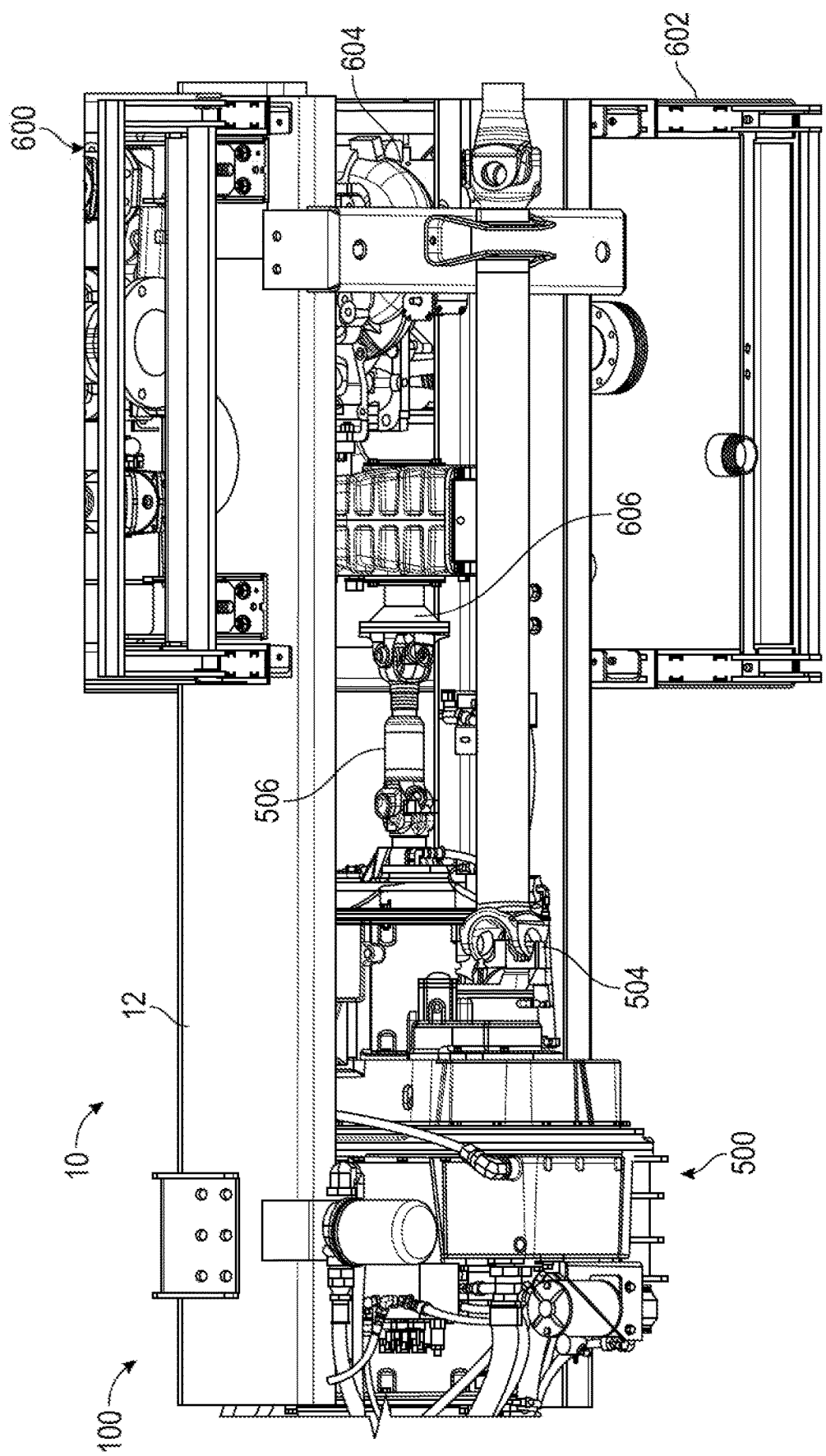
FIG. 18 is a bottom perspective view of the electromechanical transmission and the pump system of the driveline of FIG. 7, according to an exemplary embodiment.
Figure 19:
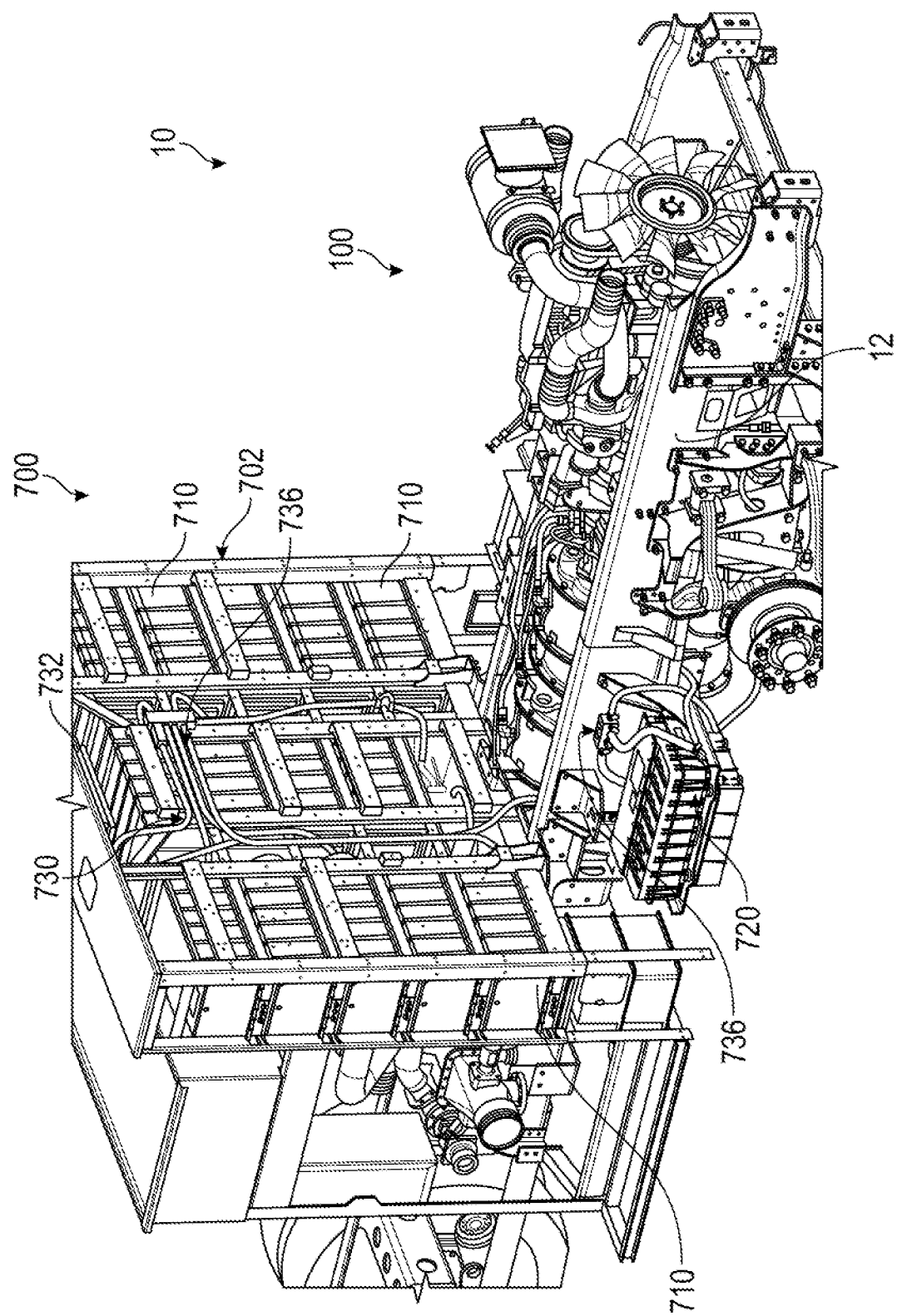
FIGS. 19-26 are various detailed views of the energy storage system of the driveline of FIG. 7, according to an exemplary embodiment.

As shown in FIGS. 1, 2, 4-6, 8-12, and 18, the pump system 600 is coupled to the frame 12 and positioned in a space, shown as gap 40, between the front cabin 20 and the rear section 30. In another embodiment, the pump system 600 is otherwise positioned (e.g., within the rear section 30, etc.). As shown in FIGS. 1, 2, 4-6, 8-12, and 18, the pump system 600 includes a frame assembly, shown as pump house 602, coupled to the frame 12 and a pump assembly, shown as pump 604, disposed within and supported by the pump house 602. As shown in FIG. 18, the pump 604 includes an interface (e.g., an input, etc.), shown as ETD interface 606, that engages (directly or indirectly) with subsystem interface 506 of the ETD 500. The ETD 500 may thereby drive the pump 604 to pump a fluid from a source (e.g., an on-vehicle fluid source, an off-vehicle fluid source, an on-board water tank, an on-board agent tank, a fire hydrant, an open body of water, a tanker truck, etc.) to one or more fluid outlets on the vehicle 10 (e.g., a structural discharge, a hose reel, a turret, a high reach extendible turret ("HRET"), etc.).

Energy Storage System

As shown in FIGS. 1-6, 8-12, and 19-26, the ESS 700 includes a housing, shown as support rack 702, coupled to the frame 12 and positioned in the gap 40 between the front cabin 20 and the rear section 30, forward of the pump house 602; a plurality of battery cells, shown as battery packs 710, supported by the support rack 702; an inverter system, shown as inverter assembly 720, coupled to the frame 12 separate from the support rack 702 and positioned beneath the front cabin 20; a second cooling assembly, shown as ESS cooling system 730; a wiring assembly, shown as high voltage wiring assembly 740; and a charging assembly, shown as high voltage charging system 750, disposed along a side of the support rack 702. In another embodiment, the support rack 702 and/or the battery packs 710 are otherwise positioned (e.g., behind the pump house 602; within the rear section 30; between frame rails of the frame 12; to achieve a desired packaging, weight balance, or cost performance of the driveline 100 and the vehicle 10; etc.).

Figure 20:
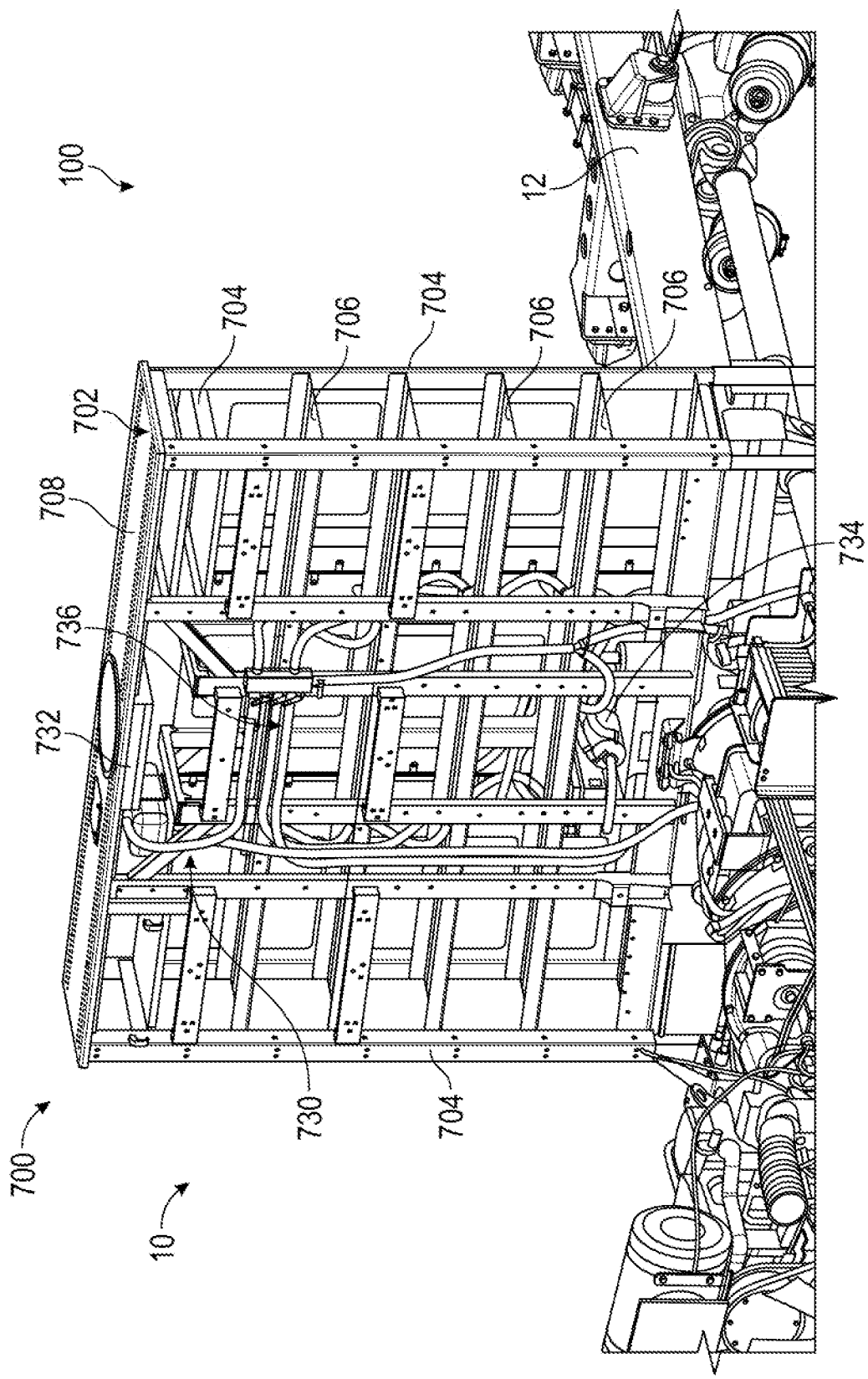
Figure 21:
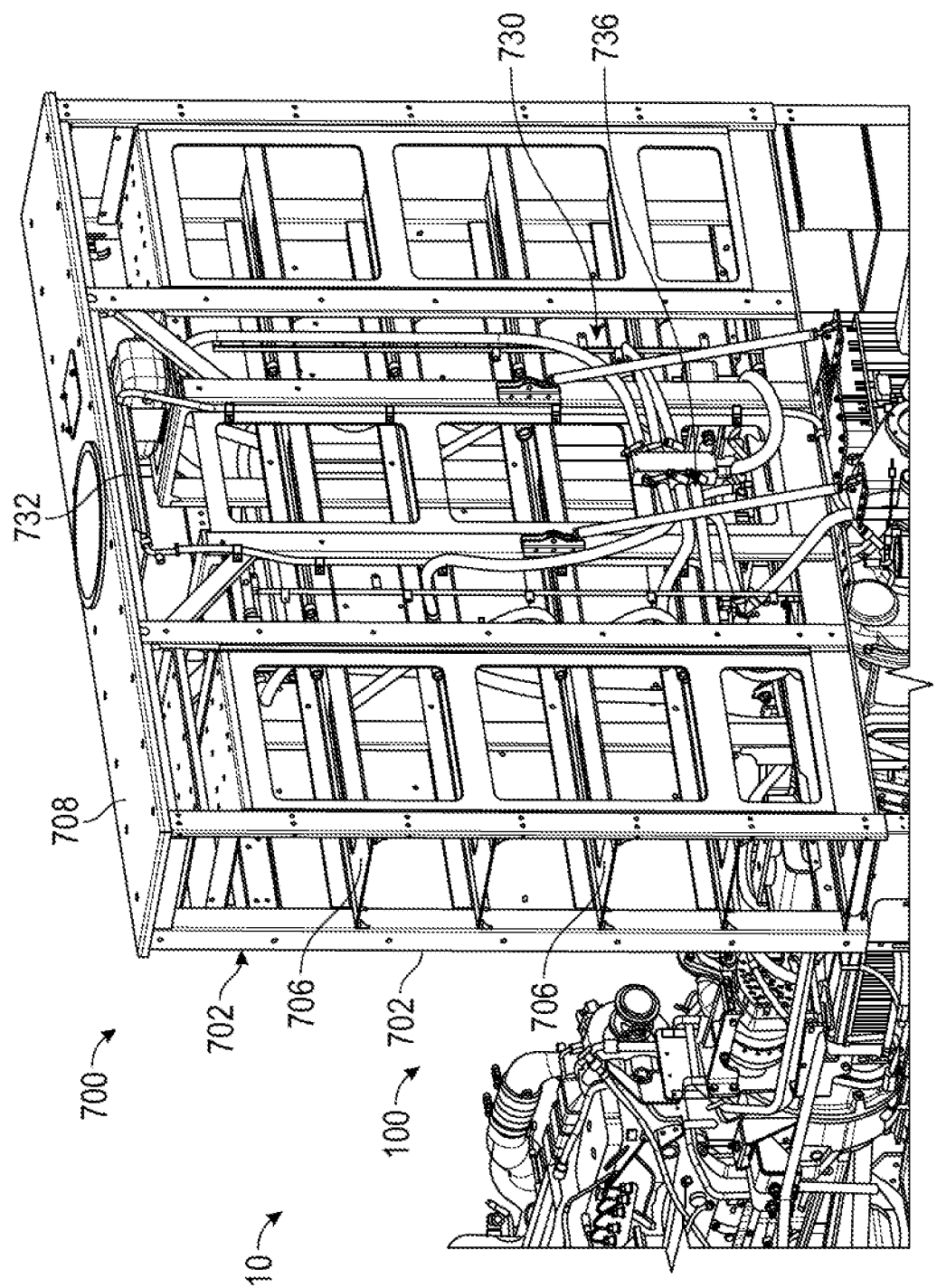
Figure 22:
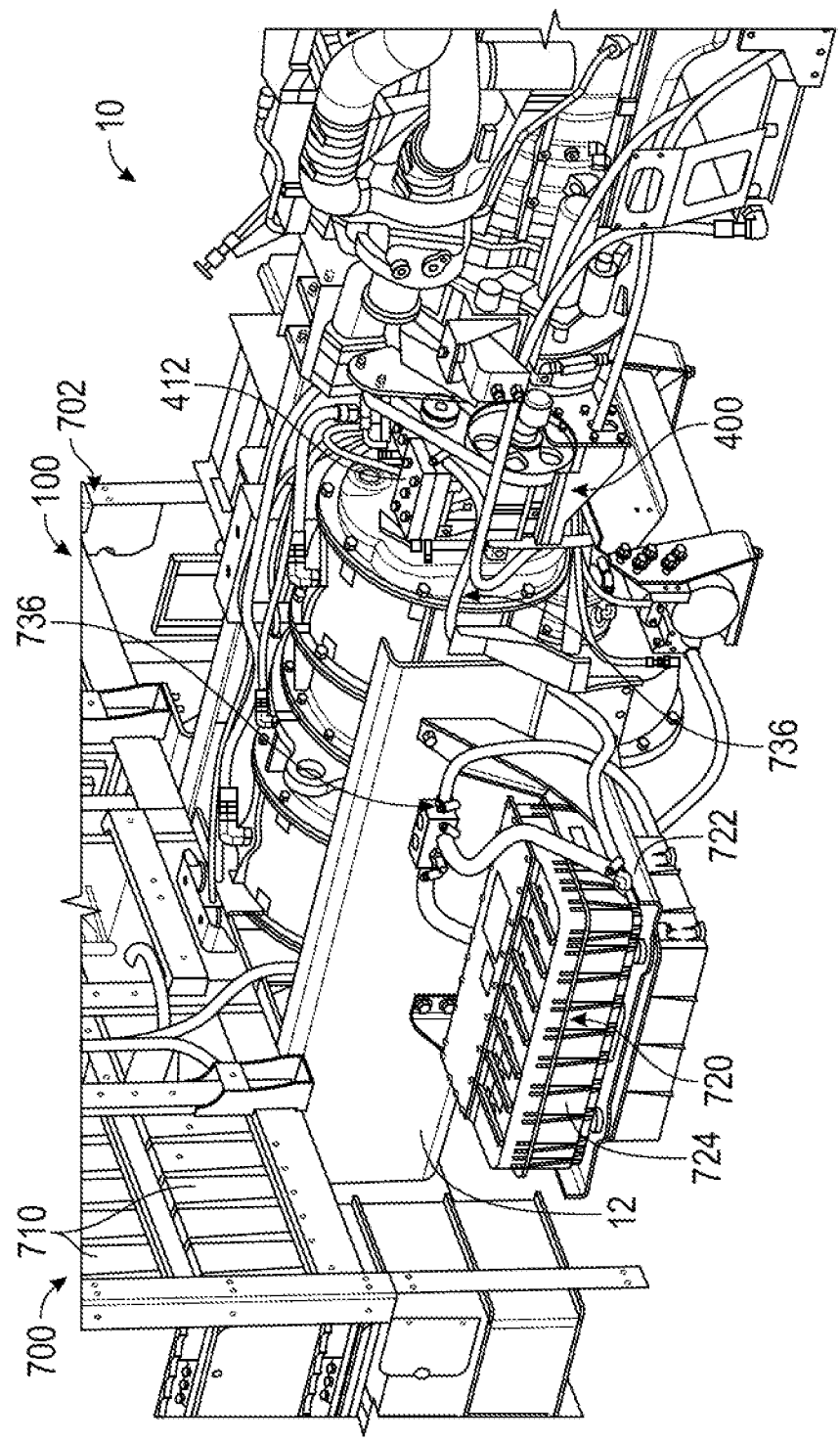
Figure 23:
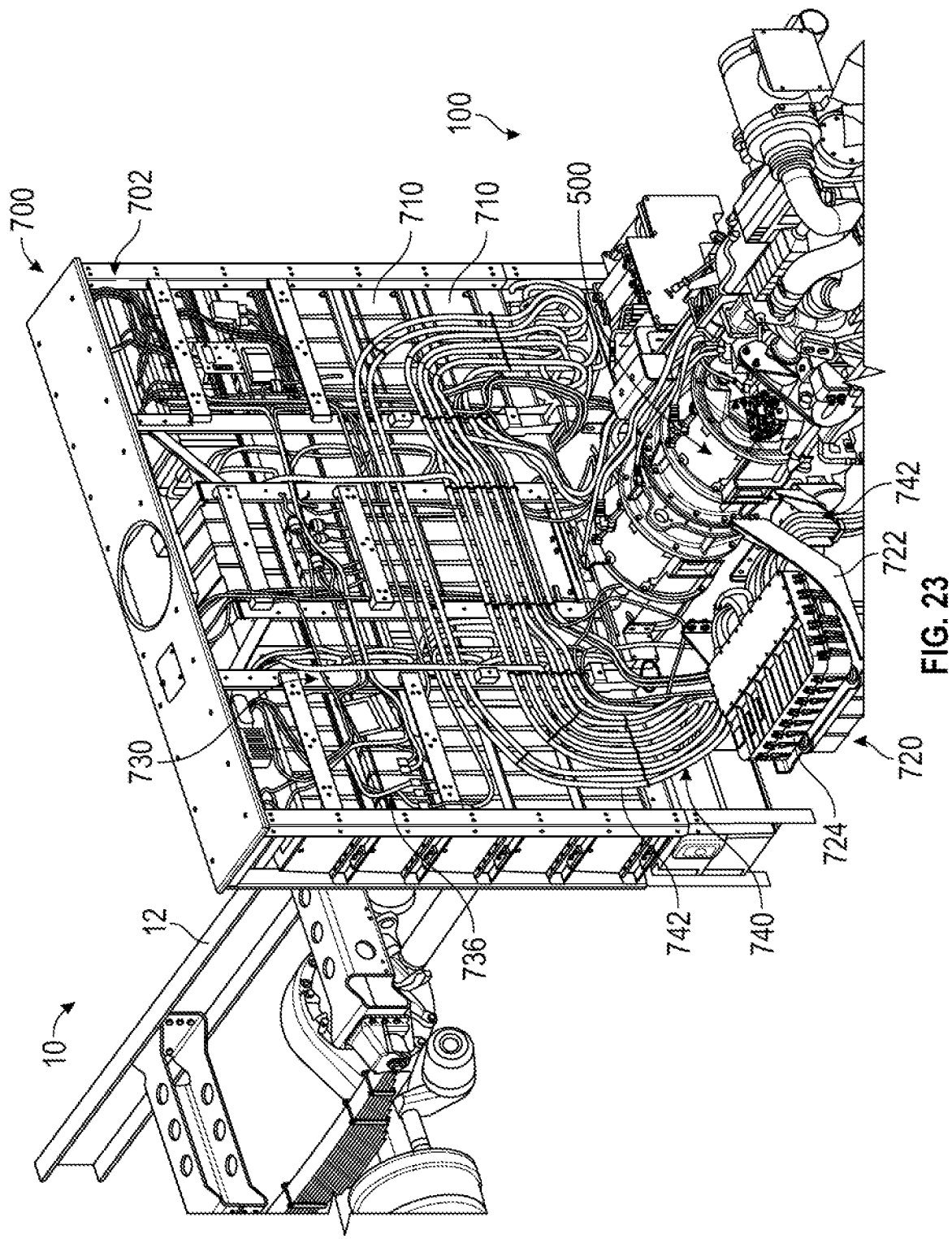

As shown in FIGS. 20 and 21, the support rack 702 includes a plurality of vertical supports, shown as frame members 704; a plurality of horizontal supports, shown as shelving 706, coupled to the frame members 704 at various heights along the frame members 704 and that support the battery packs 710; and a top support, shown as top panel 708, extending horizontally across a top end of the support rack 702. As shown in FIGS. 22 and 23, the inverter assembly 720 includes a bracket, shown as inverter bracket 722, coupled to one the frame rails of the frame 12 and positioned proximate the support rack 702 (e.g., a front side thereof, etc.) and an inverter, shown as inverter 724, coupled to and supported by the inverter bracket 722. In another embodiment, the inverter 724 is located on or coupled directly to the support rack 702.

As shown in FIGS. 3, 19-24, and 26, the ESS cooling system 730 includes a heat exchanger, shown as cooling radiator 732, coupled to an underside of the top panel 708; a driver, shown as cooling compressor 734, supported by the shelving 706; and a plurality of fluid conduits, shown as cooling conduits 736, fluidly coupling the cooling radiator 732 and the cooling compressor 734 to various components of the driveline 100 including the ETD 500, the battery packs 710, the inverter 724, and/or one or more of the accessories 412. The ESS cooling system 730 may, therefore, facilitate thermally regulating (i.e., cooling) not only components of the ESS 700, but also other components of the vehicle 10 (e.g., the ETD 500, the accessories 412, etc.).

Figure 3:
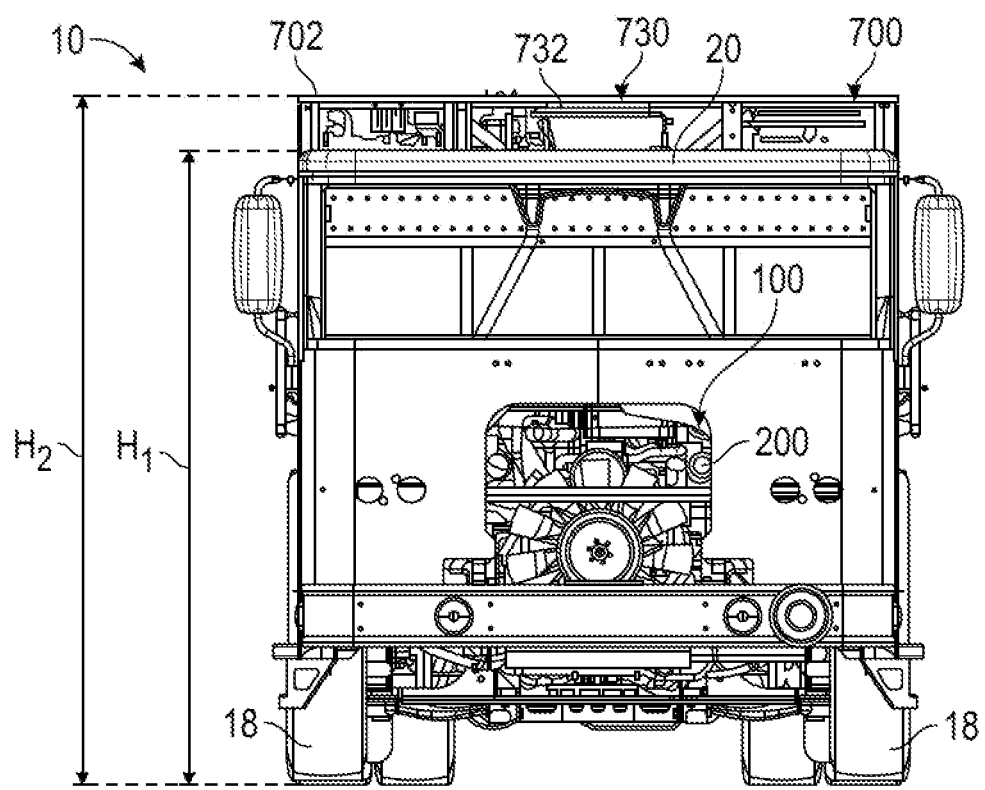
FIG. 3 is a front view of the fire fighting vehicle of FIG. 1, according to an exemplary embodiment.
Figure 4:
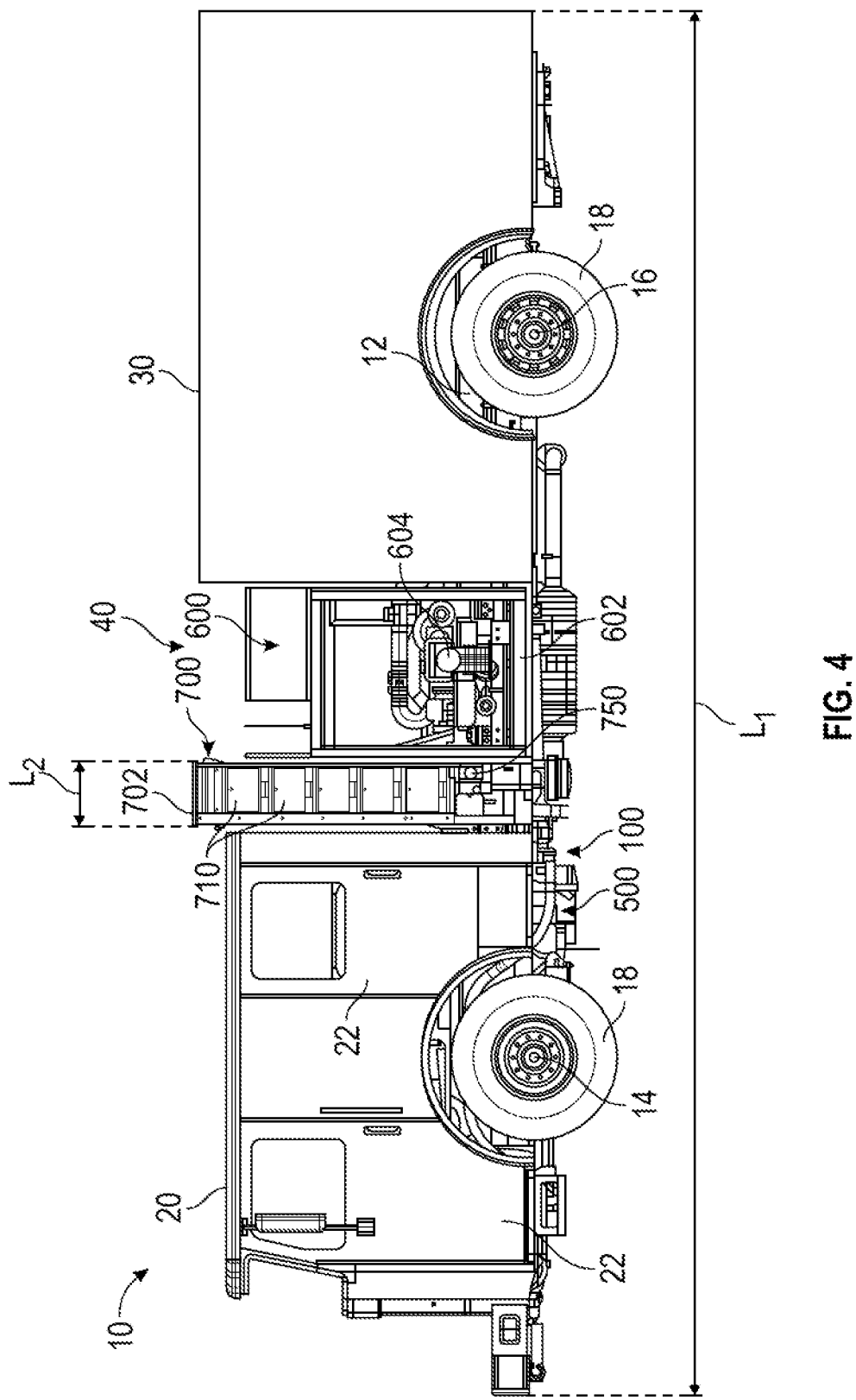
FIG. 4 is a left side view of the fire fighting vehicle of FIG. 1, according to an exemplary embodiment.
Figure 5:
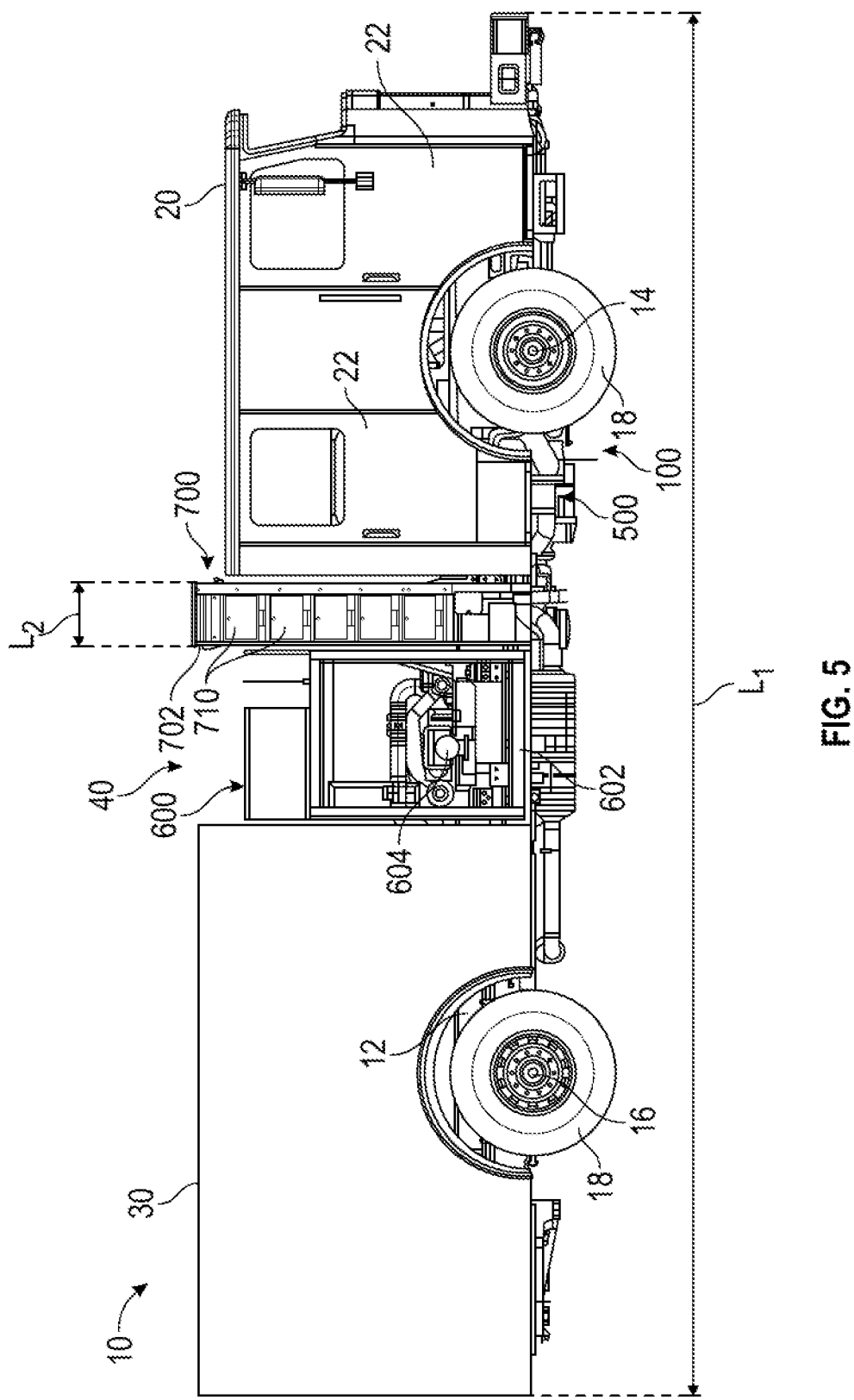
FIG. 5 is a right side view of the fire fighting vehicle of FIG. 1, according to an exemplary embodiment.
Figure 6:
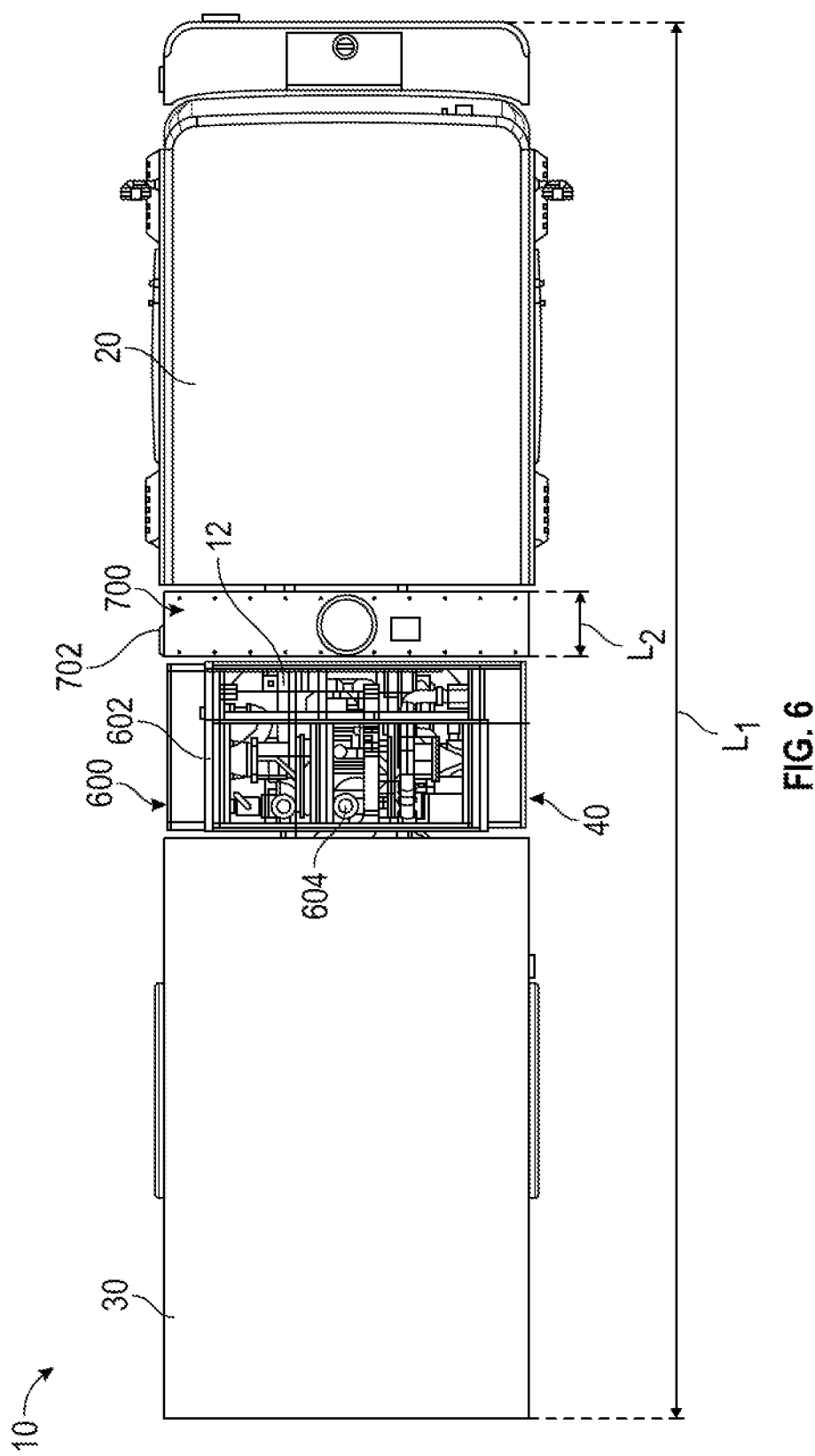
FIG. 6 is a top view of the fire fighting vehicle of FIG. 1, according to an exemplary embodiment.

As shown in FIG. 3, the vehicle 10 has an overall height $H_1$ and the support rack 702 has an overall height $H_2$ that is greater than $H_1$ such that at least a portion of the support rack 702 (e.g., the top panel 708) extends above the front cabin 20. Such an arrangement causes airflow above the front cabin 20 to flow directly to the cooling radiator 732 to allow for maximum performance of the ESS cooling system 730. In other embodiments (e.g., embodiments where the battery packs 710 are otherwise located or arranged, etc.), the cooling radiator 732 is otherwise positioned. According to an exemplary embodiment, the ESS cooling system 730 is positioned separate and independent from the engine cooling system 210. In other embodiments, at least a portion of the ESS cooling system 730 (e.g., the cooling radiator 732, etc.) is co-located with the engine cooling system 210. In still other embodiments, one or more components of the ESS cooling system 730 and the engine cooling system 210 are shared (e.g., the engine radiator and the cooling radiator 732 are one in the same, etc.).

Figure 24:
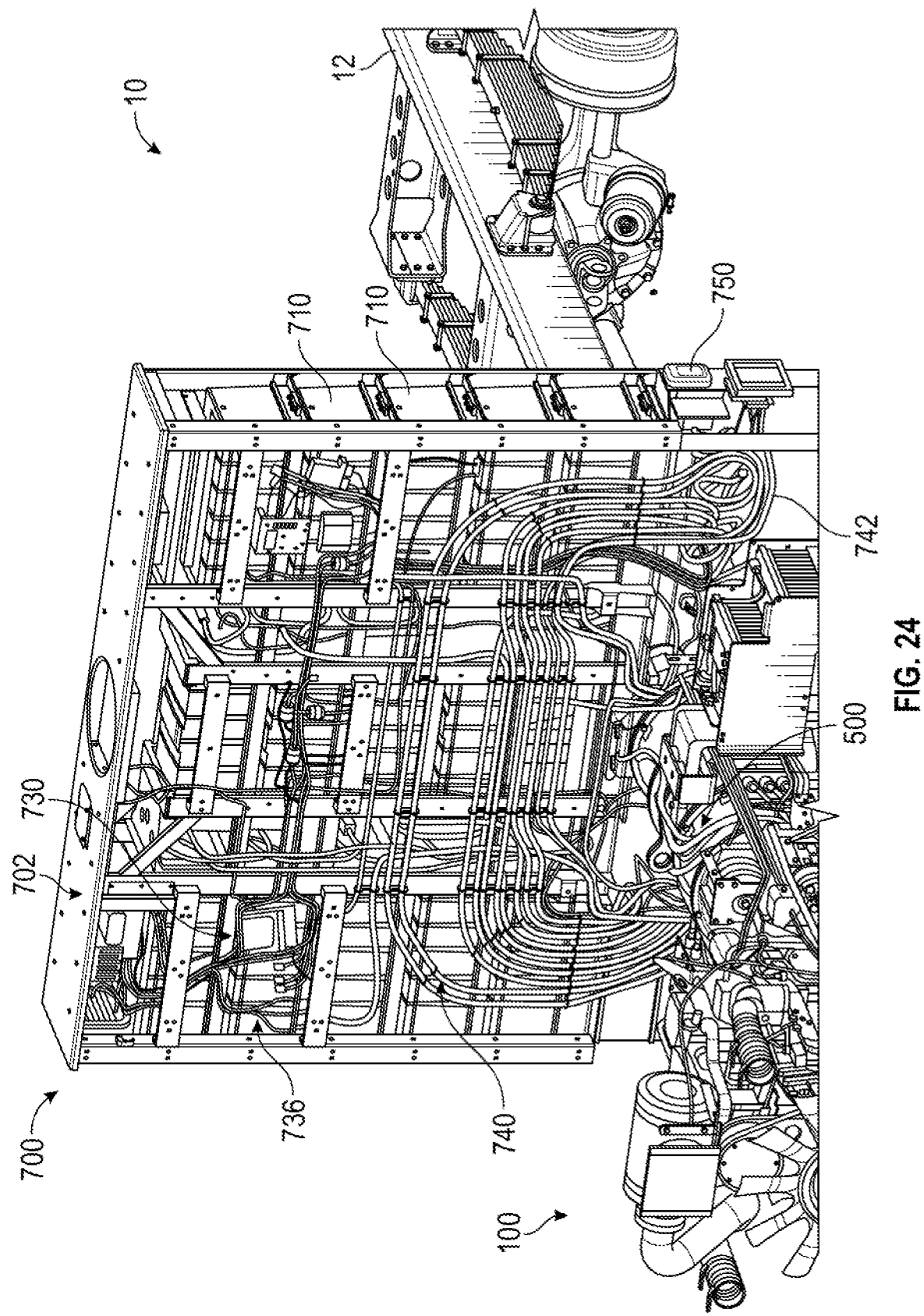
Figure 25:
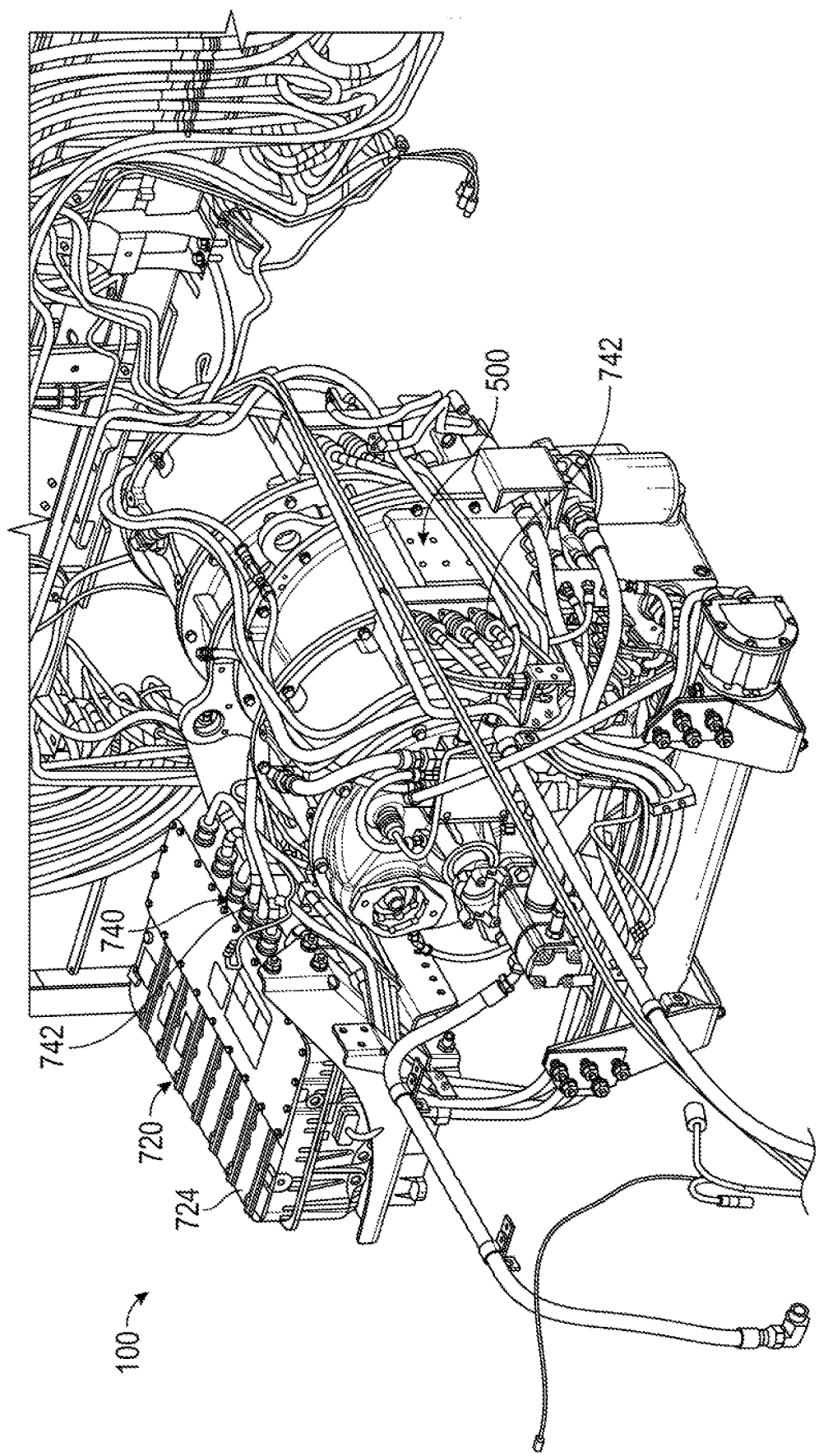
Figure 26:
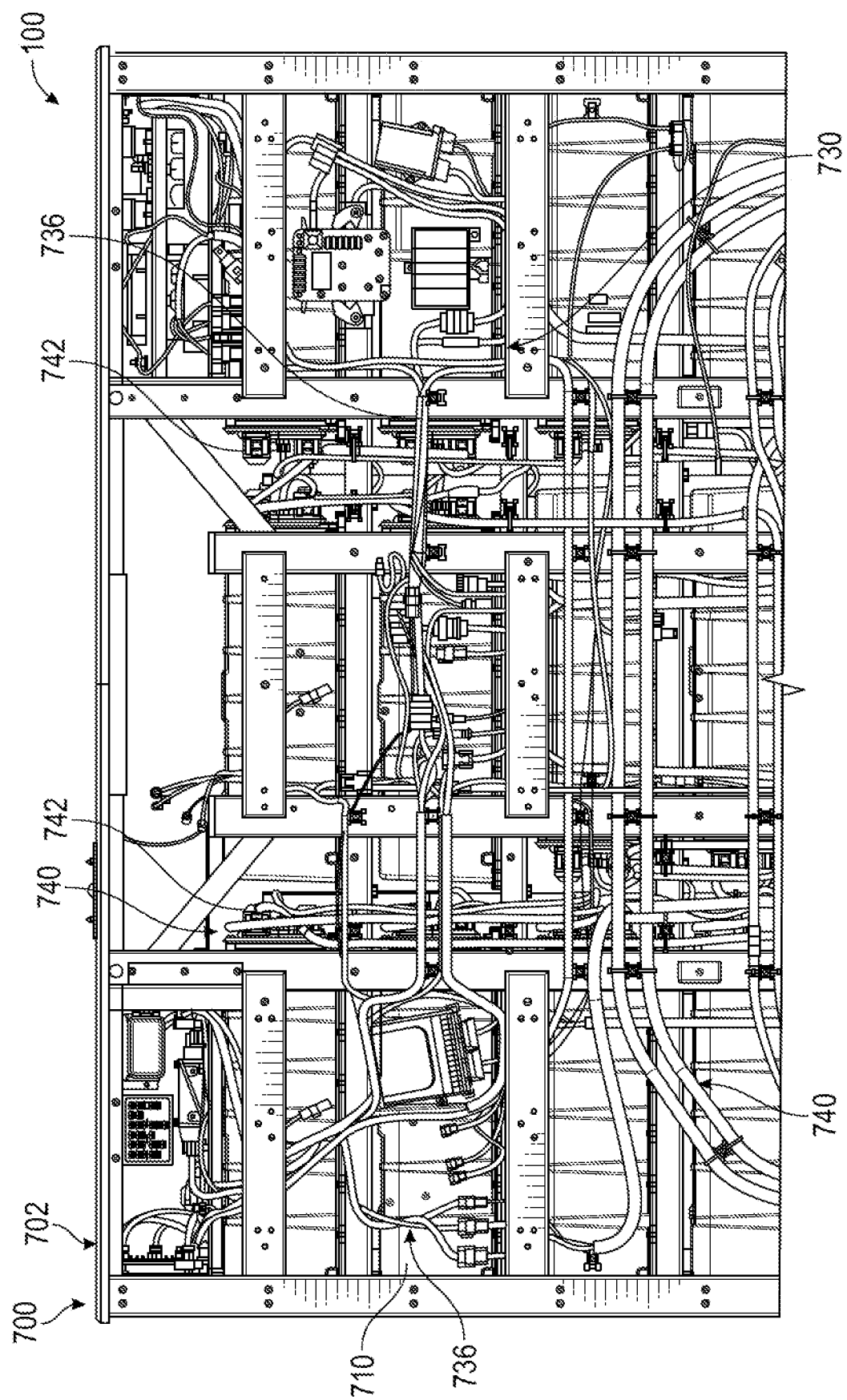

As shown in FIGS. 23-26, the high voltage wiring assembly 740 includes a plurality of high voltage wires, shown as high voltage wires 742, electrically connecting various electrically-operated components of the vehicle 10 to the battery packs 710. Specifically, as shown in FIGS. 23-25, the battery packs 710 are electrically connected to the ETD 500, the inverter 724, and the high voltage charging system 750 by the high voltage wires 742. The battery packs 710 may be charged by an external source (e.g., a high voltage power source, etc.) via the high voltage charging system 750 (e.g., via a port thereof, etc.). According to an exemplary embodiment, the ETD 500 draws stored energy in the battery packs 710 via the high voltage wires 742 to facilitate operation thereof. In embodiments, the ETD 500 does not charge the battery packs 710 with energy generated thereby. In other embodiments, the ETD 500 is operable to charge the battery packs 710 with the energy generated thereby. It should be understood that the battery packs 710 may power additional components of the vehicle 10 (e.g., lights, sirens, communication systems, displays, electric accessories, electric motors, etc.).

Look and Feel

According to an exemplary embodiment, the components of the driveline 100 have been integrated into the vehicle 10 in such a way that the vehicle 10 looks, feels, and operates as if it were a traditional, internal combustion engine only driven vehicle. The current approach in the market relating to the electrification of fire fighting vehicles has been to re-design the vehicle entirely to accommodate the electrification components such that the resultant vehicles look substantially different from and are controlled differently from their internal combustion engine driven predecessors. Applicant has identified, however, that consumers, specifically fire fighters, are interested in adding electrified vehicles to their fleets, but they want the vehicles to remain the same as their predecessors in terms of component layout, compartment locations, operations, and aesthetic appearance. Accordingly, Applicant has engaged in an extensive research and development process to design and package the electrified components onto the vehicle 10, with only minor changes relative to its internal combustion engine driven predecessors, such that the vehicle 10 looks and operates like a traditional North American fire apparatus. Doing so provides various advantages, including vehicle operators do not have to be retrained on how to operate a completely new vehicle, technicians know exactly where the driveline components are located, equipment from a decommissioned vehicle can easily be transferred to an identical position on the new, electrified vehicle, etc., all which allow for easy transition and acceptance by the end users, eliminates training, and allows for increased uptime of the vehicle 10.

Specifically, the vehicle 10, according to the exemplary embodiment shown in FIGS. 1-6, looks identical to its internal combustion engine driven predecessor, except for the addition of the support rack 702 and the components supported thereby. The pump house 602 and the engine 202 remain in their usual position, the ETD 500 is in the position where a traditional mechanical transmission would be located, the front cabin 20 and the rear section 30 maintain their typical structure, control layout, compartment layout, etc. However, because of the addition of the ESS 700 to electrify the vehicle 10, the overall length $L_1$ of the vehicle 10 was extended by a length $L_2$ to accommodate the addition of the support rack 702 and the components supported thereby (e.g., the battery packs 710, the cooling radiator 732, the cooling compressor 734, etc.). According to an exemplary embodiment, the length $L_2$ is 20 inches or less (e.g., 20, 18, 16, 12, etc. inches). However, as described herein, in some embodiments, the battery packs 710 are otherwise positioned and, therefore, the support rack 702 may be eliminated. In such embodiments, the vehicle 10 would appear to be identical to its internal combustion engine driven predecessor to an unknowing party.

Figure 27:
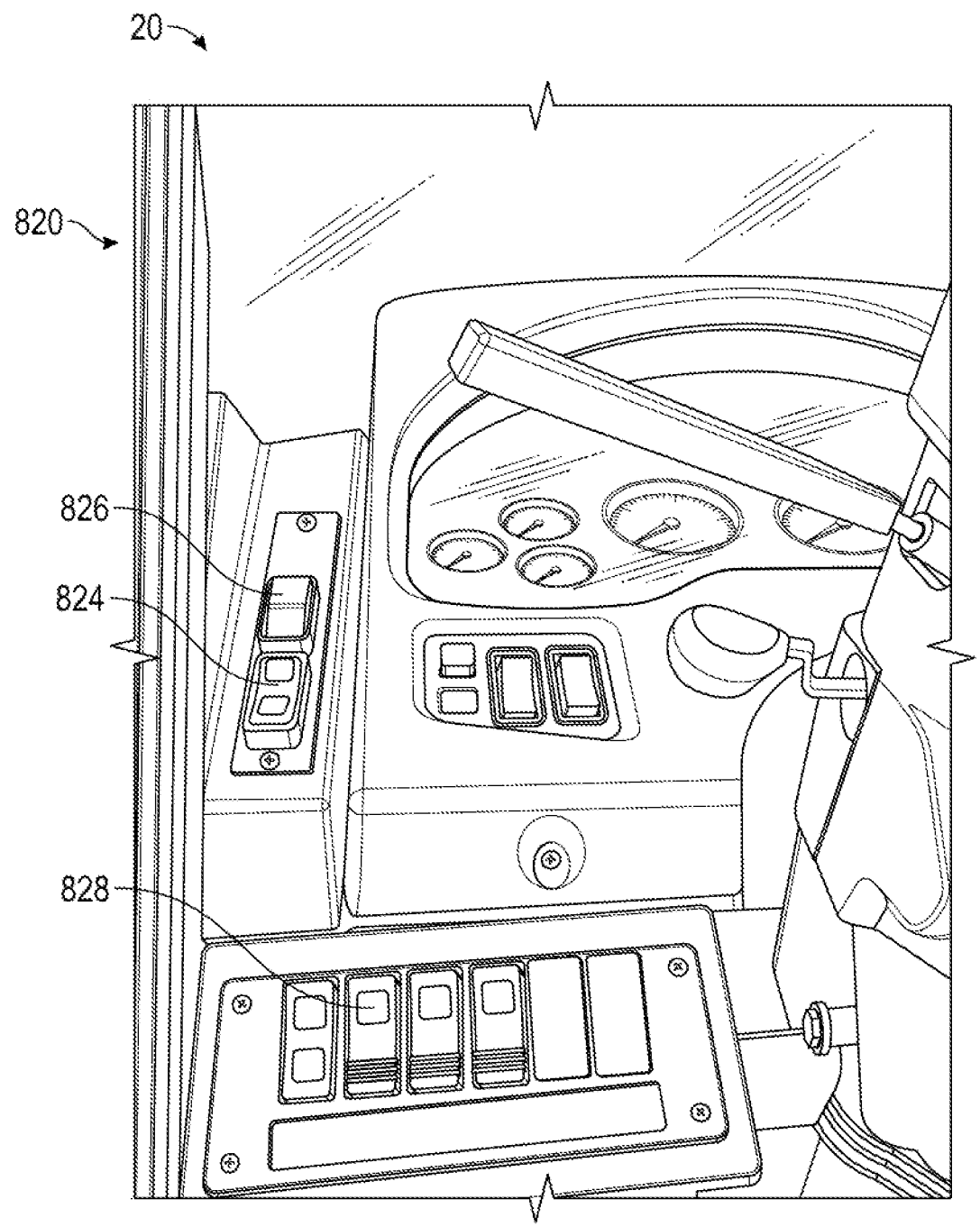
FIGS. 27 and 28 are various views of a user control interface within a cab of the fire fighting vehicle of FIG. 1, according to an exemplary embodiment.
Figure 28:
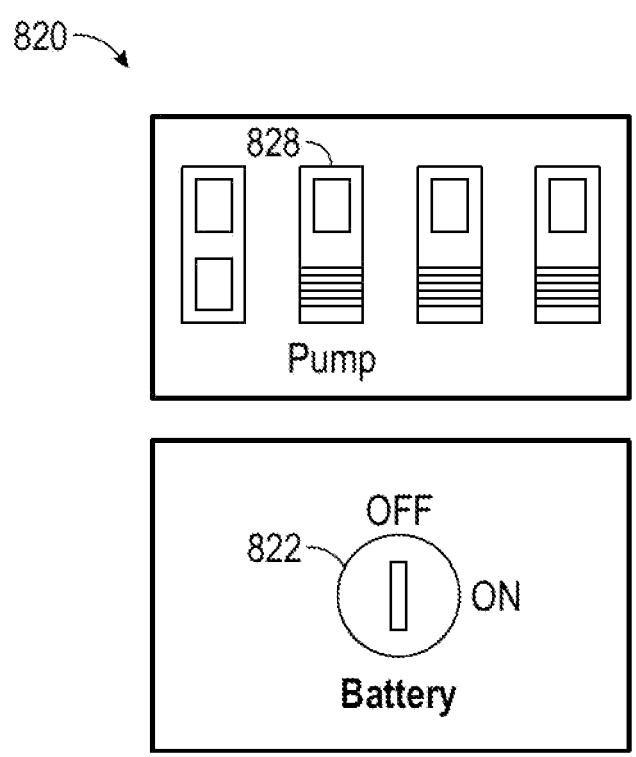

According to an exemplary embodiment, in addition to the overall look of the vehicle 10, the operator controls have been kept as similar to its internal combustion engine driven predecessor such that vehicle starting, vehicle driving, and pumping operations are identical such that the operator has no indication that the vehicle 10 is different (i.e., electrified) and, therefore, eliminates any need for training to get an already experienced operator into a position to drive and operate the vehicle 10 and the components thereof. As shown in FIGS. 27 and 28, the user interface 820 within the front cabin 20 of the vehicle 10 includes a plurality of buttons, dials, switches, etc. that facilitate engaging and operating the driveline 100. Specifically, the user interface 820 includes a first input (e.g., a rotary switch, etc.), shown as battery isolation switch 822, a second input (e.g., a button, a switch, etc.), shown as ignition switch 824, a third input (e.g., a button, a switch, etc.), shown as start switch 826, and a fourth input (e.g., a button, a switch, etc.), shown as pump switch 828. The battery isolation switch 822 can be engaged (e.g., turned, etc.) to allow stored energy within the ESS 700 to be accessed. The ignition switch 824 can then be engaged (e.g., pressed, flipped, etc.) to make low voltage and high voltage contacts engage to activate various electric components of the vehicle 10 (e.g., the front cabin 20 comes to life, the components required to start the engine 202 are activated, etc.). The start switch 826 activates the engine 202 and/or the ETD 500 of the driveline 100 (e.g., based on a mode of operation, based on the current location of the vehicle 10, etc.) that facilitate driving the vehicle 10 and the subsystems thereof (e.g., the pump system 600, the TAD 400, the aerial ladder assembly, etc.). The pump switch 828 (or other subcomponent switch) can then be engaged (e.g., pressed, flipped, etc.) to start the operation thereof (e.g., drive the pump 604 via the ETD 500, drive the aerial ladder assembly via the ETD 500, etc.).

High Voltage Charging System

Figure 29:
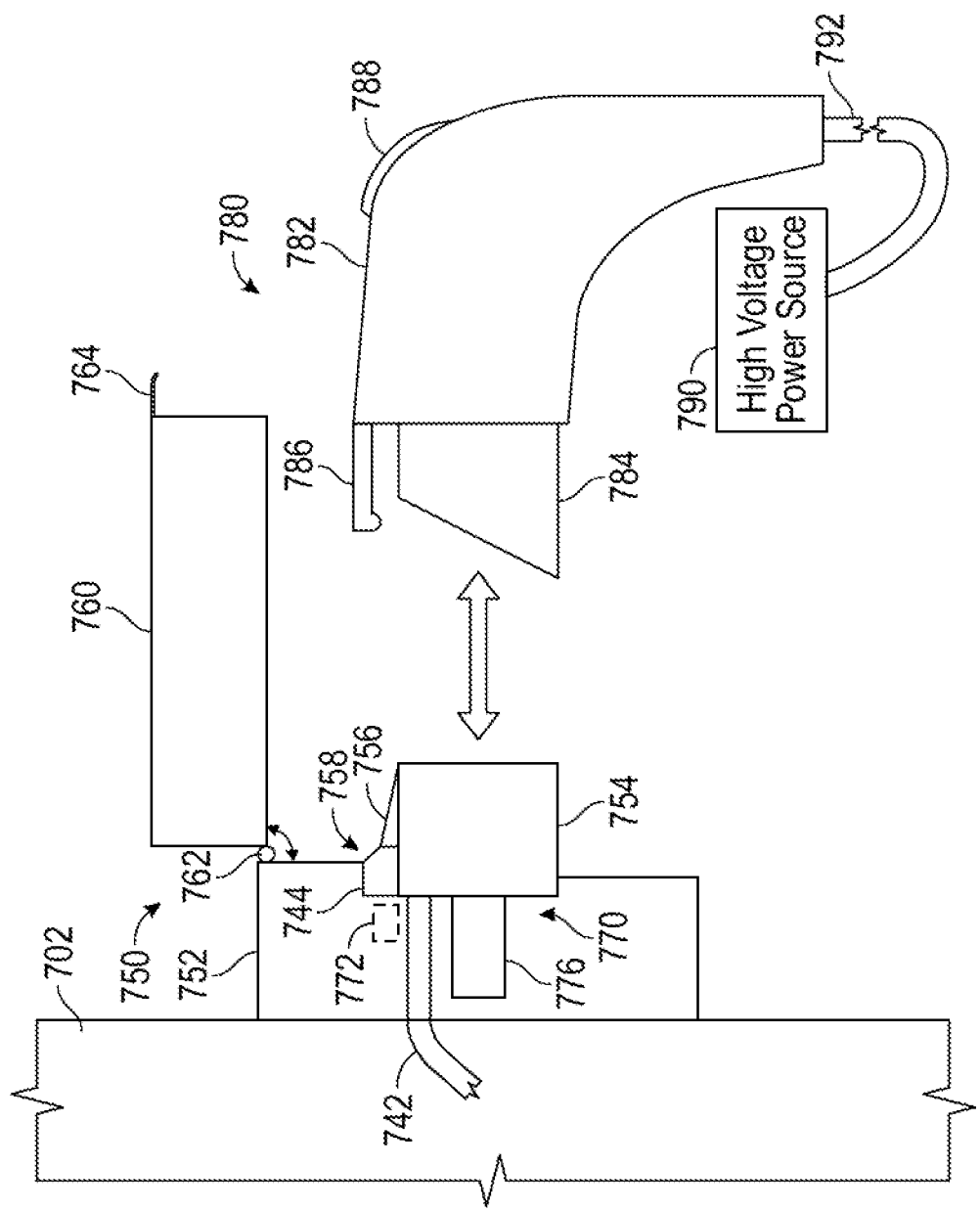
FIG. 29 is a detailed view of a high voltage charging system of the fire fighting vehicle of FIG. 1, according to an exemplary embodiment.

According to the exemplary embodiment shown in FIG. 29, the high voltage charging system 750 is configured to interface with a charging plug, shown as high voltage plug 780, to facilitate charging the battery packs 710 using electricity (e.g., having a voltage between 200 and 800 volts, etc.) received from an external power source (e.g., a wall charger, a charging station, etc.), shown as high voltage power source 790. As shown in FIG. 29, the high voltage charging system 750 includes a body, shown as housing 752, coupled to the support rack 702; a first interface, shown as charging port 754, disposed within the housing 752 and electrically coupled to the battery packs 710 by the high voltage wires 742; a retainer, shown as disconnect retainer 756, positioned along an exterior surface of or proximate the charging port 754; and a second interface, shown as retaining port 758, positioned at an end of the disconnect retainer 756 proximate the housing 752 and defining an aperture or opening that provides a pathway into the housing 752. In other embodiments, the housing 752 is otherwise positioned (e.g., positioned along a side of the front cabin 20, positioned along a side of the rear section 30, etc.). As shown in FIG. 29, the high voltage charging system 750 includes a cover, shown as door 760, pivotally coupled to the housing 752 with a pivoting coupler, shown as hinge 762. The door 760 includes a tab, shown as handle 764, that facilitates repositioning the door 760 relative to the housing 752. The door 760 is positioned to selectively enclose the charging port 754 (e.g., when the charging port 754 is not in use, when the battery packs 710 are not being charged, etc.). In one embodiment, the hinge 762 includes a biasing element (e.g., a torsional spring, etc.) that biases the door 760 into a closed position.

As shown in FIG. 29, the high voltage plug 780 includes a body, shown as plug handle 782, having a first interface, shown as charging interface 784, a second interface, shown as retaining latch 786, a button, shown as latch release button 788, and a charging connector, shown as charging cable 792, connecting the high voltage plug 780 to the high voltage power source 790. The charging interface 784 is configured to interface with the charging port 754 to facilitate charging the battery packs 710 with the high voltage power source 790. The retaining latch 786 is configured to insert into the retaining port 758 when the charging interface 784 engages with the charging port 754. The disconnect retainer 756 is positioned to engage with the retaining latch 786 to prevent the charging interface 784 from disengaging from the charging port 754. The latch release button 788 is configured to facilitate a user with manually repositioning (e.g., pivoting, lifting, etc.) the retaining latch 786 into a position that releases the retaining latch 786 from the disconnect retainer 756 to allow the user to manually withdraw the charging interface 784 and the retaining latch 786 from the charging port 754 and the retaining port 758, respectively, to disconnect the high voltage plug 780 from the high voltage charging system 750.

Figure 30:
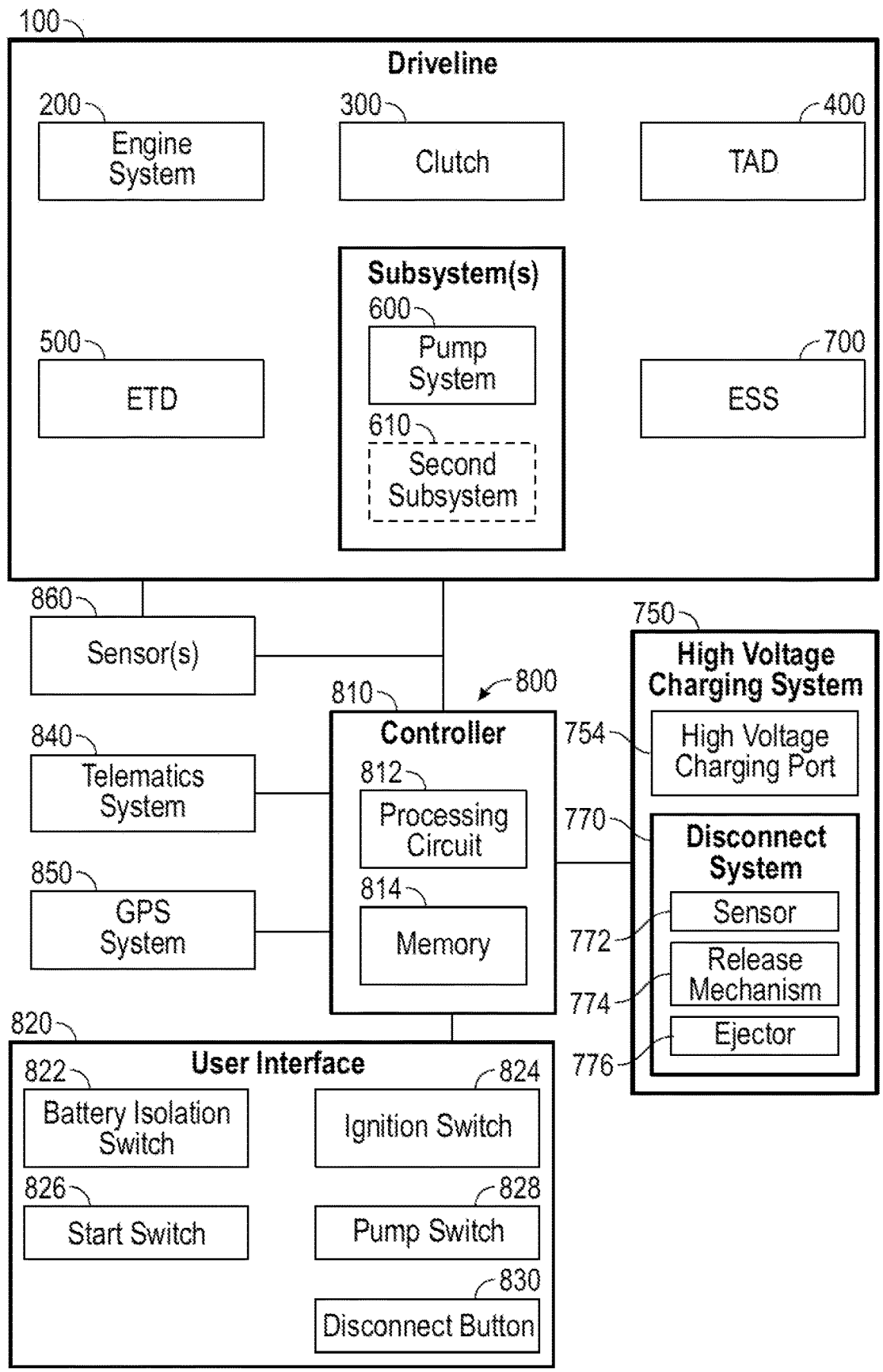
FIG. 30 is a schematic diagram of a control system of the fire fighting vehicle of FIG. 1, according to an exemplary embodiment.

As shown in FIGS. 29 and 30, the high voltage charging system 750 includes a disconnect assembly, shown as disconnect system 770. According to an exemplary embodiment, the disconnect system 770 is configured to facilitate disengaging (e.g., releasing, ejecting, disconnecting, etc.) the high voltage plug 780 from the high voltage charging system 750 without requiring the user to engage the latch release button 788. Specifically, the disconnect system 770 is configured to release the retaining latch 786 from the disconnect retainer 756 and push the high voltage plug 780 such that the charging interface 784 and the retaining latch 786 withdraw from the charging port 754 and the retaining port 758, respectively.

As shown in FIGS. 29 and 30, the disconnect system 770 includes a sensor, shown as sensor 772, a first actuator, shown as release mechanism 774, and a second actuator, shown as ejector 776. According to an exemplary embodiment, the sensor 772 is positioned to detect whether the high voltage plug 780 is engaged with the high voltage charging system 750 and transmit an engagement signal in response to detecting engagement therebetween. In some embodiments, the sensor 772 is or includes a mechanical sensor (e.g., a switch, a contact, etc.) (i) positioned to engage with the charging interface 784 and/or the retaining latch 786 of the high voltage plug 780 when the charging interface 784 is inserted into the charging port 754 and the retaining latch 786 is inserted into the retaining port 758 and (ii) transmit the engagement signal in response to engagement therewith being detected. In some embodiments, the sensor 772 is or includes an electrical sensor (e.g., a current sensor, etc.) (i) positioned to monitor current flow into the charging port 754 and/or through the high voltage wiring 742 (i.e., indicating that the charging interface 784 is inserted into the charging port 754) and (ii) transmit the engagement signal in response to detecting the current flow.

According to an exemplary embodiment, the release mechanism 774 is positioned to reposition (e.g., pivot, lift, etc.) the retaining latch 786 into a release position that releases the retaining latch 786 from the disconnect retainer 756 to facilitate withdrawal of the charging interface 784 and the retaining latch 786 from the charging port 754 and the retaining port 758, respectively, to disconnect the high voltage plug 780 from the high voltage charging system 750. The release mechanism 774 may include an actuator, a solenoid, a lever, and/or another component configured to selectively engage with the retaining latch 786 to disengage the retaining latch 786 from the disconnect retainer 756.

According to an exemplary embodiment, the ejector 776 is positioned to push, spit, eject, force, or otherwise disconnect the high voltage plug 780 from the high voltage charging system 750 such that the charging interface 784 and the retaining latch 786 disengage from the charging port 754 and the retaining port 758. The ejector 776 may include an actuator, a solenoid, a plunger, and/or another component configured to selectively force the high voltage plug 780 from engagement with the high voltage charging system 750 following disengagement of the retaining latch 786 from the disconnect retainer 756 by the release mechanism 774.

While the high voltage charging system 750 and the high voltage plug 780 have been described herein as including only one of each of the charging port 754, the disconnect retainer 756, the retaining port 758, the sensor 772, the release mechanism 774, the ejector 776, the charging interface 784, and the retaining latch 786, respectively, in some embodiments, the high voltage charging system 750 and the high voltage plug 780 include two or more of some or all of these components.

Control System

According to the exemplary embodiment shown in FIG. 30, a control system 800 for the vehicle 10 includes a controller 810. In one embodiment, the controller 810 is configured to selectively engage, selectively disengage, control, or otherwise communicate with components of the vehicle 10. As shown in FIG. 30, the controller 810 is coupled to (e.g., communicably coupled to) components of the driveline 100 (e.g., the engine system 200; the clutch 300; the ETD 500; subsystems including the pump system 600 and/or the second subsystem 610 such as, for example, an aerial ladder assembly or another subsystem; the ESS 700; etc.), the high voltage charging system 750, the user interface 820, a first external system, shown as telematics system 840, a second external system, shown as global positioning system ("GPS") 850, and one or more sensors, shown as sensors 860. By way of example, the controller 810 may send and receive signals (e.g., control signals) with the components of the driveline 100, the high voltage charging system 750, the user interface 820, the telematics system 840, the GPS system 850, and/or the sensors 860.

The controller 810 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 30, the controller 810 includes a processing circuit 812 and a memory 814. The processing circuit 812 may include an ASIC, one or more FPGAs, a DSP, circuits containing one or more processing components, circuitry for supporting a microprocessor, a group of processing components, or other suitable electronic processing components. In some embodiments, the processing circuit 812 is configured to execute computer code stored in the memory 814 to facilitate the activities described herein. The memory 814 may be any volatile or non-volatile computer-readable storage medium capable of storing data or computer code relating to the activities described herein. According to an exemplary embodiment, the memory 814 includes computer code modules (e.g., executable code, object code, source code, script code, machine code, etc.) configured for execution by the processing circuit 812. In some embodiments, the controller 810 may represent a collection of processing devices. In such cases, the processing circuit 812 represents the collective processors of the devices, and the memory 814 represents the collective storage devices of the devices.

The user interface 820 includes a display and an operator input, according to one embodiment. The display may be configured to display a graphical user interface, an image, an icon, or still other information. In one embodiment, the display includes a graphical user interface configured to provide general information about the vehicle 10 (e.g., vehicle speed, fuel level, battery level, pump performance/status, aerial ladder information, warning lights, agent levels, water levels, etc.). The graphical user interface may also be configured to display a current mode of operation, various potential modes of operation, or still other information relating to the vehicle 10, the driveline 100, and/or the high voltage charging system 750. By way of example, the graphical user interface may be configured to provide specific information regarding the operation of the driveline 100 (e.g., whether the clutch 300 is engaged, whether the engine 202 is on, whether the pump 604 is in operation, etc.).

The operator input may be used by an operator to provide commands to the components of the vehicle 10, the driveline 100, the high voltage charging system 750, and/or still other components or systems of the vehicle 10. As shown in FIG. 30, the operator input includes the battery isolation switch 822, the ignition switch 824, the start switch 826, the pump switch 828, and a fifth input (e.g., a button, a switch, a soft key, etc.), shown as disconnect button 830. The disconnect button 830 may be positioned within the front cabin 20 and/or external to the front cabin 20 (e.g., on or proximate the high voltage charging system 750). Therefore, the vehicle 10 may include multiple disconnect buttons 830. The operator input may include one or more additional buttons, knobs, touchscreens, switches, levers, joysticks, pedals, or handles. In some instances, an operator may be able to press a button and/or otherwise interface with the operator input to command the controller 810 to change a mode of operation for the driveline 100. The operator may be able to manually control some or all aspects of the operation of the driveline 100, the high voltage charging system 750, and/or other components of the vehicle 10 using the display and the operator input. It should be understood that any type of display or input controls may be implemented with the systems and methods described herein.

The telematics system 840 may be a server-based system that monitors various telematics information and provides telematics data based on the telematics information to the controller 810 of the vehicle 10. The GPS system 850 may similarly be a server-based system that monitors various GPS information and provides GPS data based on the GPS information to the controller 810 of the vehicle 10. The telematics data may include an indication that the vehicle 10 is being dispatched to a scene. The telematics data may additionally or alternatively include details regarding the scene such as the location of the scene, characteristics of the scene (e.g., the type of fire, the current situation, etc.), and the like. The GPS data may include an indication of a current location of the vehicle 10. The GPS data and/or the telematics data may additionally or alternatively include route details between the current location of the vehicle 10 and the location of the scene such as route directions, emissions regulations along the route, noise restrictions along the route, a proximity of the vehicle 10 to a predetermined geofence (e.g., a roll-out geofence, a roll-in geofence, a noise restriction geofence, an emissions limiting geofence, etc.), and the like. Such telematics data and/or GPS data may be utilized by the controller 810 to perform one or more functions described herein.

In some embodiments, the telematics system 840 and the GPS system 850 are integrated into a single system. In some embodiments, the controller 810 is configured to function as an intermediary between the telematics system 840 and the GPS system 850. By way of example, the controller 810 may receive the telematics data from the telematics system 840 when the vehicle 10 is assigned to be dispatched to a scene and, then, the controller 810 may use the telematics data to acquire the GPS data from the GPS system 850. In some embodiments, the telematics system 840 and the GPS system 850 are configured to communicate directly with each other (e.g., the GPS system 850 may acquire scene location information from the telematics system 840 to provide the GPS data to the controller 810, etc.) such that the controller 810 does not need to function as an intermediary. The controller 810 may receive or acquire the telematics data and/or the GPS data from the telematics system 840 and/or GPS system 850 on a periodic basis, automatically, upon request, and/or in another suitable way.

The sensors 860 may include one or more sensors that are configured to acquire sensor data to facilitate monitoring operational parameters/characteristics of the components of the driveline 100 with the controller 810. By way of example, the sensors 860 may include one or more engine sensors (e.g., a speed sensor, an exhaust gas sensor, a $NO_x$ sensor, an $O_2$ sensor, etc.) that are configured to facilitate monitoring operational parameters/characteristics of the engine system 200 (e.g., engine speed, exhaust gas composition, $NO_x$ levels, $O_2$ levels, etc.). By way of another example, the sensors 860 may additionally or alternatively include one or more ETD sensors (e.g., speed sensors, voltage sensors, current sensors, etc.) that are configured to facilitate monitoring operational parameters/characteristics of the ETD 500 (e.g., input speed; output speed; voltage, current, and/or power of incoming power from the ESS 700; voltage, current, and/or power generated by the ETD 500; etc.). By way of still another example, the sensors 860 may additionally or alternatively include one or more subsystem sensors (e.g., speed sensors, flow rate sensors, pressure sensors, water level sensors, agent level sensors, position sensors, etc.) that are configured to facilitate monitoring operational parameters/characteristics of the pump system 600 (e.g., pump speed, output fluid flow rate, output fluid pressure, water level, agent level, etc.) and/or the second subsystem 610 (e.g., aerial ladder rotational position, aerial ladder horizontal length, aerial ladder vertical height, etc.).

By way of still another example, the sensors 860 may additionally or alternatively include one or more ESS sensors (e.g., voltage sensors, current sensors, state-of-charge ("SOC") sensors, etc.) that are configured to facilitate monitoring operational parameters/characteristics of the ESS 700 (e.g., voltage, current, and/or power of incoming power from the ETD 500 and/or the high voltage charging system 750; voltage, current, and/or power being output to the electrically-operated components of the vehicle 10; a SOC of the ESS 700; etc.). In some embodiments, the controller 810 is configured to automatically change a mode of operation for the driveline 100 and/or recommend to an operator via the user interface 820 to approve a change to the mode of operation of the driveline 100 based on the telematics data, the GPS data, and/or the sensor data.

Charging System Controls

In some embodiments, the controller 810 is configured to perform an auto-start sequence in response to receiving an indication that the high voltage plug 780 is manually disconnected from the high voltage charging system 750 of the vehicle 10. By way of example, the sensor 772 may transmit a disengagement signal to the controller 810 when the sensor 772 detects that the high voltage plug 780 is manually disconnected from the high voltage charging system 750 by the operator. The auto-start sequence may be or include the start sequence described herein in relation to the battery isolation switch 822, the ignition switch 824, and the start switch 826. The vehicle 10 may, therefore, be ready for responding shortly after the high voltage plug 780 is disconnected and without requiring the operator to manually perform the start sequence, providing easier operation for the operator and quicker response times.

In some embodiments, the controller 810 is configured to eject the high voltage plug 780 from the high voltage charging system 750 in response to receiving an eject command from the operator via the disconnect button 830. Specifically, the controller 810 is configured to (i) activate the release mechanism 774 to reposition the retaining latch 786 of the high voltage plug 780 into a release position that releases the retaining latch 786 from the disconnect retainer 756 and then (ii) activate the ejector 776 to push, spit, eject, force, or otherwise disconnect the high voltage plug 780 from the high voltage charging system 750 such that the charging interface 784 and the retaining latch 786 disengage from the charging port 754 and the retaining port 758. In some embodiments, the controller 810 is configured to perform the auto-start sequence following the ejection of the high voltage plug 780 in response to the eject command.

In some embodiments, the controller 810 is configured to prevent the vehicle 10 from moving while the high voltage plug 780 is connected to the high voltage charging system 750. In such embodiments, the controller 810 may be configured to provide a warning notification to the operator via the user interface 820 instructing the operator to manually disconnect the high voltage plug 780 or eject the high voltage plug 780 via the disconnect button 830 in response to the vehicle 10 being started or put into gear (e.g., drive, reverse, etc.) with the high voltage plug 780 still connected to the high voltage charging system 750.

In some embodiments, the controller 810 is configured to automatically eject the high voltage plug 780 from the high voltage charging system 750 via the disconnect system 770 in response the operator performing the start sequence (e.g., via the battery isolation switch 822, the ignition switch 824, and the start switch 826) and/or in response to the operator putting the vehicle 10 into gear (e.g., drive, reverse, etc.) with the high voltage plug 780 still connected to the high voltage charging system 750.

In some embodiments, the controller 810 is configured to perform the auto-start sequence and/or automatically eject the high voltage plug 780 from the high voltage charging system 750 via the disconnect system 770 based on the telematics data received from the telematics system 840. By way of example, the telematics data may indicate that the vehicle 10 is being dispatched to a scene. The controller 810 may be configured to perform the auto-start sequence and/or automatically eject the high voltage plug 780 based on the telematics data to prepare the vehicle 10 for scene response without requiring the operator to perform the start sequence, manually disconnect the high voltage plug 780, and/or eject the high voltage plug 780 using the disconnect button 830. In embodiments where the controller 810 is configured to perform both the auto-start sequence and automatically eject the high voltage plug 780 based on the telematics data, the controller 810 may (i) perform the auto-start sequence first and then eject the high voltage plug 780, (ii) eject the high voltage plug 780 first and then perform the auto-start sequence, or (iii) perform the auto-start sequence and eject the high voltage plug 780 simultaneously.

In some embodiments, the controller 810 is configured to stop the draw of power by the battery packs 710 from the high voltage power source 790 prior to ejecting the high voltage plug 780. This may be performed by transmitting a signal to the high voltage power source 790 to stop providing power and/or by stopping the flow of power at a location between the battery packs 710 and the charging port 754, at the charging port 754, or at the battery packs 710.

Operational Modes

As a general overview, the controller 810 is configured to operate the driveline 100 in various operational modes. In some embodiments, the controller 810 is configure to generate control signals for one or more components of the driveline 100 to transition the driveline 100 between the various operational modes in response to receiving a user input, a command, a request, etc. from the user interface 820. In some embodiments, the controller 810 is configure to generate control signals for one or more components of the driveline 100 to transition the driveline 100 between the various operational modes based on the telematics data, the GPS data, and/or the sensor data. The various operational modes of the driveline 100 may include a pure engine mode, a pure electric mode, a charging mode, an electric generation drive mode, a boost mode, a distributed drive mode, a roll-out mode, a roll-in mode, a stop-start mode, a location tracking mode, a scene mode, a pump-and-roll mode, and/or still other modes. In some embodiments, two or more modes may be active simultaneously. In some embodiments (e.g., in embodiments where the driveline 100 is a "dual drive" driveline that is not operable as a "hybrid" driveline, etc.), the driveline 100 is not operable in the charging mode of operation.

Pure Engine Mode

The controller 810 may be configured to operate the vehicle 10 in a pure engine mode of operation. To initiate the pure engine mode of operation, the controller 810 is configured to engage the clutch 300 to couple (i) the engine 202 to the TAD 400 and (ii) the engine 202 to the ETD 500. The engine 202 may, therefore, provide a mechanical output (e.g., based on a control signal from the controller 810, based on an input received from an accelerator pedal, etc.) to the TAD 400 to operate the accessories 412 and/or the ETD 500. During the pure engine mode of operation, the controller 810 is configured to control the ETD 500 such that the ETD 500 functions as a mechanical conduit or power divider between (i) the engine 202 and (ii) one or more other components of the driveline 100 including (a) the front axle 14 and/or the rear axle 16 and/or (b) the vehicle subsystem (s) including the pump system 600 and/or the second subsystem 610 (e.g., an aerial ladder assembly, etc.). In some embodiments, the ETD 500 is not configured to generate electricity based on a mechanical input received from the engine 202. In some embodiments, the ETD 500 is configured to generate electricity based on a mechanical input received from the engine 202, however, the controller 810 is configured to control the ETD 500 such that the ETD 500 does not generate electricity (e.g., for storage in the ESS 700, for use by the ETD 500, etc.) during the pure engine mode of operation.

In some embodiments, the controller 810 is configured to implement the pure engine mode of operation in response to a request from the operator of the vehicle 10 via the user interface 820. In some embodiments, the controller 810 is configured to implement the pure engine mode of operation in response to the SOC of the ESS 700 reaching or falling below a SOC threshold. In one embodiment, the SOC threshold is determined based on an amount of stored energy needed to perform one or more of the other modes of operation along the route of the vehicle 10 (e.g., the roll-out mode, the roll-in mode, the location tracking mode, etc.). In another embodiment, the SOC threshold is manufacturer or owner set (e.g., 10%, 20%, 25%, 30%, 40%, etc.). In some embodiments, the controller 810 is configured to prevent the pure engine mode of operation from being engaged (e.g., when the vehicle 10 is within a roll-out geofence, when the vehicle 10 is within a roll-in geofence, when the vehicle 10 is within a noise restriction geofence, when the vehicle 10 is within an emissions limiting geofence, regardless of the SOC of the ESS 700, etc.).

Pure Electric Mode

The controller 810 may be configured to operate the vehicle 10 in a pure electric mode of operation. To initiate the pure electric mode of operation, the controller 810 is configured to (i) turn off the engine 202 (if the engine 202 is on) and (ii) disengage the clutch 300 (if the clutch 300 is engaged) to decouple the engine 202 from the remainder of the driveline 100 (e.g., the TAD 400, the ETD 500, etc.). During the pure electric mode of operation, the ETD 500 is configured to draw and use power from the ESS 700 to provide a mechanical output (e.g., based on a control signal from the controller 810, based on an input received from an accelerator pedal, etc.) to (i) the TAD 400 to operate the accessories 412 and/or (ii) one or more other components of the driveline 100 including (a) the front axle 14 and/or the rear axle 16 and/or (b) the vehicle subsystem(s) including the pump system 600 and/or the second subsystem 610 (e.g., an aerial ladder assembly, etc.).

In some embodiments, the controller 810 is configured to implement the pure electric mode of operation in response to a request from the operator of the vehicle 10 via the user interface 820. In some embodiments, the controller 810 is configured to implement the pure electric mode of operation in response to the SOC of the ESS 700 being above the SOC threshold (e.g., to provide increased fuel efficiency, to reduce noise pollution, etc.). In one embodiment, the SOC threshold is determined based on an amount of stored energy needed to perform one or more of the other modes of operation along the route of the vehicle 10 (e.g., the roll-out mode, the roll-in mode, the location tracking mode, etc.). In some embodiments, the controller 810 is configured to implement the pure electric mode of operation regardless of the SOC of the ESS 700 (e.g., when the vehicle 10 is within a roll-out geofence, when the vehicle 10 is within a roll-in geofence, when the vehicle 10 is within a noise restriction geofence, when the vehicle 10 is within an emissions limiting geofence, etc.).

Charging Mode

The controller 810 may be configured to operate the vehicle 10 in a charging mode of operation. To initiate the charging mode of operation, the controller 810 is configured to engage the clutch 300 to couple (i) the engine 202 to the TAD 400 and (ii) the engine 202 to the ETD 500. The engine 202 may, therefore, provide a mechanical output (e.g., based on a control signal from the controller 810, based on an input received from an accelerator pedal, etc.) to the TAD 400 to operate the accessories 412 and/or the ETD 500. During the charging mode of operation, the controller 810 is configured to control the ETD 500 such that the ETD 500 functions at least partially as a generator. Specifically, the engine 202 provides a mechanical input to the ETD 500 and the ETD 500 converts the mechanical input into electricity. The ETD 500 may be configured to provide the generated electricity to the ESS 700 to charge the ESS 700 and, optionally, (i) provide the generated electricity to power one or more electrically-operated accessories or components of the vehicle 10 and/or (ii) use the generated electricity to operate the ETD 500 at least partially as a motor to drive one or more component of the driveline 100 including the front axle 14, the rear axle 16, the pump system 600, and/or the second subsystem 610.

In some embodiments, the controller 810 is configured to implement the charging mode of operation in response to a request from the operator of the vehicle 10 via the user interface 820. In some embodiments, the controller 810 is configured to implement the charging mode of operation in response to the SOC of the ESS 700 being below the SOC threshold. In some embodiments, the controller 810 is configured to implement the charging mode of operation only when the vehicle 10 is stationary and/or parked (e.g., at a scene, at the fire house, etc.). In such embodiments, the ETD 500 may not function as a motor during the charging mode of operation. Alternatively, the ETD 500 may function as a motor during the charging mode of operation to drive the subsystems (e.g., the pump system 600, the second subsystem 610, etc.).

Electric Generation Drive Mode

The controller 810 may be configured to operate the vehicle 10 in an electric generation drive mode of operation. In the electric generation drive mode of operation, (i) the engine 202 is configured to consume fuel from a fuel tank to drive one or more components of the driveline 100 and (ii) the ETD 500 is configured to generate electricity to drive one or more components of the driveline 100. To initiate the electric generation drive mode of operation, the controller 810 is configured to engage the clutch 300 to couple (i) the engine 202 to the TAD 400 and (ii) the engine 202 to the ETD 500. During the electric generation drive mode, (i) the engine 202 drives the TAD 400 and the ETD 500 through the clutch 300 using fuel and (ii) the ETD 500 (*a*) generates electricity based on the mechanical input from the engine 202 and (b) uses the generated electricity to drive the front axle 14, the rear axle 16, the pump system 600, and/or the second subsystem 610.

In some embodiments, the controller 810 is configured to implement the electric generation drive mode of operation in response to a request from the operator of the vehicle 10 via the user interface 820. In some embodiments, the controller 810 is configured to implement the electric generation drive mode of operation in response to the SOC of the ESS 700 being below the SOC threshold.

Boost Mode

The controller 810 may be configured to operate the vehicle 10 in a boost mode of operation. To initiate the boost mode of operation, the controller 810 is configured to engage the clutch 300 to couple (i) the engine 202 to the TAD 400 and (ii) the engine 202 to the ETD 500. During the boost mode, (i) the engine 202 drives the TAD 400 and the ETD 500 through the clutch 300 using fuel and (ii) the ETD 500 (a) generates electricity based on the mechanical input from the engine 202 and (b) uses the generated electricity and the stored energy in the ESS 700 to drive the front axle 14, the rear axle 16, the pump system 600, and/or the second subsystem 610. Such combined energy generation and energy draw facilitates "boosting" the output capabilities of the ETD 500.

In some embodiments, the controller 810 is configured to implement the boost mode of operation in response to a request from the operator of the vehicle 10 via the user interface 820. In some embodiments, the controller 810 is configured to implement the boost mode of operation in response to a need for additional output from the ETD 500 (and if there is sufficient SOC in the ESS 700) to drive the front axle 14, the rear axle 16, the pump system 600, and/or the second subsystem 610.

Distributed Drive Mode

In some embodiments, the ETD 500 includes an ETD clutch that facilitates decoupling the ETD 500 from the TAD 400 and, therefore, decoupling the ETD 500 from the engine 202 when the clutch 300 is engaged. In such embodiments, the controller 810 may be configured to operate the vehicle 10 in a distributed drive mode of operation. To initiate the distributed drive mode of operation, the controller 810 is configured to engage the clutch 300 to couple the engine 202 to the TAD 400 and disengage the ETD clutch to disengage the ETD 500 from the engine 202 and the TAD 400. During the distributed drive mode, (i) the engine 202 drives the TAD 400 through the clutch 300 using fuel and (ii) the ETD 500 drives the front axle 14, the rear axle 16, the pump system 600, and/or the second subsystem 610 using stored energy in the ESS 700.

In some embodiments, the controller 810 is configured to implement the distributed drive mode of operation in response to a request from the operator of the vehicle 10 via the user interface 820. In some embodiments, the controller 810 is configured to implement the distributed drive mode of operation to reduce a load on the engine 202 and/or the ETD 500 by distributing component driving responsibilities.

Roll-Out Mode

The controller 810 may be configured to operate the vehicle 10 in a roll-out mode of operation. For the roll-out mode of operation, the controller 810 is configured to operate the driveline 100 similar to the pure electric mode of operation. More specifically, the controller 810 is configured to start the vehicle 10 and operate the components of the driveline 100 (e.g., the TAD 400, the front axle 14, the rear axle 16, the pump system 600, the second subsystem 610, etc.) with the ETD 500 while the engine 202 is off until a roll-out condition it met. Once the roll-out condition is met, the controller 810 is configured to transition the driveline 100 to the pure electric mode, the pure engine mode, the charging mode, the electric generation drive mode, the boost mode, the distributed drive mode, the scene mode, or still another suitable mode depending on the current state of the vehicle 10 (e.g., SOC of the ESS 700, etc.) and/or the location of the vehicle 10 (e.g., en route to the scene, at the scene, in a noise reduction zone, in an emission free/reduction zone, etc.). The roll-out condition may be or include (i) the vehicle 10 traveling a predetermined distance or being outside of a roll-out geofence (e.g., indicated by the telematics data, the GPS data, etc.), (ii) the vehicle 10 reaching a certain speed, (iii) the vehicle 10 reaching a certain location (e.g., a scene, etc.; indicated by the telematics data, the GPS data, etc.), (iv) the vehicle 10 being driven for a period of time, (v) the SOC of the ESS 700 reaching or falling below the SOC threshold, and/or (vi) the operator selecting a different mode of operation. The roll-out mode of operation may facilitate preventing combustion emissions of the engine 202 filling the fire station, hanger, or other indoor or ventilation-limited location where the vehicle 10 may be located upon startup and take-off. For example, when in the roll-out mode of operation, the vehicle 10 may begin transportation to the scene without requiring startup of the engine 202. The engine 202 may then be started after the vehicle 10 has already begun transportation to the scene (if necessary).

In some embodiments, the controller 810 is configured to implement the roll-out mode of operation in response to a request from the operator of the vehicle 10 via the user interface 820. In some embodiments, the controller 810 is configured to implement the roll-out mode of operation in response to the telematics data and/or the GPS data indicating that (i) the vehicle 10 has been selected to respond to a scene and/or (ii) the vehicle 10 is inside of a roll-out geofence (e.g., inside or proximate a fire station, a hanger, another vehicle storage location that is indoors, a location with limited ventilation, etc.). In some embodiments, the controller 810 is configured to implement the roll-out mode of operation regardless of the SOC of the ESS 700, so long as the SOC of the ESS 700 is sufficient to complete the roll-out operation (e.g., which may be to simply drive out of the fire house or other minimal distance). In some embodiments, the controller 810 is configured to implement the roll-out mode only if the SOC of the ESS 700 is above a first SOC threshold and maintain operating the driveline 100 in the pure electric mode of the operation until the SOC of the ESS 700 reaches or falls below a second SOC threshold that is different than (e.g., greater than, less than, etc.) the first SOC threshold. By way of example, the first SOC threshold may be 40% and the second SOC threshold may be 20%.

Roll-In Mode

The controller 810 may be configured to operate the vehicle 10 in a roll-in mode of operation. For the roll-in mode of operation, the controller 810 is configured to operate the driveline 100 similar to the pure electric mode of operation. More specifically, the controller 810 is configured to turn off the engine 202 (if already on) and operate the components of the driveline 100 (e.g., the TAD 400, the front axle 14, the rear axle 16, the pump system 600, the second subsystem 610, etc.) with the ETD 500 while the engine 202 is off when a roll-in condition is present. When the roll-in condition is present, the controller 810 is configured to transition the driveline 100 from whatever mode the driveline 100 is currently operating in to the roll-in mode. The roll-in condition may be or include (i) the vehicle 10 entering a roll-in geofence (e.g., indicated by the telematics data, the GPS data, etc.), (ii) the vehicle 10 reaching a certain location (e.g., a fire house, a hanger, a location where the vehicle 10 is indoors or where ventilation to the outside is limited, etc.; indicated by the telematics data, the GPS data, etc.), and/or (iii) the operator selecting the roll-in mode of operation. The roll-in mode of operation may facilitate preventing combustion emissions of the engine 202 filling the fire station or other location where ventilation may be limited.

In some embodiments, the controller 810 is configured to implement the roll-in mode of operation in response to a request from the operator of the vehicle 10 via the user interface 820. In some embodiments, the controller 810 is configured to implement the roll-in mode of operation in response to the telematics data and/or the GPS data indicating that the vehicle 10 is inside of a roll-in geofence (e.g., inside or proximate a fire station, a hanger, another vehicle storage location that is indoors, a location with limited ventilation, etc.). In some embodiments, the controller 810 is configured to implement the roll-in mode of operation regardless of the SOC of the ESS 700, so long as the SOC of the ESS 700 is sufficient to complete the roll-in operation (e.g., which may be to simply drive into the fire house or other minimal distance).

Location Tracking Mode

The controller 810 may be configured to operate the vehicle 10 in a location tracking mode of operation. For the location tracking mode of operation, the controller 810 is configured to (i) monitor the telematics data and/or the GPS data as the vehicle 10 is driving and (ii) switch the driveline 100 between (a) a first mode of operation where the engine 202 is used (e.g., the pure engine mode of operation, the electric generation drive mode of operation, the charging mode of operation, the boost mode of operation, the distributed drive mode of operation, etc.) and (b) a second mode of operation where the engine 202 is not used (e.g., the pure electric mode of operation, the roll-out mode of operation, the roll-in mode of operation, etc.) based on the telematics data and/or the GPS data.

By way of example, the GPS data and/or the telematics data may include route details (i) between the current location of the vehicle 10 and a location ahead of the vehicle 10 or (ii) along a planned route of the vehicle 10. The route details may indicate emissions regulations and/or noise restriction information ahead of the vehicle 10 and/or along the planned route of the vehicle 10. The controller 810 may, therefore, be configured to monitor the location of the vehicle 10 and transition the driveline 100 from the first mode of operation where the engine 202 is used to the second mode of operation where the engine 202 is not used in response to the vehicle 10 approaching and/or entering an emission-restricted and/or noise-restricted zone (e.g., a roll-out geofence, a roll-in geofence, a noise restriction geofence, an emissions limiting geofence, etc.) to reduce or eliminate emissions and/or noise pollution emitted from the vehicle 10 due to operation of the engine 202. The controller 810 may then be configured to transition the driveline 100 back to the first mode of operation where the engine 202 is used after leaving the emission-restricted and/or noise-restricted zone. During the location tracking mode of operation, the controller 810 may, therefore, forecast future electric consumption needs and manage the SOC of the ESS 700 to ensure enough SOC is saved or regenerated to accommodate the electric consumption needs of the vehicle 10 along the route.

In some embodiments, the controller 810 is configured to implement the location tracking mode of operation in response to a request from the operator of the vehicle 10 via the user interface 820. In some embodiments, the controller 810 is configured to implement the location tracking mode of operation each time the vehicle 10 is turned on (e.g., if approved by the owner, etc.).

Stop-Start Mode

The controller 810 may be configured to operate the vehicle 10 in a stop-start mode of operation. For the stop-start mode of operation, the controller 810 is configured to transition the driveline 100 between (i) a first mode of operation where the engine 202 is used (e.g., the pure engine mode of operation, the electric generation drive mode of operation, the charging mode of operation, the boost mode of operation, the distributed drive mode of operation, etc.) and (ii) a second mode of operation where the engine 202 is not used (e.g., the pure electric mode of operation, etc.) in response to a stopping event. By way of example, the controller 810 may be configured to monitor for stopping events and then, if the vehicle 10 stays stationary for more than a time threshold (e.g., one, two, three, four, etc. seconds), turn off the engine 202 if the driveline 100 is currently operating in the first mode of operation where the engine 202 is used. The controller 810 may then be configured to initiate the second mode of operation where the engine 202 is not used (e.g., the pure electric mode of the operation, etc.) for the subsequent take-off (e.g., in response to an accelerator pedal input, etc.). The controller 810 may be configured to transition the driveline 100 back to the first mode of operation in response to a transition condition. The transition condition may be or include (i) the vehicle 10 traveling a predetermined distance, (ii) the vehicle 10 reaching a certain speed, (iii) the vehicle 10 being driven for a period of time, (iv) the SOC of the ESS 700 reaching or falling below the SOC threshold, and/or (v) the operator selecting the first mode of operation.

In some embodiments, the controller 810 is configured to implement the stop-start mode of operation in response to a request from the operator of the vehicle 10 via the user interface 820. In some embodiments, the controller 810 is configured to implement the stop-start mode of operation each time the vehicle 10 is turned on (e.g., if approved by the owner, etc.). In some embodiments, the controller 810 is configured to implement the stop-start mode of operation only if the SOC of the ESS 700 is above the SOC threshold.

Scene Mode

The controller 810 may be configured to operate the vehicle 10 in a scene mode of operation. For the scene mode of operation, the controller 810 is configured to control the ETD 500 to drive the subsystems including the pump system 600 and/or the second subsystem 610. In one embodiment, the controller 810 is configured to operate the driveline 100 in the pure engine mode of operation to provide the scene mode of operation. In some embodiments, the pure engine mode of operation is used regardless of the level of SOC of the ESS 700. In another embodiment, the controller 810 is configured to operate the driveline 100 in the pure electric mode of operation to provide the scene mode of operation. In such an embodiment, the use of the pure electric mode may be dependent upon the SOC of the ESS 700 being above a SOC threshold. In other embodiments, the controller 810 is configured to operate the driveline 100 in the electric generation drive mode of operation, the boost mode of operation, the distributed drive mode of operation, or the charging mode of operation to provide the scene mode of operation.

In some embodiments, the controller 810 is configured to implement the scene mode of operation in response to a request from the operator of the vehicle 10 via the user interface 820 (e.g., to engage the pump system 600, the second subsystem 610, etc.). In some embodiments, the controller 810 is configured to implement the scene mode of operation automatically upon detecting that the vehicle 10 arrived at the scene (e.g., based on the GPS data, etc.). In some embodiments, the controller 810 is configured to implement the scene mode of operation only if the vehicle 10 is in a park state. When leaving the scene, the controller 810 may be configured to implement the roll-out mode of operation, the pure electric mode of operation, the pure engine mode of operation, the electric generation drive mode of operation, the boost mode of operation, the distributed drive mode of operation, or the charging mode of operation dependent upon operational needs along the route back to the station and/or the current state of the vehicle 10 (e.g., the SOC of the ESS 700, roll-in requirements, noise restrictions, emissions restrictions, etc.).

Pump-and-Roll Mode

The controller 810 may be configured to operate the vehicle 10 in a pump-and-roll mode of operation. For the pump-and-roll mode of operation, the controller 810 is configured to control the ETD 500 to (i) drive the subsystems including the pump system 600 and/or the second subsystem 610 and (ii) the front axle 14 and/or the rear axle 16, simultaneously. In one embodiment, the controller 810 is configured to operate the driveline 100 in the pure engine mode of operation to provide the pump-and-roll mode of operation. In some embodiments, the pure engine mode of operation is used regardless of the level of SOC of the ESS 700. In another embodiment, the controller 810 is configured to operate the driveline 100 in the pure electric mode of operation to provide the pump-and-roll mode of operation. In such an embodiment, the use of the pure electric mode may be dependent upon the SOC of the ESS 700 being above a SOC threshold. In other embodiments, the controller 810 is configured to operate the driveline 100 in the electric generation drive mode of operation, the boost mode of operation, the distributed drive mode of operation, or the charging mode of operation to provide the pump-and-roll mode of operation. In some embodiments, the controller 810 is configured to implement the pump-and-roll mode of operation in response to a request from the operator of the vehicle 10 via the user interface 820 (e.g., to engage the pump system 600 and/or the second subsystem 610 while driving the vehicle 10, an accelerator pedal input while pumping, etc.).

Transition Between Electric Drive and Engine Drive Operations

The controller 810 may be configured to operate the vehicle 10 to seamlessly transition between (i) a first mode of operation where the engine 202 is not providing an input to the ETD 500 (e.g., the pure electric mode, the distributed drive mode, etc.) and (ii) a second mode of operation where the engine 202 is providing an input to the ETD 500 (e.g., the pure engine mode, the charging mode, the electric generation drive mode, the boost mode, etc.). Specifically, the controller 810 may be configured to control the mode transition to provide seamless power delivery, whether to the ground (e.g., the front axle 14 and/or the rear axle 16) or to PTO driven components (e.g., the pump system 600, the second subsystem 610, the aerial ladder assembly, etc.) to allow continuous, uninterrupted operation. The ability to seamlessly transition modes on the vehicle 10 is particularly important to meet the operational mission profile that such a vehicle is expected to deliver.

By way of example, the controller 810 may be configured transition from the first mode of operation (i.e., where no input is provided by the engine 202 to the ETD 500) to the second mode of operation (i.e., where an input is provided by the engine 202 to the ETD 500), or vice versa, in response to a transition condition. As described above, the transition condition(s) may be or include the SOC of the ESS 700 reaching a minimum SOC threshold, an operator transition command, a roll-out geofence, a roll-in geofence, an emissions limiting geofence, a noise restriction geofence, and/or still other conditions. In response to the transition condition and to provide seamless transition from the first mode to the second mode, the controller 810 may be configured to (i) start the engine 202 (if off), (ii) adjust the speed of the engine 202 to match the speed of the ETD 500 at the input thereof, and (iii) once the speed is matched, engage the clutch 300 to couple the engine 202 to the ETD 500. In embodiments where the ETD 500 includes the ETD clutch, the controller 810 may be configured to engage the clutch 300 (if not already engaged) and the ETD clutch when the speed is matched. In some embodiments (e.g., embodiments where the ETD 500 does not charge the ESS 700 based on the mechanical input received from the engine 202), at the moment when the clutch 300 and/or the ETD clutch are engaged, the controller 810 may be configured to control the ETD 500 to prevent energy from being transferred to the ESS 700 (if the ETD 500 is being operated to generate electricity in the second mode). In some embodiments, the controller 810 is configured to physically disconnect the ESS 700 from the ETD 500 (e.g., by opening ESS contactors) to provide a physical barrier between the ESS 700 and the ETD 500. However, such physical disconnection would prevent charging the ESS 700 with the ETD 500 during a regenerative braking event.

Alternative Drivelines

Referring to FIGS. 31-48, alternatives to the driveline 100 are shown, according to various embodiments. Any of the drivelines shown in FIGS. 31-48 can be implemented in the vehicle 10 in place of the driveline 100. The drivelines shown in FIGS. 31-48, may be similar to the driveline 100 (e.g., including front and rear axles, etc.) and can be configured to transfer mechanical energy from a source (e.g., an electric motor, an internal combustion engine, etc.) to one or more wheels, axles, systems (e.g., a pump system), ESS, etc. of the vehicle 10. In some embodiments, any of the drivelines shown in FIGS. 31-48 include an internal combustion engine configured to provide mechanical energy.

Any of the drivelines shown in FIGS. 31-48 can include a clutched TAD for providing power or mechanical energy to any of an air conditioning ("AC") compressor, an air compressor, a power steering system or pump, an alternator, etc. Any of the drivelines shown in FIGS. 31-48 can be integrated with a battery (e.g., a 155 kW battery at a 2 Coulomb max discharge). Any of the drivelines shown in FIGS. 31-48 can be integrated with an electrical or controller area network ("CAN") of the vehicle 10. Any of the drivelines of FIGS. 31-48 can be integrated with pump operation or controls of the vehicle 10, operator interface controls of the vehicle 10, or power management controls of the vehicle 10.

Alternative 1—E-Axle Driveline

Figure 31:
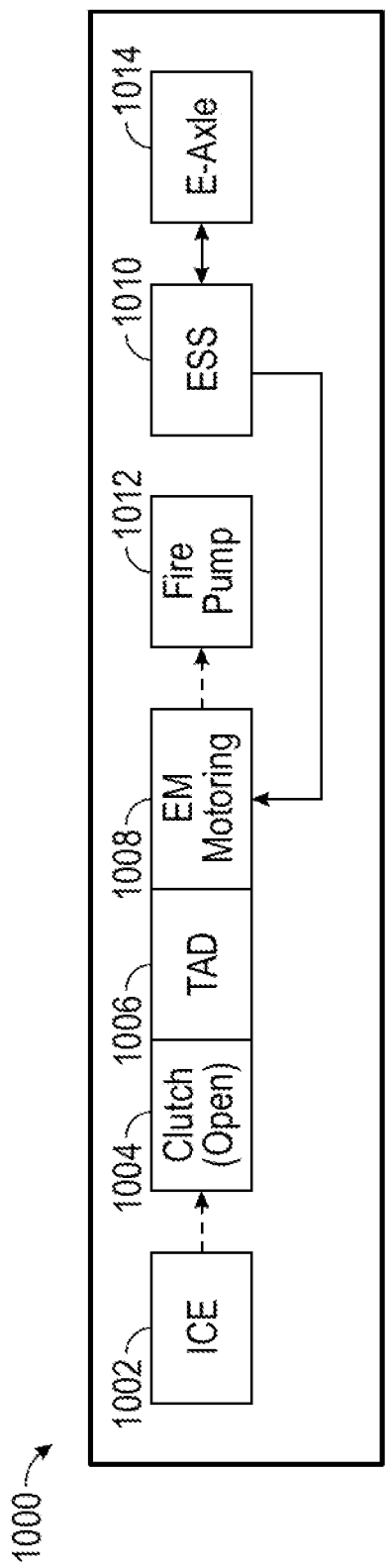
FIG. 31 is a schematic diagram of an E-axle driveline in a first mode, according to an exemplary embodiment.
Figure 32:
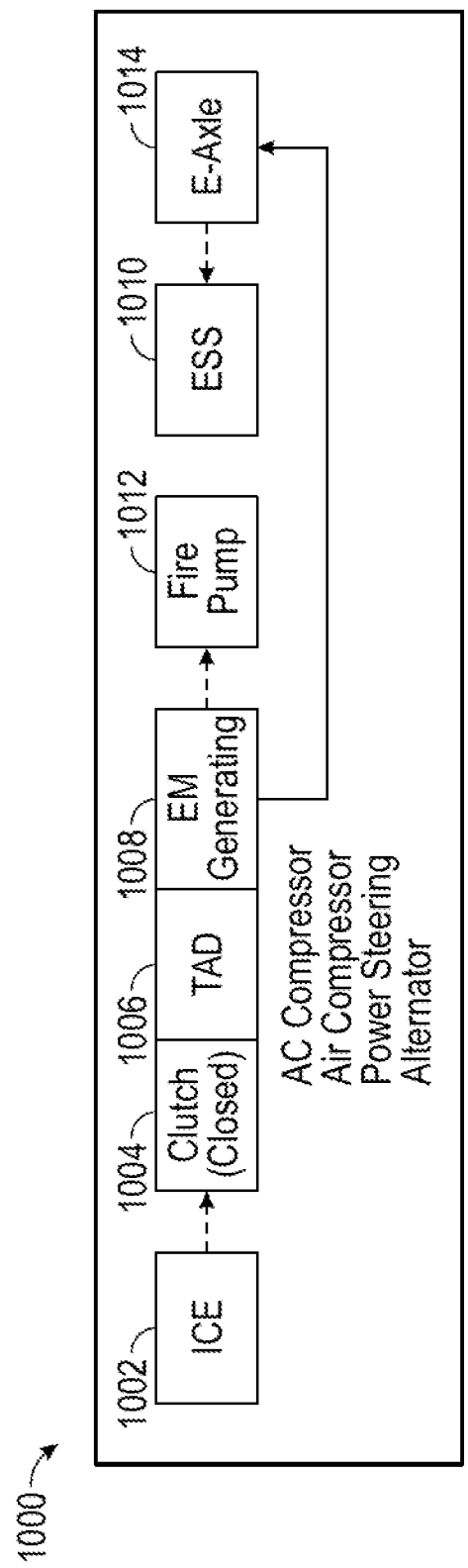
FIG. 32 is a schematic diagram of the E-axle driveline of FIG. 31 in a second mode, according to an exemplary embodiment.
Figure 33:
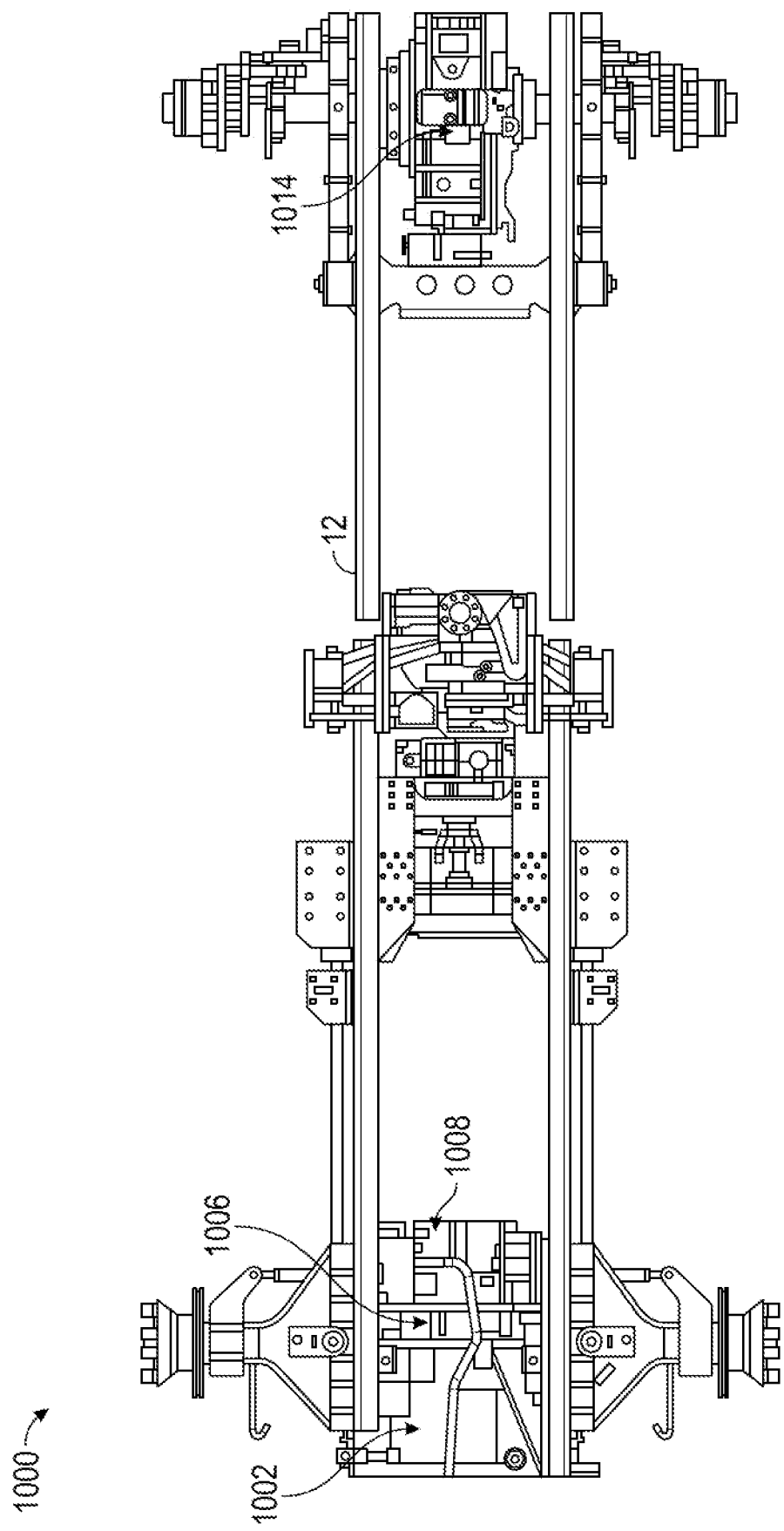
FIG. 33 is a top view of the E-axle driveline of FIG. 31 implemented in the fire fighting vehicle of FIG. 1, according to an exemplary embodiment.

Referring to FIGS. 31-33, an E-axle driveline 1000 includes an internal combustion engine ("ICE") 1002, a TAD 1006 including a clutch 1004, an electric motor 1008, a fire pump 1012, an ESS 1010, and an E-axle 1014, according to an exemplary embodiment. The ICE 1002 may be the same as or similar to the engine 202 as described in greater detail above. The clutch 1004 and the TAD 1006 may be the same as or similar to the TAD 400 as described in greater detail above. The fire pump 1012 may be the same as or similar to the pump 604 as described in greater detail above. The ESS 1010 may be the same as or similar to the ESS 700 as described in greater detail above. The E-axle driveline 1000 is transitionable between an electric vehicle (EV) mode (shown in FIG. 31) and an ICE mode (shown in FIG. 32). The E-axle 1014 may be between a 200 to a 400 kilowatt (kW) E-axle. In some embodiments, the E-axle 1014 is a Meritor or an Allison E-axle. For example, the E-axle 1014 may be an Allison AXE100D E-axle (e.g., a 310 kW E-axle). In some embodiments, the electric motor 1008 is an Avid AF240 electric motor.

Referring particularly to FIG. 31, the E-axle driveline 1000 is shown in the EV mode, according to an exemplary embodiment. The E-axle driveline 1000 can be transitioned into the EV mode by transitioning the clutch 1004 into an open position or mode (e.g., a disengaged mode). When the E-axle driveline 1000 is in the EV mode, the ESS 1010 is configured to provide electrical power to the electric motor 1008. The electric motor 1008 consumes the electrical energy and can drive the fire pump 1012 when the E-axle driveline 1000 is in the EV mode. The electric motor 1008 can also drive one or more accessories (e.g., through a power take-off) such as an AC compressor, an air compressor, a power steering system, an alternator, etc. When the E-axle driveline 1000 is in the EV mode, the E-axle 1014 receives electrical energy from the ESS 1010 and uses the electrical energy to drive the wheels 18 of the vehicle 10 (e.g., for transportation). In this way, the vehicle 10 can operate using electrical energy for transportation, accessories, the fire pump 1012, etc.

Referring particularly to FIG. 32, the E-axle driveline 1000 is shown in the ICE mode, according to an exemplary embodiment. The clutch 1004 can be transitioned into the closed mode or position (e.g., an engaged mode or position) to transition the E-axle driveline 1000 into the ICE mode. When the E-axle driveline 1000 is in the ICE mode, the ICE 1002 is configured to drive the electric motor 1008 through the clutch 1004 and the TAD 1006 so that the electric motor 1008 generates electrical energy. The ICE 1002 can also drive one or more accessories of the vehicle 10 (e.g., the air conditioner compressor, the air compressor, the power steering system, the alternator, etc.) through a power take-off. The E-axle 1014 can use electrical energy generated by the electric motor 1008 to drive the wheels 18 of the vehicle 10. The E-axle 1014 can also provide electrical energy to the ESS 1010 for storage and later use (e.g., for use when the E-axle driveline 1000 is transitioned into the EV mode shown in FIG. 31).

Advantageously, the E-axle driveline 1000 as shown in FIGS. 31-33 can have a reduced size or a smaller footprint compared to other drivelines. In some embodiments, the E-axle driveline 1000 facilitates in-frame battery packaging of various battery cells of the ESS 1010. The E-axle driveline 1000 can also facilitate pump and roll operations.

Referring to FIG. 34, a table 1020 provides various possible embodiments of the E-axle driveline 1000 and corresponding properties resulting from each possible embodiment. For example, the E-axle driveline 1000 can include an X12-500 Cummins engine for the ICE 1002, thereby providing an 82% startability, a 49.7 mph speed on a 6% grade, a 74.9 mph speed on a 0.25% grade, a 5.9% grade at 50 mph, a 18.6% grade at 20 mph, and a 9.6 second time to accelerate from 0 mph to 35 mph for the vehicle 10. In another exemplary embodiment, the E-axle driveline 1000 can include an L9-450 Cummins engine for the ICE 1002, which results in the vehicle 10 having a 44% startability, a 43.8 mph speed on a 6% grade, a 70.4 mph speed on a 0.25% grade, a 5.1% grade at 50 mph, a 14% grade at 20 mph, and an 11.1 second acceleration time from 0 to 35 mph. In another exemplary embodiment, the E-axle driveline 1000 includes an AXE100D 310 kW 550 volt continuous E-axle, an AXE100D 310 kW 550 volt peak E-axle, an AXE100D continuous E-axle, or an AXE100D peak E-axle having the startability, speed on a 6% grade, speed on a 0.25% grade, % grade at 50 mph, % grade at 20 mph, and 0-35 mph acceleration time as shown in table 1120.

Figure 35:
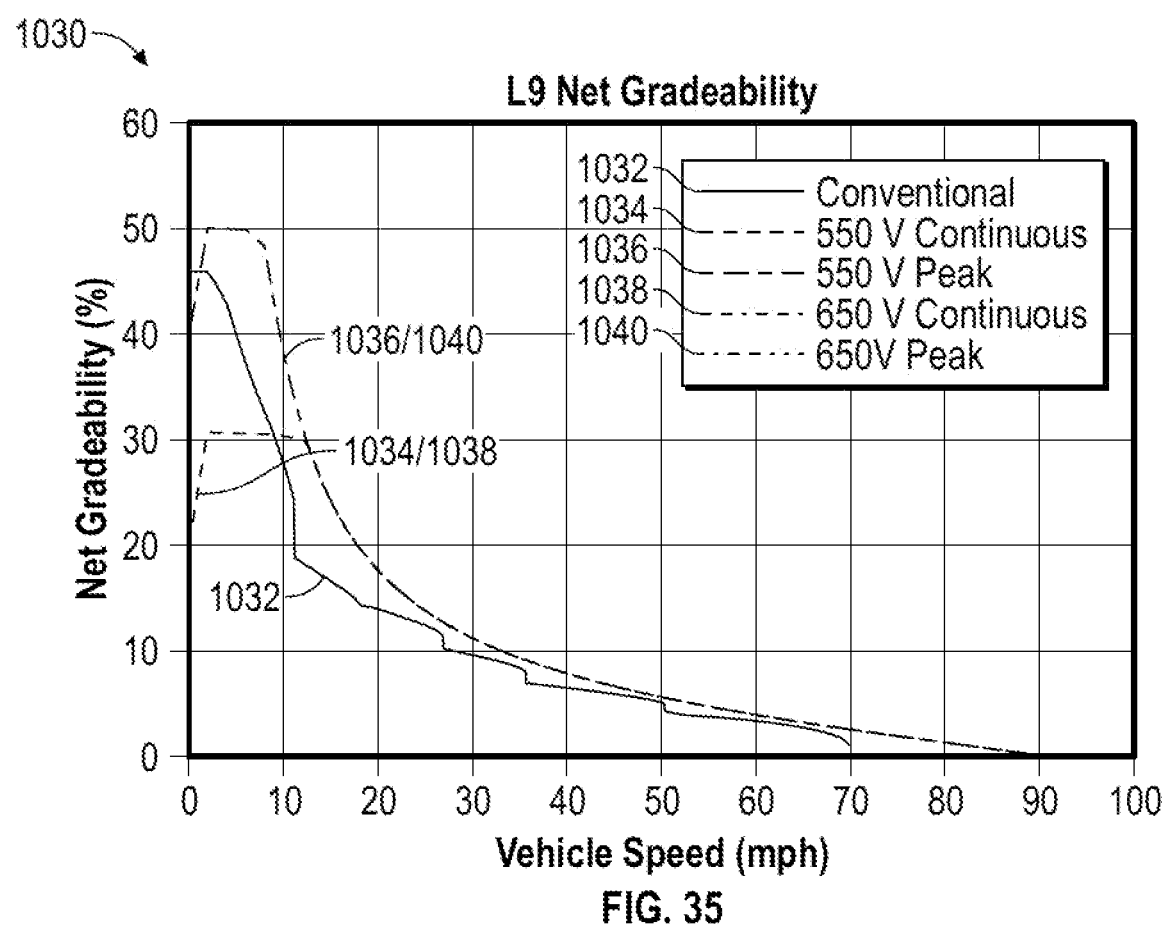
FIG. 35 is a graph showing grade versus vehicle speed for the E-axle driveline of FIGS. 31-33, according to an exemplary embodiment.

Referring to FIG. 35, a graph 1030 of net gradeability (in %) versus vehicle speed (in mph) is shown for a conventional axle (series 1032), the E-axle driveline 1000 with a 550 volt continuous E-axle (series 1034), the E-axle driveline 1000 with a 550 volt peak E-axle (series 1036), the E-axle driveline 1000 with a 650 volt continuous E-axle (series 1038), and the E-axle driveline 1000 with a 650 volt peak E-axle (series 1040).

Figures 36, 37:
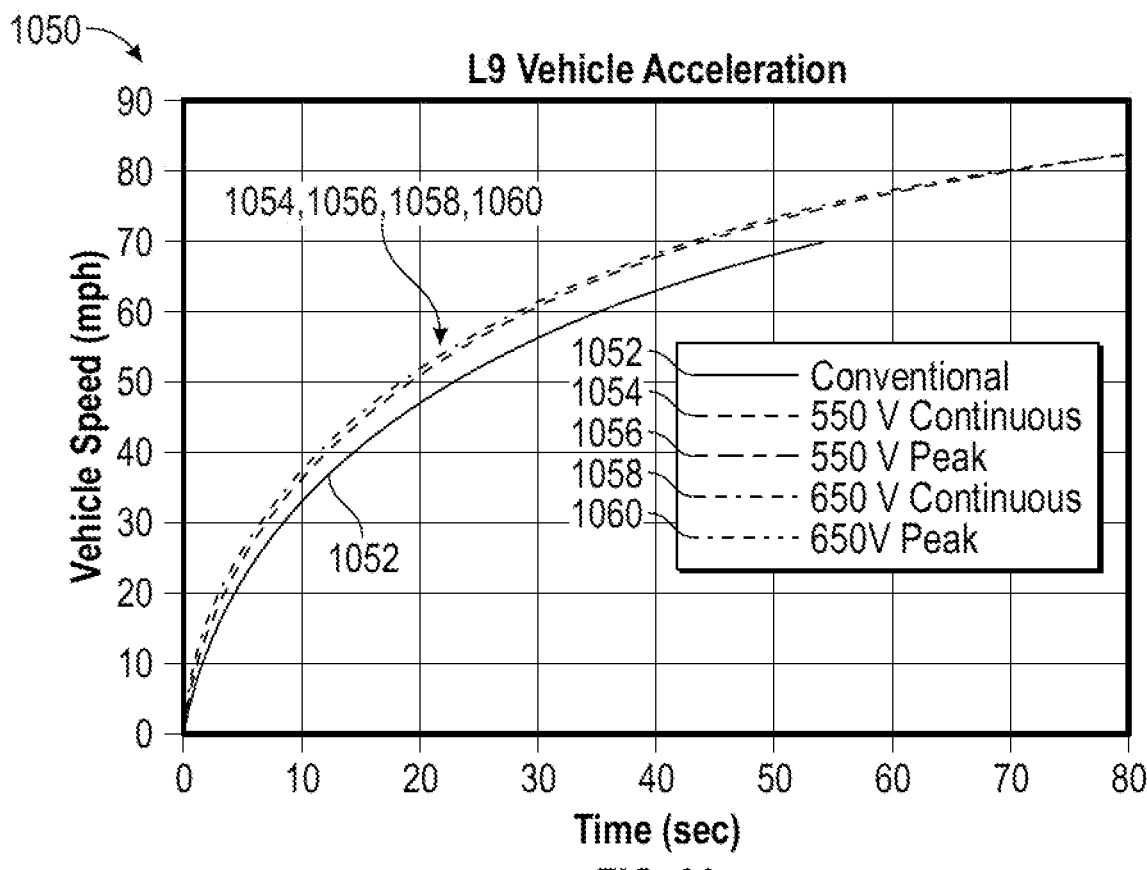
FIG. 36 is a graph showing vehicle speed versus time for the E-axle driveline of FIGS. 31-33, according to an exemplary embodiment.
FIG. 37 is a table providing performance properties of the fire fighting vehicle of FIG. 1 having the E-axle driveline of FIGS. 31-33, according to an exemplary embodiment.

Referring to FIG. 36, a graph 1050 of vehicle speed (in mph) versus time (in seconds) is shown for the conventional axle (series 1052), the E-axle driveline 1000 with a 550 volt continuous E-axle (series 1054), the E-axle driveline 1000 with a 550 volt peak E-axle (series 1056), the E-axle driveline 1000 with a 650 volt continuous E-axle (series 1058), and the E-axle driveline 1000 with a 650 volt peak E-axle (series 1060). As shown in FIG. 36, the E-axle driveline 1000 with the 550 peak or continuous E-axle have similar operating characteristics to the E-axle driveline 1000 with the 650 peak or continuous E-axle, and both configurations have improved speed versus time when compared to the conventional axle (series 1052).

Referring to FIG. 37, a table 1070 provides different startabilities (in %), acceleration times from 0 to 35 mph, and acceleration times from 0 to 65 mph for various implementations of the E-axle 1014 in the vehicle 10. For example, the E-axle 1014 may result in the vehicle 10 having a startability of 82%, with a 0 to 35 mph acceleration time of 9.6 seconds (e.g., under 10 seconds), and a 0 to 65 mph acceleration time of 36 seconds (e.g., under 40 seconds). The E-axle 1014 can also result in the vehicle 10 having a startability of 44%, with a 0 to 35 mph acceleration time of 11.1 seconds, and a 0 to 65 mph acceleration time of 44 seconds. The E-axle 1014 can also result in the vehicle 10 having a startability of 15%, with a 0 to 35 mph acceleration time of 18.9 seconds, and a 0 to 65 mph acceleration time of 92.7 seconds. The E-axle 1014 can also result in the vehicle 10 having a startability of 30%, with a 0 to 35 mph acceleration time of 11.2 seconds, and a 0 to 65 mph acceleration time of 53.5 seconds.

Figure 38:
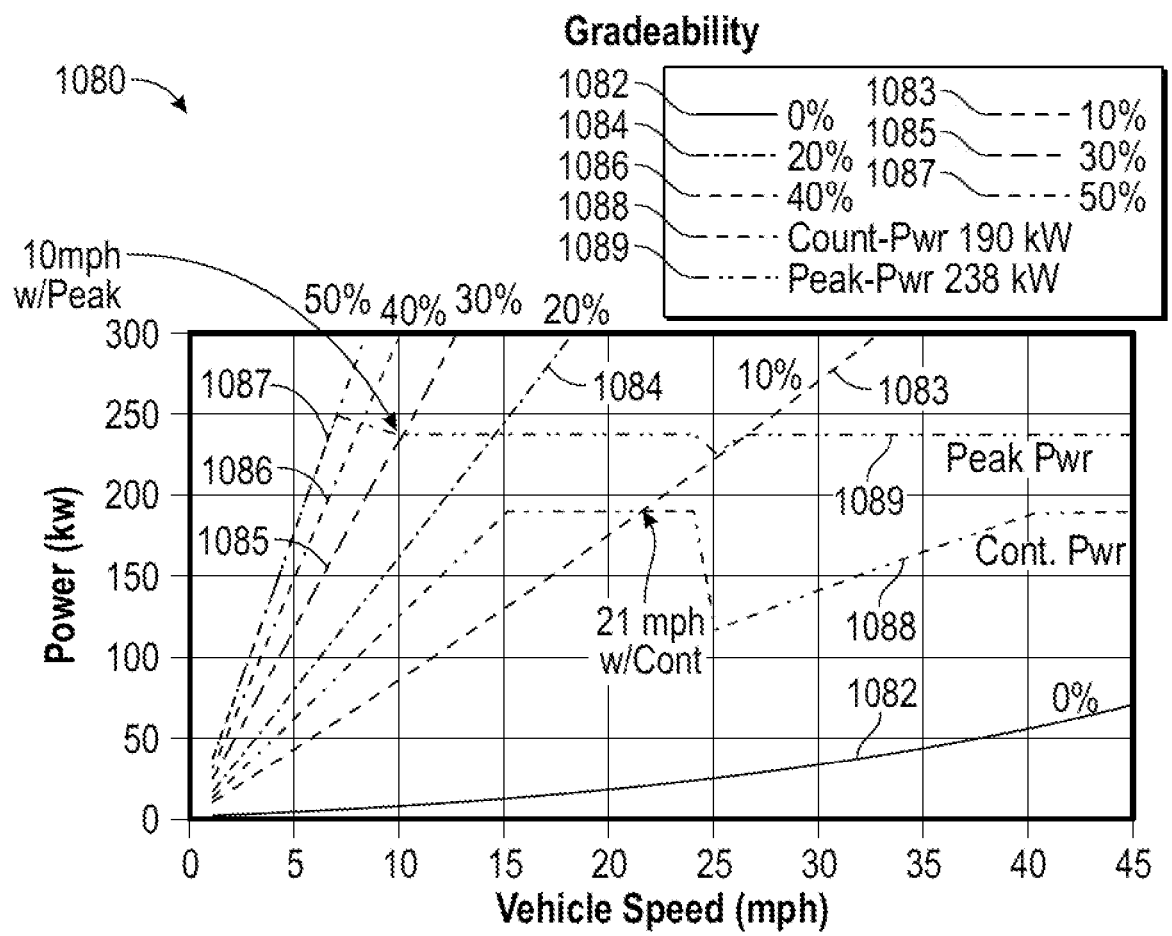
FIG. 38 is a graph showing power versus vehicle speed for different grades and power consumption of the E-axle driveline of FIGS. 31-33, according to an exemplary embodiment.

Referring to FIG. 38, a graph 1080 shows gradeability for power (in kW) versus vehicle speed (in mph) for the vehicle 10 with the E-axle driveline 1000, according to an exemplary embodiment. The graph 1080 incudes a series 1082 for 0% grade, a series 1083 for 10% grade, a series 1084 for 20% grade, a series 1085 for 30% grade, a series 1086 for 40% grade, a series 1087 for 50% grade, a series 1088 for continuous power consumption of the E-axle driveline 1000 (e.g., 190 kW), and a series 1089 for peak power consumption of the E-axle driveline 1000 (e.g., 238 kW). As shown in FIG. 38, the vehicle 10 implemented with the E-axle driveline 1000 can operate at continuous power consumption for a 10% grade at 21 mph, or at peak power consumption on a 30% grade at 10 mph.

Figure 39:
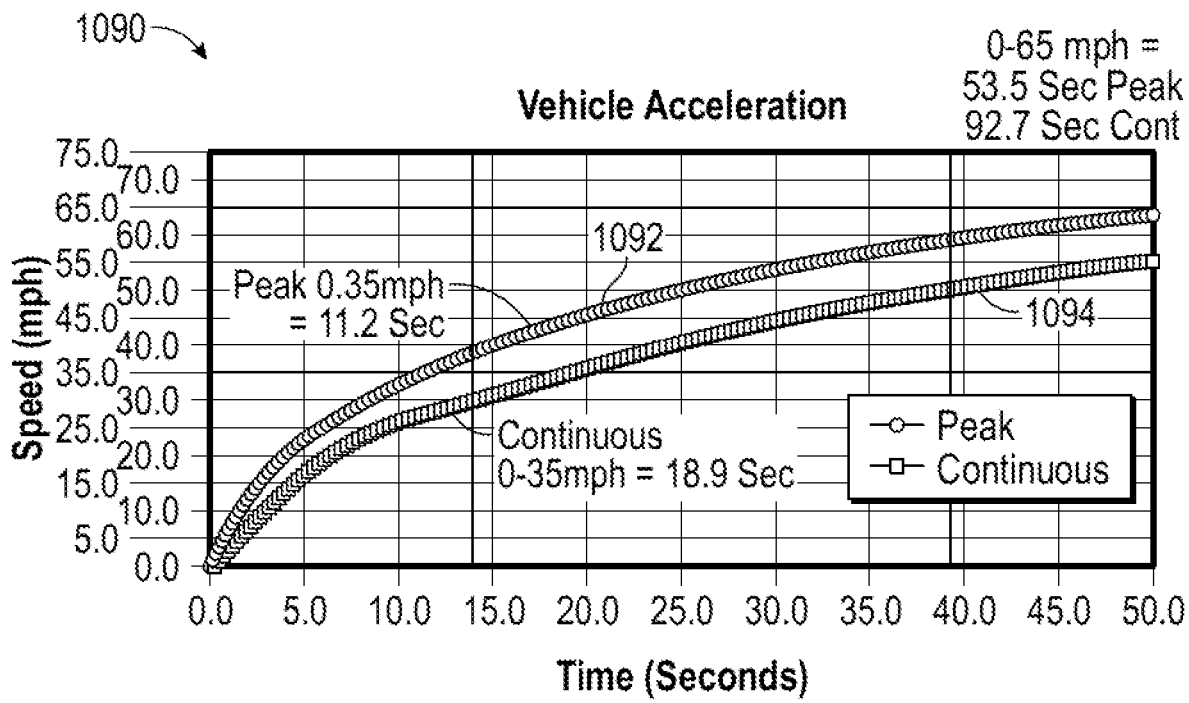
FIG. 39 is a graph showing vehicle speed versus time for the fire fighting vehicle of FIG. 1 having the E-axle driveline of FIGS. 31-33, according to an exemplary embodiment.

Referring to FIG. 39, a graph 1090 shows vehicle acceleration of the vehicle 10 with the E-axle driveline 1000 implemented, according to an exemplary embodiment. The graph 1090 shows speed (in mph) versus time (in seconds). The graph 1090 includes a series 1092 and a series 1094. The series 1092 shows vehicle speed with respect to time for peak power consumption. As shown in FIG. 39, the vehicle 10 can achieve an acceleration time from 0 to 65 seconds of 53.5 seconds when operating at peak electric energy consumption. The vehicle 10 can also achieve an acceleration time from 0 to 35 mph of 11.2 seconds when operating at peak electric energy consumption. The series 1094 shows vehicle speed with respect to time for continuous energy consumption of the E-axle driveline 1000. As shown in FIG. 39, the vehicle 10 can achieve an acceleration time from 0 to 65 mph of 92.7 seconds when operating at continuous energy consumption. The vehicle 10 can also achieve an acceleration time from 0 to 35 mph of 18.9 seconds when operating at continuous energy consumption.

Alternative 2—EV Transmission

Figure 40:
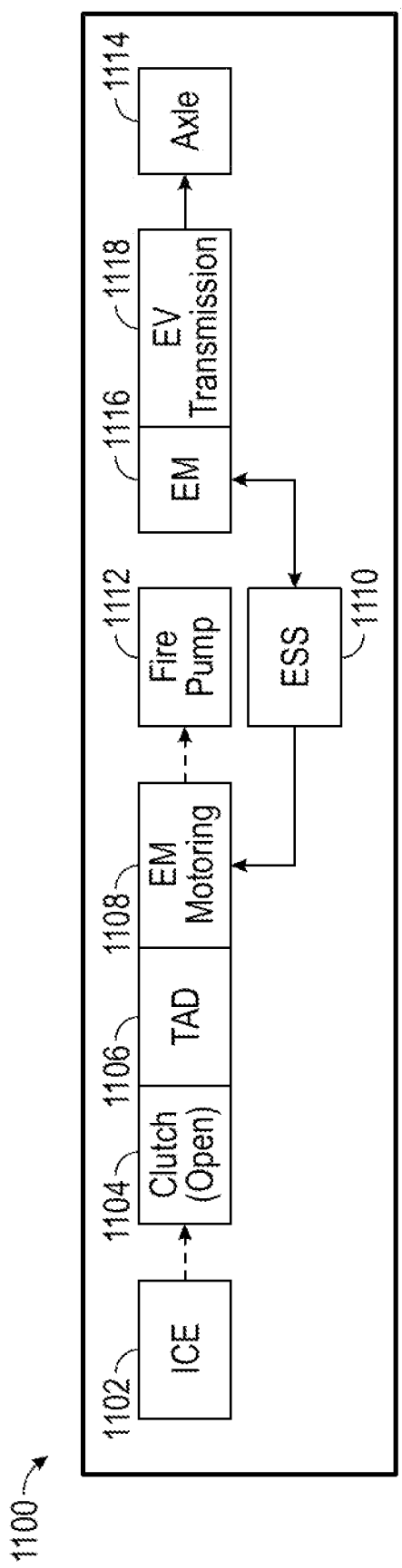
FIG. 40 is a schematic diagram of an EV transmission driveline in a first mode, according to an exemplary embodiment.
Figure 41:
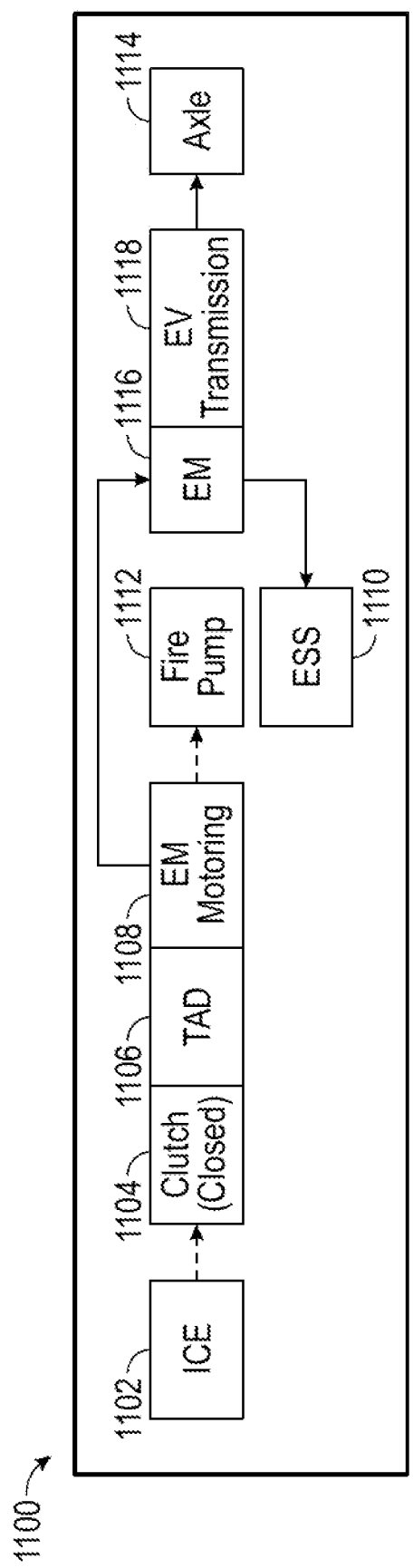
FIG. 41 is a schematic diagram of the EV transmission driveline of FIG. 40 in a second mode, according to an exemplary embodiment.
Figure 42:
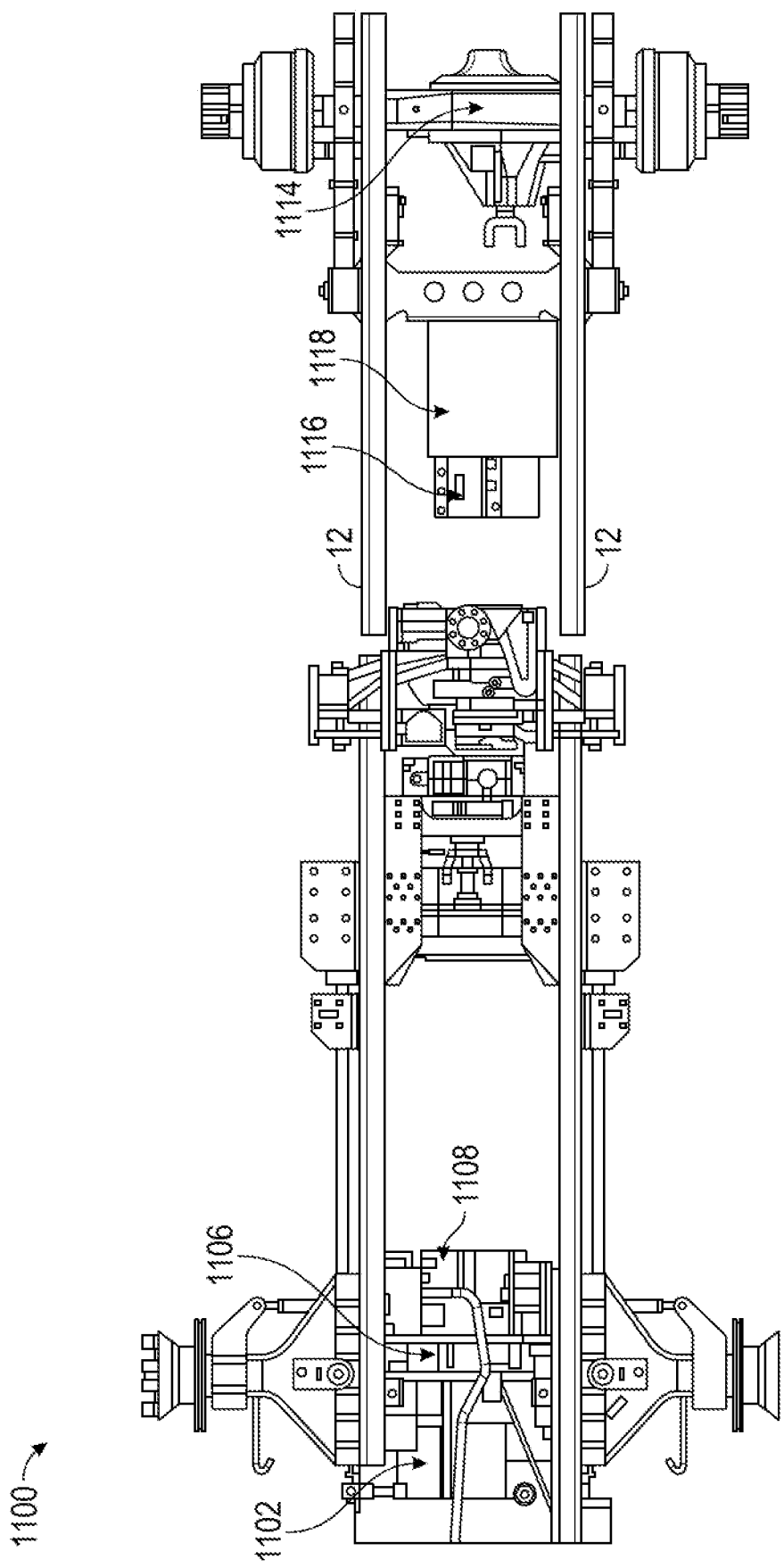
FIG. 42 is a top view of the EV transmission driveline of FIG. 40 implemented in the fire fighting vehicle of FIG. 1, according to an exemplary embodiment.

Referring to FIGS. 40-42, an EV transmission driveline 1100 includes an ICE 1102, a TAD 1106 including a clutch 1104, a first electric motor 1108, a fire pump 1112, an ESS 1110, a second electric motor 1116, an EV transmission 1118, and an axle 1114. The ICE 1102 can be the same as or similar to the engine 202 and/or the ICE 1002. The TAD 1106 can be the same as or similar to the TAD 400 and/or TAD 1006. The first electric motor 1108 can be the same as or similar to the electric motor 1008. The fire pump 1112 and the ESS 1110 can be the same as or similar to the pump 604 and/or the fire pump 1012 and the ESS 700 and/or the ESS 1010.

FIG. 38 shows the EV transmission driveline 1100 operating in an EV mode. FIG. 39 shows the EV transmission driveline 1100 operating in an ICE mode. The EV transmission driveline 1100 is transitionable between the EV mode and the ICE mode by operation of the clutch 1104. For example, the clutch 1104 can be transitioned into an open mode or configuration in order to transition the EV transmission driveline 1100 into the EV mode or into a closed mode or configured in order to transition the EV transmission driveline 1100 into the ICE mode. When the EV transmission driveline 1100 is in the EV mode, the first electric motor 1108 can draw electrical energy from the ESS 1110 and use the electrical energy to drive the fire pump 1112 (e.g., the pump system 600, a pump system for pumping water, etc.). When the EV transmission driveline 1100 is in the EV mode, the second electric motor 1116 can also draw energy from the ESS 1110 and use the energy to drive the EV transmission 1118. The EV transmission 1118 can receive mechanical energy output from the electric motor 1116 and output mechanical energy having a different speed or torque than the received mechanical input. The EV transmission 1118 provides a mechanical output to the axle 1114 for driving the tractive elements or the wheels 18 of the vehicle 10. In some embodiments, the second electric motor 1116 can be back-driven in an opposite direction (e.g., when the axle 1114 drives the electric motor 1116 through the EV transmission 1118 when the vehicle 10 rolls down a grade or due to regenerative braking) so that the second electric motor 1116 function as a generator, and generates electrical energy that is stored in the ESS 1110.

When the EV transmission driveline 1100 is in the ICE mode, the clutch 1104 is transitioned into the closed mode or configuration. The ICE 1102 is configured to drive the TAD 1106 through the closed clutch 1104 (e.g., while consuming fuel). The TAD 1106 is driven by the ICE 1102 and drives the first electric motor 1108. The first electric motor 1108 can drive the fire pump 1112 and/or can generate electrical energy (e.g., functioning as a generator) when driven by the TAD 1106 and the ICE 1102. The electrical energy generated by the first electric motor 1108 can be provided to the second electric motor 1116. The second electric motor 1116 can use some of the electrical energy to drive the EV transmission 1118 and the axle 1114. In some embodiments, some of the electrical energy generated by the first electric motor 1108 is provided to the ESS 1110 when the EV transmission driveline 1100 operates in the ICE mode to charge the ESS 1110 and store electrical energy for later use (e.g., when the EV transmission driveline 1100 is in the EV mode).

The EV transmission 1118 can be a four gear EV transmission that is configured to operate with the electric motor 1116 based on peak electrical energy or continuous electrical energy (e.g., different power thresholds). The EV transmission 1118 can be transitioned between different gears to provide a different gear ratio between the electric motor and the axle 1114.

Figures 43, 44:
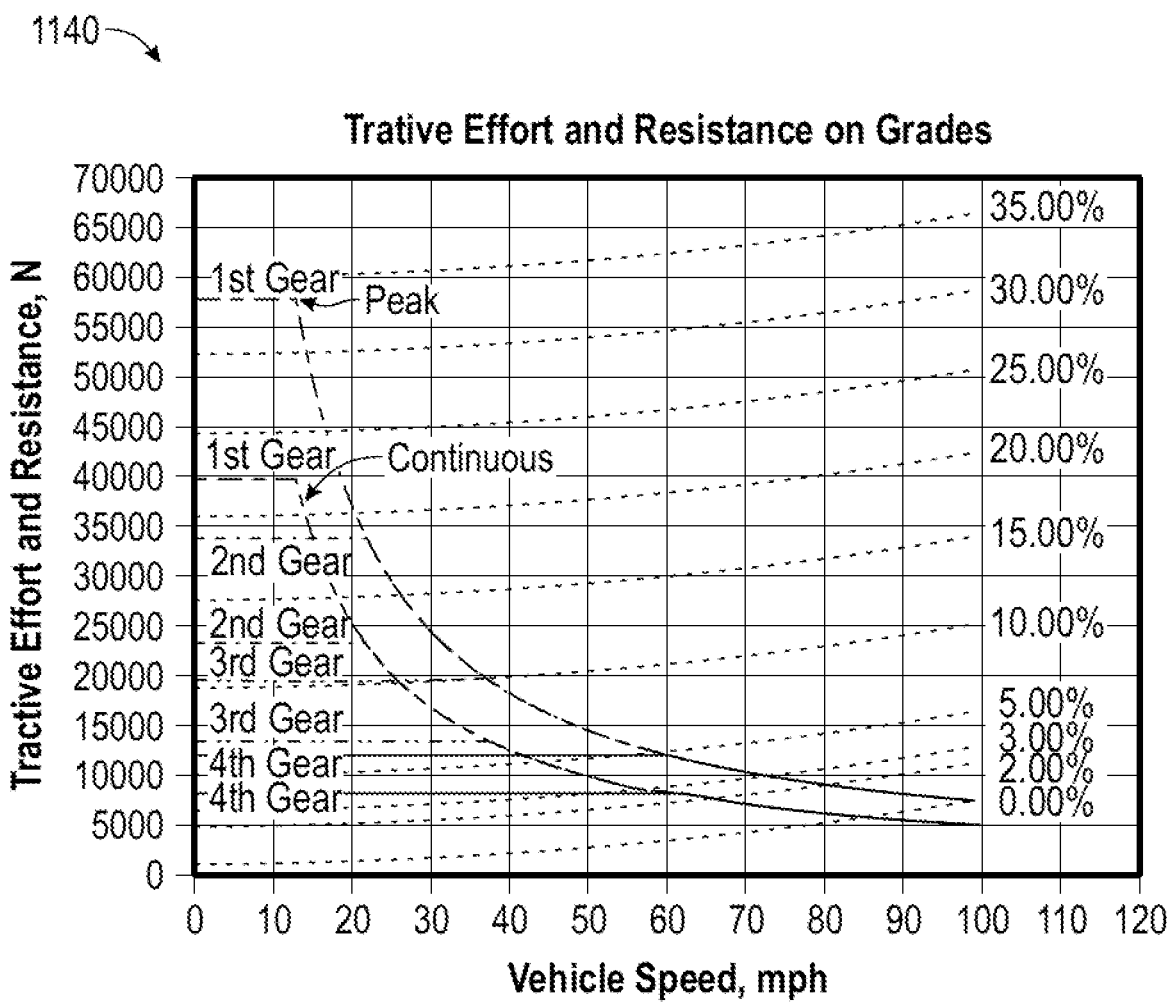
FIG. 43 is a table providing different properties of the fire fighting vehicle of FIG. 1 having the EV transmission driveline of FIGS. 40-42, according to an exemplary embodiment.
FIG. 44 is a graph showing tractive effort and resistance versus vehicle speed for different grades and gears of the EV transmission driveline of FIGS. 40-42, according to an exemplary embodiment.

Referring to FIG. 43, a table 1130 provides different properties of the vehicle 10 resulting from the EV transmission driveline 1100 for different implementations of the second electric motor 1116 and the EV transmission 1118. For example, in a first embodiment of the EV transmission driveline 1100, the vehicle 10 has a startability of 82% with a corresponding acceleration time from 0 to 35 mph of 9.6 seconds, and an acceleration time from 0 to 65 mph of 36 seconds (e.g., if the EV transmission driveline 1100 includes an Enforcer X12-500). In a second embodiment of the EV transmission driveline 1100, the vehicle 10 has a startability of 44% with an acceleration time from 0 to 35 mph of 11.1 seconds, and an acceleration time from 0 to 65 mph of 44 seconds (e.g., if the EV transmission driveline 1100 includes an Enforcer L9-450). In a third embodiment of the EV transmission driveline 1110, the vehicle 10 has a storability of 33% with an acceleration time from 0 to 35 mph of 13.5 seconds, and an acceleration time from 0 to 65 mph of 55 seconds (e.g., if the EV transmission driveline 1100 includes an Eaton transmission and 250 kW electric motor).

Figure 45:
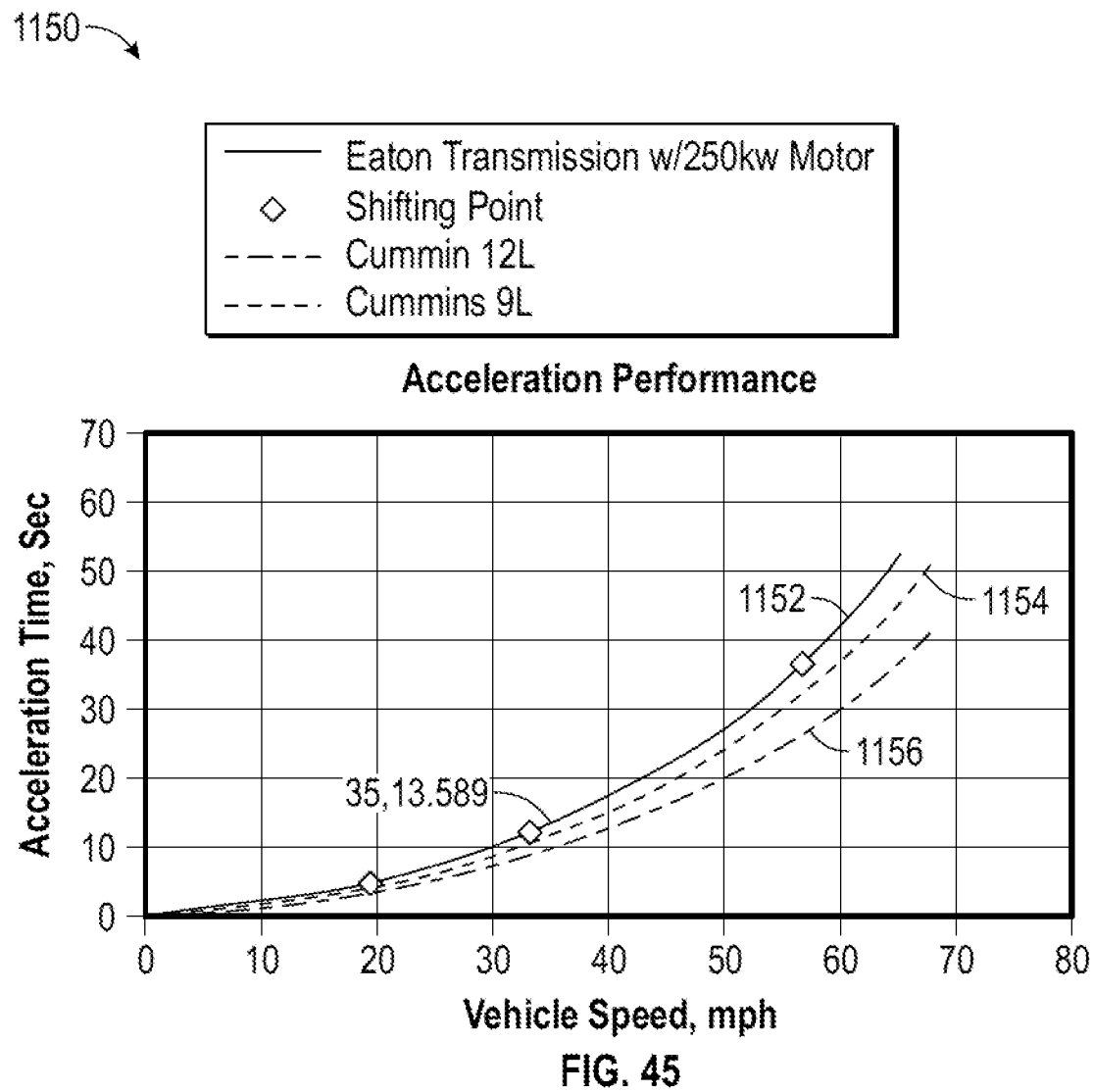
FIG. 45 is a graph showing acceleration time versus vehicle speed for the fire fighting vehicle of FIG. 1 having the EV transmission driveline of FIGS. 40-42, according to an exemplary embodiment.

Referring to FIGS. 44 and 45, a graph 1140 and a graph 1150 show estimated performance for the vehicle 10 based on a notional motor curve. Graph 1140 shows tractive effort and resistance (N, the Y-axis) with respect to vehicle speed (in mph, the X-axis). Graph 1140 shows the tractive effort and resistance versus vehicle speed for different grades for operation in a first gear, a second gear, a third gear, and a fourth gear for both peak power consumption and continuous (or nominal) power consumption.

Graph 1150 shows acceleration time in seconds (the Y-axis) with respect to vehicle speed in mph (the X-axis). Graph 1150 includes a series 1152 illustrating acceleration time versus speed for an EV transmission (e.g., an Eaton transmission) with a 250 kW electric motor, and series 1154-1156 showing acceleration time versus speed for different internal combustion engines. As shown in FIG. 45, the acceleration time with respect to vehicle speed for series 1152 is comparable to series 1154 and series 1156.

Advantageously, the EV transmission driveline 1100 can retrofit existing electric motors with a 4 speed EV transmission. In some embodiments, the EV transmission driveline 1100 can use a non-powered (e.g., a non-electric) axle. For example, the axle 1114 may be the same as used on a driveline that is powered by an internal combustion engine only. Advantageously, the EV transmission driveline 1100 facilitates pump and roll as an option. The EV transmission driveline 1100 can also facilitate scalable performance.

Alternative 3—Integrated Generator/Motor

Figure 48:
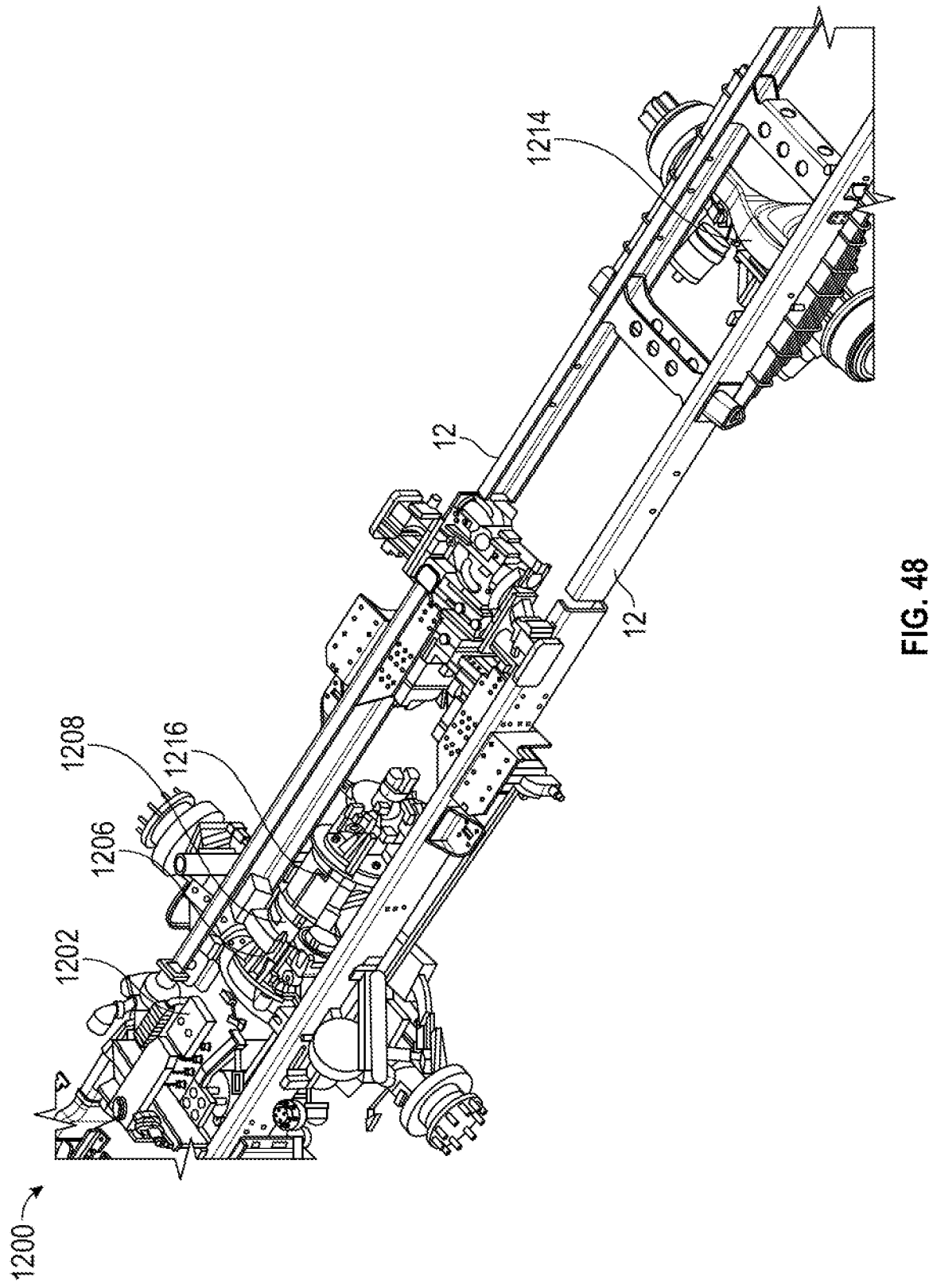
FIG. 48 is a top view of the integrated generator/motor driveline of FIG. 46 implemented in the fire fighting vehicle of FIG. 1, according to an exemplary embodiment.

Referring to FIGS. 46-48, an integrated generator/motor driveline 1200 includes an ICE 1202, a clutch 1204, a TAD 1206, an electric motor 1208, a transmission 1216, a fire pump 1212, an ESS 1210, and an axle 1214. The ICE 1202 may be the same as or similar to the engine 202, the ICE 1002, and/or the ICE 1102. The clutch 1204 can be the same as or similar to the clutch 300, the clutch 1004, and/or the clutch 1104. The TAD 1206 can be the same as or similar to the TAD 400, the TAD 1006, and/or the TAD 1106. The electric motor 1208 can be the same as or similar to the electric motor 1008 and/or the electric motor 1108. The fire pump 1212 can be the same as or similar to the pump 604, the fire pump 1012, and/or the fire pump 1112. The ESS 1210 and the axle 1214 can also be the same as or similar to the ESS 700, the ESS 1010, and/or ESS 1110 and the axle 1114.

FIG. 46 shows the integrated generator/motor driveline 1200 operating in an EV mode. FIG. 47 shows the integrated generator/motor driveline 1200 operating in an ICE mode. The integrated generator/motor driveline 1200 can be transitioned between the EV mode shown in FIG. 46 and the ICE mode shown in FIG. 47 by operation of the clutch 1204 (e.g., transitioning the clutch 1204 into an open position, state, or mode to transition the integrated generator/motor driveline 1200 into the EV mode and transitioning the clutch 1204 into a closed position, state, or mode to transition the integrated generator/motor driveline 1200 into the ICE mode).

When the integrated generator/motor driveline 1200 is transitioned into the EV mode, the clutch 1204 is transitioned into the open position. When the integrated generator/motor driveline 1200 operates in the EV mode, the axle 1214 is driven electrically (e.g., using an electric motor). The electric motor 1208 draws electrical energy from the ESS 1210 and drives the fire pump 1212 and the axle 1214 through the transmission 1216. The electric motor 1208 can be back-driven (e.g., as a form of regenerative braking, when the vehicle 10 rolls down a hill, etc.) through the axle 1214 and the transmission 1216. When the electric motor 1208 is back-driven, the electric motor 1208 generates electrical energy and provides the electrical energy to the ESS 1210 for storage and later use.

When the integrated generator/motor driveline 1200 is transitioned into the ICE mode, the clutch 1204 is transitioned into the closed position. The ICE 1202 can consume fuel and operate to drive the TAD 1206 through the clutch 1204. The TAD 1206 can drive the electric motor 1208 so that the electric motor 1208 operates to generate electricity. Electrical energy generated by the electric motor 1208 is provided to the ESS 1210 where the electrical energy can be stored and discharged at a later time (e.g., for use by the electric motor 1208 when operating in the EV mode). The TAD 1206 can also transfer mechanical energy to the transmission 1216. The transmission 1216 receives the mechanical energy from the TAD 1206 or the electric motor 1208 and provides mechanical energy to both the fire pump 1212 and the axle 1214 (e.g., at a reduced or increased speed, and/or a reduced or increased torque). The transmission 1216 can be transitionable between multiple different gears or modes to adjust a gear ratio across the transmission 1216. In some embodiments, the transmission 1216 is an Allison 3000 series transmission. Operating the integrated generator/motor driveline 1200 in the ICE mode facilitates driving the axle 1214 using energy generated by the ICE 1202 (rather than by the electric motor 1208 as when the integrated generator/motor driveline 1200 operates in the EV mode).

Advantageously, the integrated generator/motor driveline 1200 facilitates retaining transmission and direct drive in case of electrical failure (e.g., failure of the electric motor 1208). For example, even if the electric motor 1208 fails, the ICE 1202 can still be operated to drive the fire pump 1212 and the axle 1214. The integrated generator/motor driveline 1200 may also use a non-electric axle 1214 (e.g., a mechanical axle, a same axle as used on a vehicle that only uses an internal combustion engine to drive the axle, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A fire fighting vehicle comprising:
a chassis;
an energy storage system coupled to the chassis, the energy storage system including a plurality of battery cells; and
a charging assembly configured to interface with a charging plug of an external power source, the charging assembly including:
a housing;
a charging port disposed within the housing and electrically coupled to the plurality of battery cells, the charging port configured to engage with a charging interface of the charging plug;
a retainer positioned proximate the charging port, the retainer configured to engage with a retaining interface of the charging plug to secure the charging interface within the charging port;
a release mechanism positioned to release the retaining interface from engagement with the retainer by repositioning the retaining interface into a release position, the release mechanism including at least one of a first actuator, a first solenoid, or a lever; and
an ejector positioned to eject the charging plug from the charging assembly when the retaining interface is in the release position, the ejector including at least one of a second actuator, a second solenoid, or a plunger.

2. The fire fighting vehicle of claim 1, wherein the charging assembly includes a control system.

3. The fire fighting vehicle of claim 2, further comprising a disconnect operator input, wherein the control system is configured to control the release mechanism and the ejector to disconnect the charging plug from the charging port in response to receiving a signal from the disconnect operator input.

4. The fire fighting vehicle of claim 3, wherein the control system is configured to initiate a vehicle start sequence in response to the charging plug being disconnected from the charging port based on the signal from the operator input.

5. The fire fighting vehicle of claim 2, wherein the charging assembly includes a sensor configured to detect engagement of the charging plug with the charging port.

6. The fire fighting vehicle of claim 5, wherein the control system is configured to initiate a vehicle start sequence in response to receiving a signal from the sensor indicating that the charging plug was disconnected from the charging port.

7. The fire fighting vehicle of claim 5, wherein the control system is configured to prevent driving of the fire fighting vehicle in response to the sensor providing a signal indicating that the charging plug is connected to the charging port.

8. The fire fighting vehicle of claim 7, wherein the control system is configured to provide a notification indicating that the charging plug needs to be disconnected from the charging port before the fire fighting vehicle can be driven.

9. The fire fighting vehicle of claim 2, wherein the control system is configured to control the release mechanism and the ejector to disconnect the charging plug from the charging port in response to the fire fighting vehicle being at least one of started or put into drive.

10. The fire fighting vehicle of claim 2, wherein the control system is configured to:
control the release mechanism and the ejector to disconnect the charging plug from the charging port; and
stop a draw of power by the energy storage system from the charging plug prior to disconnecting the charging plug from the charging port.

11. The fire fighting vehicle of claim 10, wherein the control system is configured to transmit a signal to the external power source to stop providing power to stop the draw of power by the energy storage system.

12. The fire fighting vehicle of claim 10, wherein the control system is configured to stop the draw of power on the fire fighting vehicle.

13. The fire fighting vehicle of claim 2, wherein the control system is configured to:
receive data from a server; and
at least one of (i) initiate a vehicle start sequence based on the data or (ii) control the release mechanism and the ejector to disconnect the charging plug from the charging port based on the data.

14. The fire fighting vehicle of claim 13, wherein the control system is configured to initiate the vehicle start sequence and control the release mechanism and the ejector to disconnect the charging plug from the charging port based on the data.

15. The fire fighting vehicle of claim 13, wherein the data indicates that the fire fighting vehicle is being dispatched to a scene.

16. The fire fighting vehicle of claim 2, wherein the control system is configured to:
receive dispatch data indicating that the fire fighting vehicle is being dispatched; and
initiate a vehicle start sequence and control the release mechanism and the ejector to eject the charging plug from the charging port in response to receiving the dispatch data.

17. A vehicle comprising:
an energy storage system;
a charging port electrically coupled to the energy storage system, the charging port configured to engage with a charging interface of a charging plug of an external power source;
a sensor configured to detect engagement of the charging plug with the charging port;
a disconnect system configured to facilitate ejecting the charging plug from the charging port;
an operator input configured to facilitate manual activation of the disconnect system; and
a control system configured to:
control the disconnect system to disconnect the charging plug from the charging port in response to receiving a disconnect signal from the operator input;
control the disconnect system to disconnect the charging plug from the charging port in response to the vehicle being at least one of started or put into drive by an operator;
initiate a vehicle start sequence in response to receiving a sensor signal from the sensor indicating that the charging plug was disconnected from the charging port;
prevent driving of the vehicle in response to the sensor signal indicating that the charging plug is connected to the charging port; and
at least one of (i) initiate the vehicle start sequence or (ii) control the disconnect system to disconnect the charging plug from the charging port in response to receiving dispatch data indicating that the vehicle is being dispatched to a scene.

18. The vehicle of claim 17, wherein the control system is configured to stop a draw of power by the energy storage system prior to controlling the disconnect system to disconnect the charging plug.

19. The vehicle of claim 18, further comprising a retainer positioned proximate the charging port, the retainer configured to engage with a retaining interface of the charging plug to secure the charging interface within the charging port, wherein the disconnect system includes (i) a first actuator positioned to release the retaining interface from engagement with the retainer by repositioning the retaining interface into a release position and (ii) a second actuator positioned to eject the charging plug from the charging port when the retaining interface is in the release position.

* * * * *